United States Patent
Park et al.

(10) Patent No.: US 11,812,509 B2
(45) Date of Patent: Nov. 7, 2023

(54) COMMUNICATION RELATED TO CONFIGURATION UPDATE

(71) Applicant: LG ELECTRONICS INC., Seoul (KR)

(72) Inventors: Sangmin Park, Seoul (KR); Laeyoung Kim, Seoul (KR); Myungjune Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 73 days.

(21) Appl. No.: 17/753,018

(22) PCT Filed: Aug. 27, 2020

(86) PCT No.: PCT/KR2020/011458
§ 371 (c)(1),
(2) Date: Feb. 15, 2022

(87) PCT Pub. No.: WO2021/040423
PCT Pub. Date: Mar. 4, 2021

(65) Prior Publication Data
US 2022/0345879 A1 Oct. 27, 2022

(30) Foreign Application Priority Data

Aug. 27, 2019 (KR) .................. 10-2019-0104989
Jun. 30, 2020 (KR) .................. 10-2020-0080513

(51) Int. Cl.
*H04W 8/24* (2009.01)
*H04W 60/04* (2009.01)
(Continued)

(52) U.S. Cl.
CPC ........... *H04W 8/245* (2013.01); *H04W 60/04* (2013.01); *H04W 4/40* (2018.02); *H04W 88/04* (2013.01)

(58) Field of Classification Search
CPC ....... H04W 8/245; H04W 60/04; H04W 4/40; H04W 88/04
(Continued)

(56) References Cited

U.S. PATENT DOCUMENTS 9,788,196 B2 * 10/2017 Goldfarb ............. H04W 12/122
2016/0142952 A1 * 5/2016 Nakata .................. H04W 36/38
455/438
(Continued)

FOREIGN PATENT DOCUMENTS

| KR | 10-2016-0120243 | 10/2016 |
| KR | 10-2019-0018698 | 2/2019 |
| WO | 2017-188758 | 11/2017 |

OTHER PUBLICATIONS

PCT International Application No. PCT/KR2020/011458, International Search Report dated Nov. 25, 2020, 4 pages.
(Continued)

*Primary Examiner* — Nghi H Ly
(74) *Attorney, Agent, or Firm* — LEE, HONG, DEGERMAN, KANG & WAIMEY PC

(57) ABSTRACT

One disclosure of the present specification provides a method for performing, by relay UE, communication related to a configuration update. The method comprises the steps of: receiving, from a network node, a configuration update command message including information requesting to perform a registration procedure; and transmitting, to the network node, a response message to the configuration update command message, wherein the response message includes information requesting to maintain a NAS signaling connection between the relay UE and the network node.

15 Claims, 25 Drawing Sheets

(51) Int. Cl.
*H04W 4/40* (2018.01)
*H04W 88/04* (2009.01)

(58) Field of Classification Search
USPC ............. 455/419, 418, 433, 435.1, 450, 466
See application file for complete search history.

(56) References Cited

U.S. PATENT DOCUMENTS

2017/0142086 A1* 5/2017 Chen .................... H04W 76/15
2019/0281127 A1* 9/2019 Schmidt ................. H04L 67/51

OTHER PUBLICATIONS

Samsung R&D Institute UK et al., "Rejected NSSAI for current registration area," C1-191085, 3GPP TSG CT WG1 Meeting #115, Mar. 2019, 36 pages.
Ericsson, "Control plane states," Tdoc R2-166726, 3GPP TSG-RAN WG2 #95bis, Oct. 2016, 6 pages.

\* cited by examiner

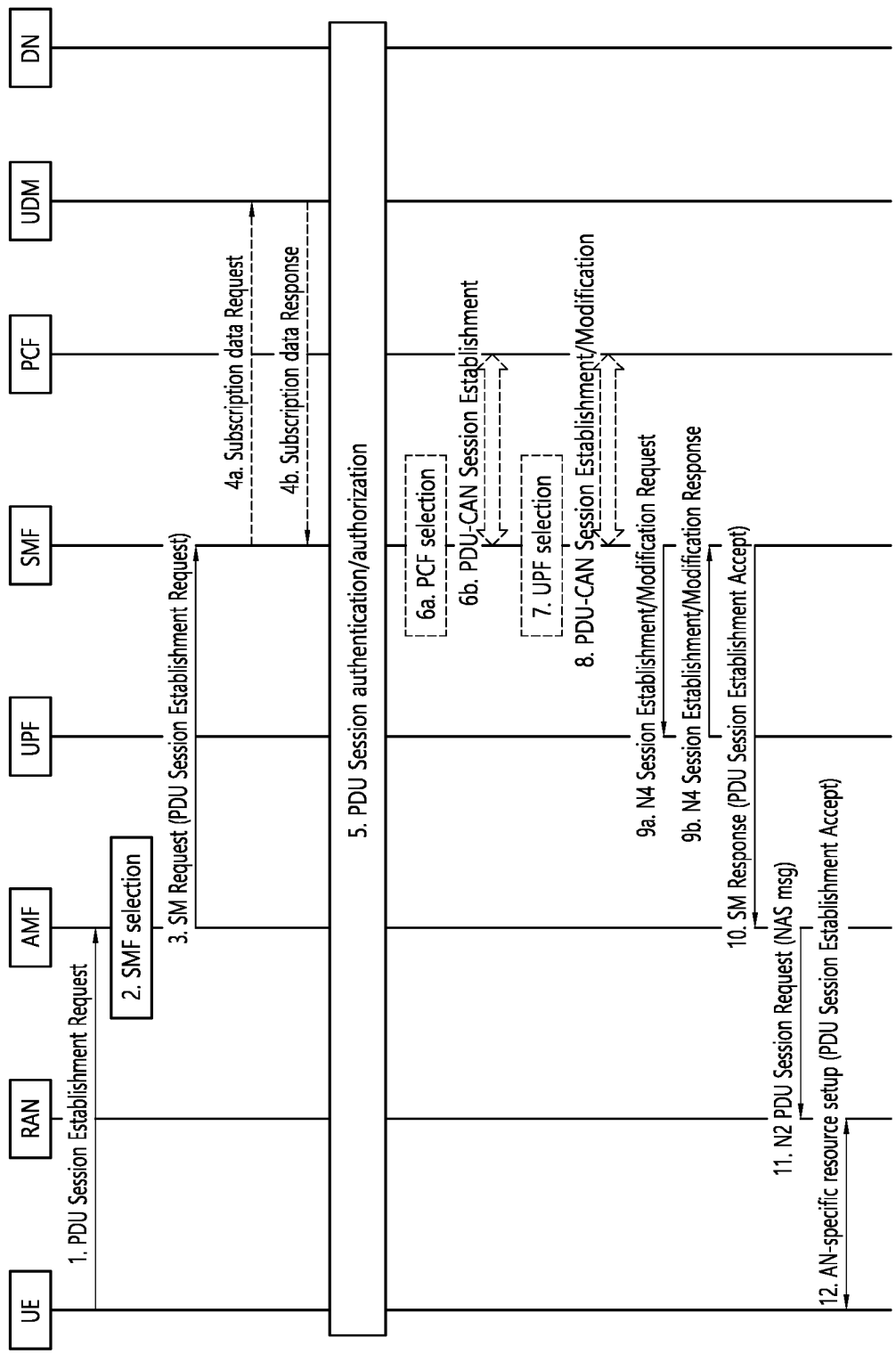

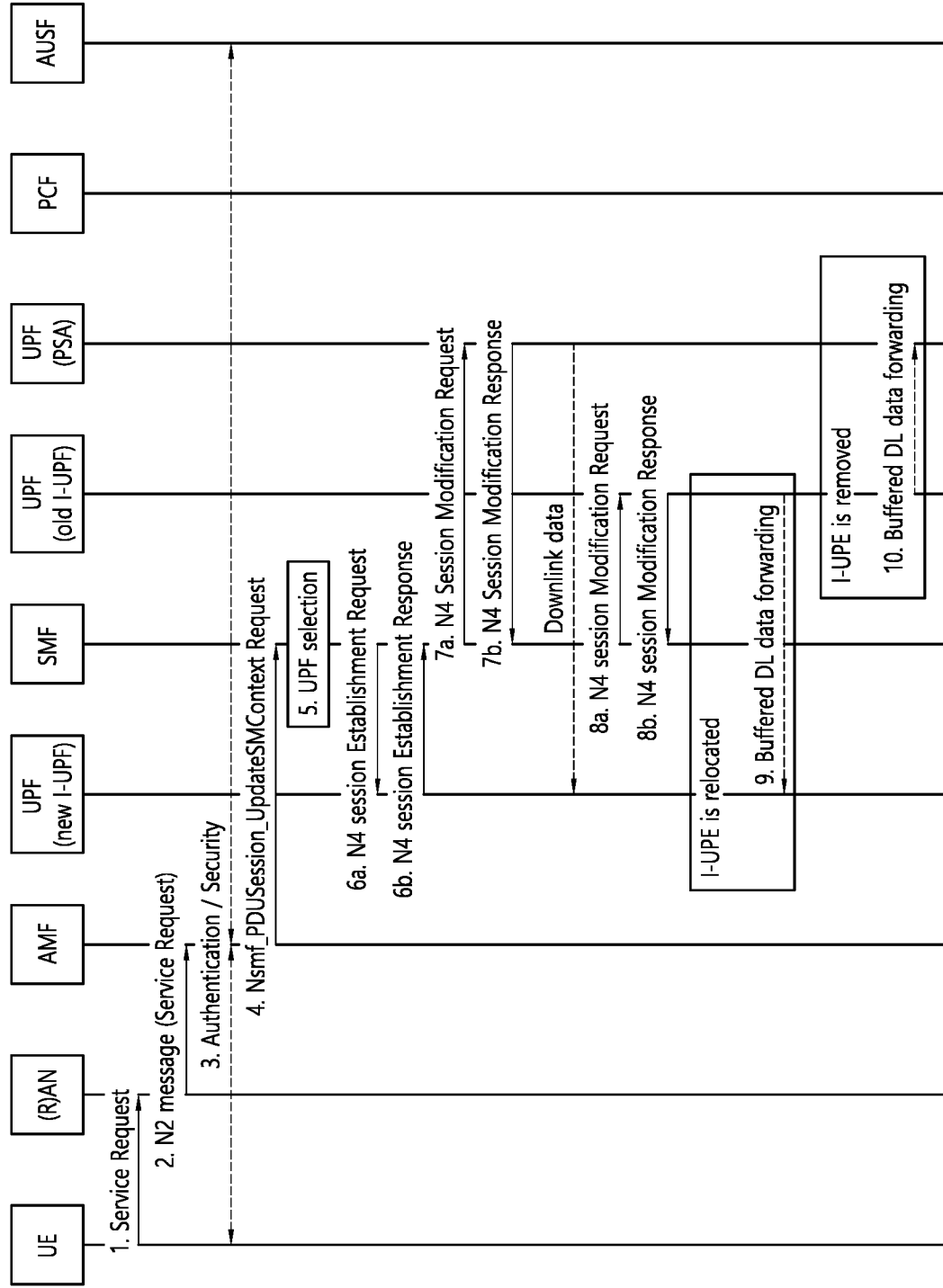

COMMUNICATION RELATED TO CONFIGURATION UPDATE

CROSS-REFERENCE TO RELATED APPLICATIONS

This application is the National Stage filing under 35 U.S.C. 371 of International Application No. PCT/KR2020/011458, filed on Aug. 27, 2020, which claims the benefit of earlier filing date and right of priority to Korean Application Nos. 10-2019-0104989 filed on Aug. 27, 2019, and 10-2020-0080513 filed on Jun. 30, 2020, the contents of all of which are hereby incorporated by reference herein in their entireties.

TECHNICAL FIELD

The present specification relates to mobile communication.

BACKGROUND

With the success of Evolved Universal Terrestrial Radio Access Network (E-UTRAN) for the fourth-generation mobile communication which is Long Term Evolution (LTE)/LTE-Advanced (LTE-A), the next generation mobile communication, which is the fifth-generation (so called 5G) mobile communication, has been attracting attentions and more and more researches are being conducted.

For the fifth-generation (so called 5G) mobile communication, a new radio access technology (New RAT or NR) have been studied and researched.

The fifth-generation communication defined by the International Telecommunication Union (ITU) refers to providing a maximum data transmission speed of 20 Gbps and a maximum transmission speed of 100 Mbps per user in anywhere. It is officially called "IMT-2020" and aims to be released around the world in 2020.

Layer 2 Relay is being discussed. When the Remote UE is connected to the network through a Layer 2 Relay (i.e., Layer-2 UE-to-Network Relay), the Remote UE may transmit NAS messages and RRC messages to the network through the Layer 2 Relay UE, and receive NAS messages and RRC messages from the network through 2 Relay UEs.

The network (eg, AMF) may request the UE to perform re-registration due to a change in slicing information of the UE (eg, Relay UE) or for other reasons. In this case, the AMF may transmit a UE Configuration Update (UCU) Command message including "registration requested" information to the UE.

In this case, when the user plane resource of the PDU session directly used by the relay UE is allocated (or when the PDU session or user plane resource is activated), the relay UE may postpone the release of the NAS signaling connection. However, if the Remote UEs connected to the Relay UE are using the PDU session, the PDU session being used by the Remote UEs is not the PDU session directly used by the Relay UE itself, so the Relay UE cannot postpone the release of NAS signaling.

As a result, the NAS signaling connection is disconnected from the Remote UE's point of view, and signaling and data cannot be exchanged with the network through the Relay UE, so that there may be situations in which time and data are wasted while performing a procedure for finding a new Relay UE or transmitting data to a Relay UE whose NAS signaling has already been released. Due to this, a problem in which the user experience of the Remote UE is deteriorated may occur.

SUMMARY

Accordingly, a disclosure of the present specification has been made in an effort to solve the aforementioned problem.

In order to solve the above problems, one disclosure of the present specification provides a method for a relay UE to perform communication related to configuration update. The method includes: receiving a configuration update command message including information requesting to perform a registration procedure from a network node; and transmitting a response message to the configuration update command message to the network node, wherein the response message may include information requesting to maintain a NAS signaling connection between the Relay UE and the network node.

In order to solve the above problems, one disclosure of the present specification provides a method for a network node to perform communication related to configuration update. The method includes: sending a configuration update command message including information requesting to perform a registration procedure to the UE; and receiving a response message to the configuration update command message from the UE, wherein the response message may include information requesting to maintain a NAS signaling connection between the UE and the network node.

In order to solve the above problems, one disclosure of the present specification provides a UE that performs communication related to configuration update. The UE includes at least one processor; and at least one memory to store instructions and operably electrically connectable to the at least one processor. The operations performed based on the execution of the command by the at least one processor may include: receiving a configuration update command message including information requesting to perform a registration procedure from a network node; and transmitting a response message to the configuration update command message to the network node, wherein the response message may include information requesting to maintain a NAS signaling connection between the Relay UE and the network node.

In order to solve the above-described problem, one disclosure of the present specification provides a network node that performs communication related to configuration update. The network node includes at least one processor; and at least one memory to store instructions and operably electrically connectable to the at least one processor. The operations performed based on the command being executed by the at least one processor may include: sending a configuration update command message including information requesting to perform a registration procedure to the UE; and receiving a response message to the configuration update command message from the UE, wherein the response message may include information requesting to maintain a NAS signaling connection between the UE and the network node.

In order to solve the above problems, one disclosure of the present specification provides an apparatus in mobile communication. The apparatus includes at least one processor; and at least one memory to store instructions and operably electrically connectable to the at least one processor. The operations performed based on the instruction being executed by the at least one processor may include: identifying a settings update instruction message including information requesting to perform a registration procedure received from a network node; and generating a response message to the configuration update command message, wherein the response message may include information requesting to maintain a NAS signaling connection between the Relay UE and the network node.

In order to solve the above problems, one disclosure of the present specification provides a non-volatile computer-readable storage medium recording instructions. The instructions, when executed by one or more processors, cause the one or more processors to: identify a configuration update instruction message comprising information requesting to perform a registration procedure received from a network node; and generating a response message to the configuration update command message, wherein the response message may include information requesting to maintain a NAS signaling connection between the processor and the network node.

According to the disclosure of the present specification, it is possible to solve the problems of the prior art.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

FIGS. 6a and 6b is a signal flowchart illustrating an exemplary PDU session establishment procedure.

FIGS. 7a to 7c are signal flowcharts illustrating an exemplary UE initiated service request procedure.

DESCRIPTION OF EXEMPLARY EMBODIMENTS

Figure 1:
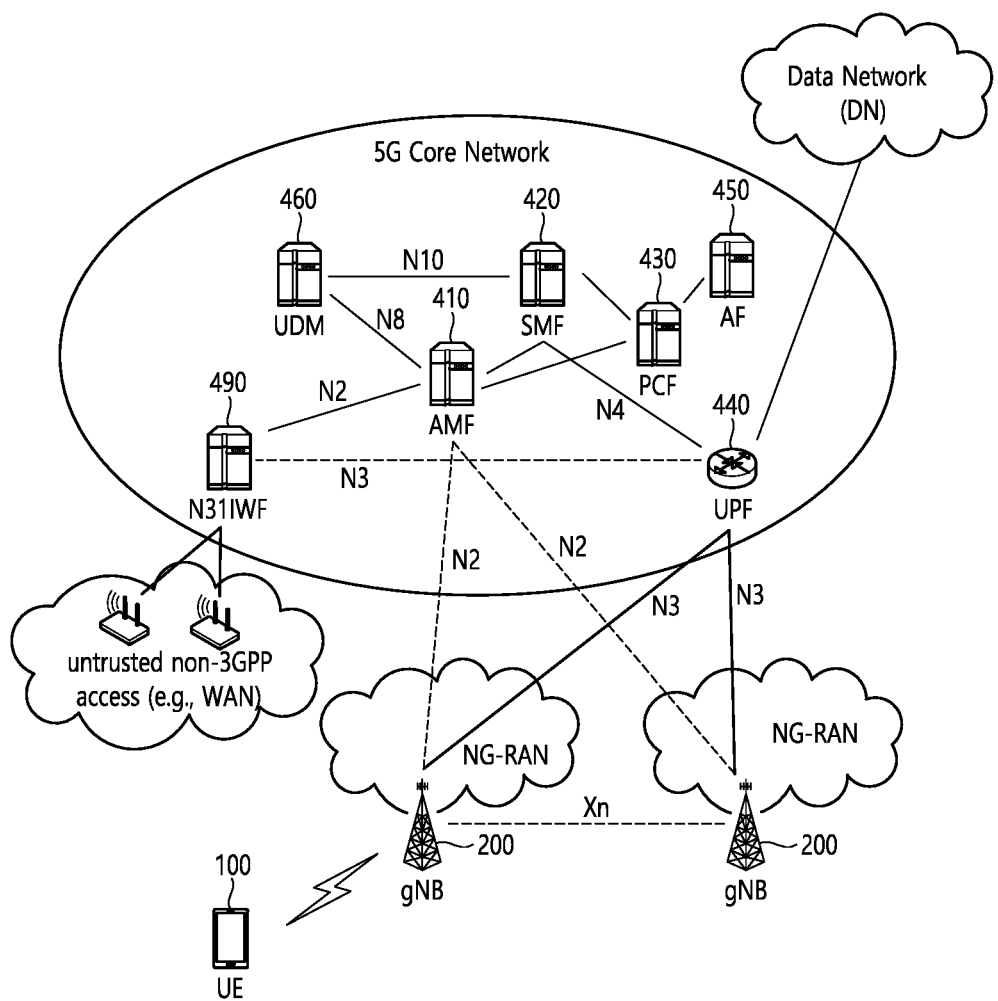
FIG. 1 is a structural diagram of a next-generation mobile communication network.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

As used herein, "A or B" may mean "only A", "only B", or "both A and B". In other words, "A or B" herein may be understood as "A and/or B". For example, "A, B or C" herein means "only A", "only B", "only C", or any combination of A, B and C (any combination of A, B and C)".

As used herein, a slash (/) or a comma may mean "and/or". For example, "A/B" may mean "A and/or B". Accordingly, "A/B" may mean "only A", "only B", or "both A and B". For example, "A, B, C" may mean "A, B, or C".

As used herein, "at least one of A and B" may mean "only A", "only B", or "both A and B". In addition, the expression "at least one of A or B" or "at least one of A and/or B" may be understood as "At least one of A and B".

In addition, in this specification, "at least one of A, B and C" may mean "only A", "only B", "only C", or "any combination of A, B and C". In addition, "at least one of A, B or C" or "at least one of A, B and/or C" may mean "at least one of A, B and C".

In addition, the parentheses used herein may mean "for example". In detail, when "control information (PDCCH (Physical Downlink Control Channel))" is written herein, "PDCCH" may be proposed as an example of "control information". In other words, "control information" of the present specification is not limited to "PDCCH", and "PDDCH" may be proposed as an example of "control information". In addition, even when "control information (i.e. PDCCH)" is written, "PDCCH" may be proposed as an example of "control information".

The technical features individually described in one drawing in this specification may be implemented separately or at the same time.

In the accompanying drawings, a user equipment (UE) is illustrated by way of example, but the illustrated UE may also be referred to in terms of UE 100 (terminal), mobile equipment (ME), and the like. In addition, the UE may be a portable device such as a notebook computer, a mobile phone, a PDA, a smartphone, or a multimedia device or may be a non-portable device such as a PC or vehicle-mounted device.

Hereinafter, the UE is used as an example of a wireless communication device (or a wireless device, or a wireless device) capable of wireless communication. An operation performed by the UE may be performed by a wireless communication device. A wireless communication device may also be referred to as a wireless device, a wireless device, or the like. Hereinafter, AMF may mean an AMF node, SMF may mean an SMF node, and UPF may mean a UPF node.

A base station, a term used below, generally refers to a fixed station communicating with a wireless device, and it may be called another term such as an evolved-NodeB (eNodeB), an evolved-NodeB (eNB), a BTS (Base Transceiver System), an access point (Access Point), gNB (Next generation NodeB), etc.

I. Techniques and Procedures Applicable to the Disclosure of the Present Specification FIG. 1 is a Structural Diagram of a Next-Generation Mobile Communication Network.

5GC (5G Core) may include various components, part of which are shown in FIG. 1, including an access and mobility management function (AMF) 410, a session management function (SMF) 420, a policy control function (PCF) 430, a User Plane Function (UPF) 440, an application function (AF) 450, a unified data management (UDM) data network 460, and a non-3GPP interworking function (N3IWF) 490.

A UE 100 is connected to a data network via the UPF 440 through a Next Generation Radio Access Network (NG-RAN) including the gNB 200.

The UE 100 may be provided with a data service even through untrusted non-3GPP access, e.g., a wireless local area network (WLAN). In order to connect the non-3GPP access to a core network, the N3IWF 490 may be deployed.

The illustrated N3IWF 490 performs a function of managing interworking between the non-3GPP access and the 5G system. When the UE 100 is connected to non-3GPP access (e.g., WiFi referred to as IEEE 801.11), the UE 100 may be connected to the 5G system through the N3IWF 490. The N3IWF 490 performs control signaling with the AMF 410 and is connected to the UPF 440 through an N3 interface for data transmission.

The illustrated AMF 410 may manage access and mobility in the 5G system. The AMF 410 may perform a function of managing NAS security. The AMF 410 may perform a function of handling mobility in an idle state.

The illustrated UPF 440 is a type of gateway through which user data is transmitted/received. The UPF 440 may perform the entirety or a portion of a user plane function of a serving gateway (S-GW) and a packet data network gateway (P-GW) of 4G mobile communication.

The UPF 440 operates as a boundary point between a next generation radio access network (NG-RAN) and the core network and maintains a data path between the gNB 200 and the SMF 420. In addition, when the UE 100 moves over an area served by the gNB 200, the UPF 440 serves as a mobility anchor point. The UPF 440 may perform a function of handling a PDU. For mobility within the NG-RAN (which is defined after 3GPP Release-15), the UPF 440 may route packets. In addition, the UPF 54 may also serve as an anchor point for mobility with another 3GPP network (RAN defined before 3GPP Release-15, e.g., universal mobile telecommunications system (UMTS) terrestrial radio access network (UTRAN), evolved (E)-UTRAN or global system for mobile communication (GERAN)/enhanced data rates for global evolution (EDGE) RAN. The UPF 440 may correspond to a termination point of a data interface toward the data network.

The illustrated PCF 430 is a node that controls an operator's policy.

The illustrated AF 450 is a server for providing various services to the UE 100.

The illustrated UDM 460 is a kind of server that manages subscriber information, such as home subscriber server (HSS) of 4G mobile communication. The UDM 460 stores and manages the subscriber information in a unified data repository (UDR).

The illustrated SMF 420 may perform a function of allocating an Internet protocol (IP) address of the UE. In addition, the SMF may control a protocol data unit (PDU) session.

For reference, hereinafter, reference numerals for AMF (410), SMF (420), PCF (430), UPF (440), AF (450), UDM (460), N3IWF (490), gNB (20), or UE (10) may be omitted.

The 5th generation mobile communication supports a plurality of numerologies (e.g. a plurality of values of subcarrier spacing (SCS)) in order to support various services. For example, when the SCS is 15 kHz, a wide area in traditional cellular bands is supported. When the SCS is 30 kHz/60 kHz, a dense-urban, lower-latency, and wider carrier bandwidth is supported. When the SCS is 60 kHz or greater, a bandwidth greater than 24.25 GHz is supported in order to overcome phase noise.

The NR frequency band may be defined as two types of frequency ranges (FR1, FR2). The numerical value of the frequency range may be changed, and for example, the frequency ranges of the two types (FR1, FR2) may be as shown in Table 1 below. For convenience of explanation, among the frequency ranges used in the NR system, FR1 may mean "sub 6 GHz range" and FR2 may mean "above 6 GHz range" and may be called millimeter wave (mmWave).

TABLE 1

| Frequency Range designation | Corresponding frequency range | Subcarrier Spacing |
| --- | --- | --- |
| FR1 | 4500 MHz-6000 MHz | 15, 30, 60 kHz |
| FR2 | 242050 MHz-52600 MHz | 60, 120, 240 kHz |

As mentioned above, the numerical value of the frequency range of the NR system can be changed. For example, FR1 may include a band of 4100 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or higher included in FR1 may include an unlicensed band. The unlicensed band may be used for various purposes, for example, for communication for a vehicle (eg, autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Figure 2:
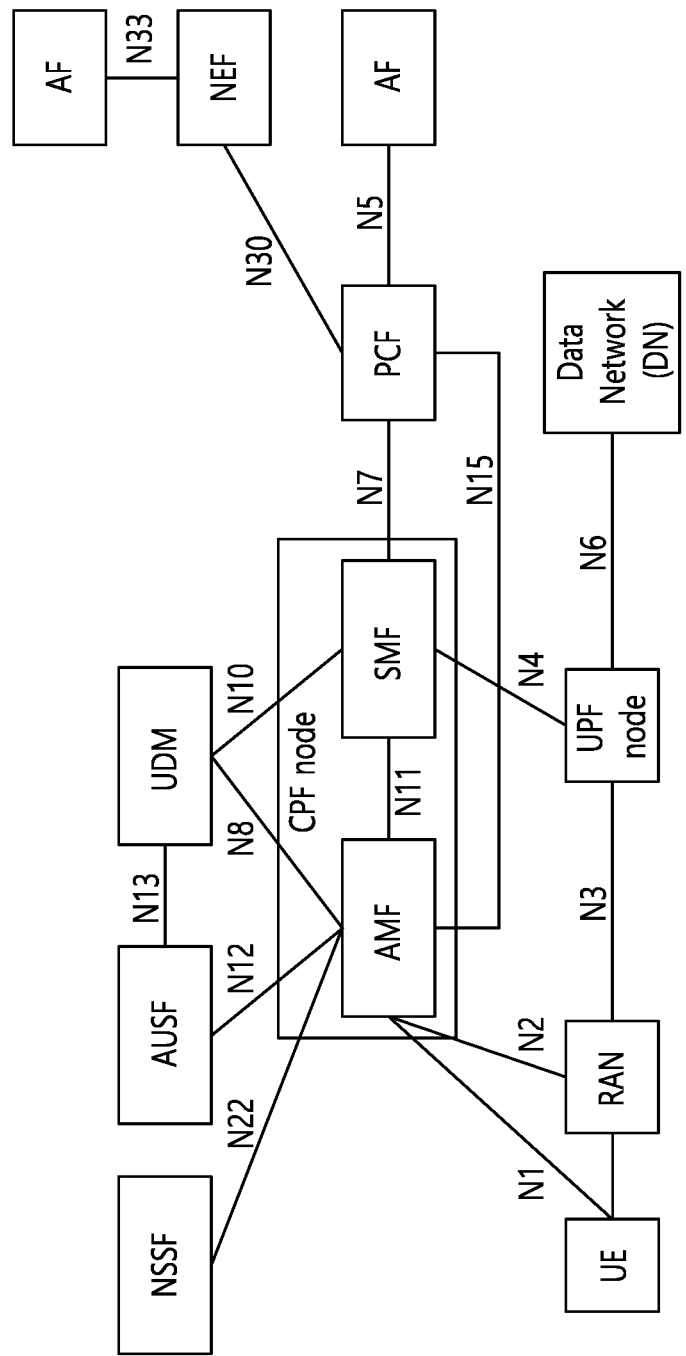
FIG. 2 is an exemplary diagram illustrating a predicted structure of a next generation mobile communication in terms of a node.

FIG. 2 is an Exemplary Diagram Illustrating a Predicted Structure of a Next Generation Mobile Communication in Terms of a Node.

Referring to FIG. 2, the UE is connected to a data network (DN) through a next generation RAN (Radio Access Network).

The Control Plane Function (CPF) node shown in FIG. 2 may perform all or part of the Mobility Management Entity (MME) function of the fourth generation mobile communication, and all or a part of the control plane function of the Serving Gateway (S-GW) and the PDN-gateway (P-GW) of the fourth generation mobile communication. The CPF node includes an Access and Mobility Management Function (AMF) node and a Session Management Function (SMF) node.

The user plane function (UPF) node shown in the drawing is a type of a gateway over which user data is transmitted and received. The UPF node may perform all or part of the user plane functions of the S-GW and the P-GW of the fourth generation mobile communication.

The Policy Control Function (PCF) node shown in FIG. 2 is configured to control a policy of the service provider.

The illustrated Application Function (AF) node refers to a server for providing various services to the UE.

The Unified Data Management (UDM) node as shown refers to a type of a server that manages subscriber information, such as a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

The illustrated Network Exposure Function (NEF) is a node for providing a mechanism to securely expose services and functions of the 5G core. For example, NEF exposes functions and events, securely provides information from external applications to the 3GPP network, translates internal/external information, provides control plane parameters, and manages packet flow description (PFD).

Figure 3:
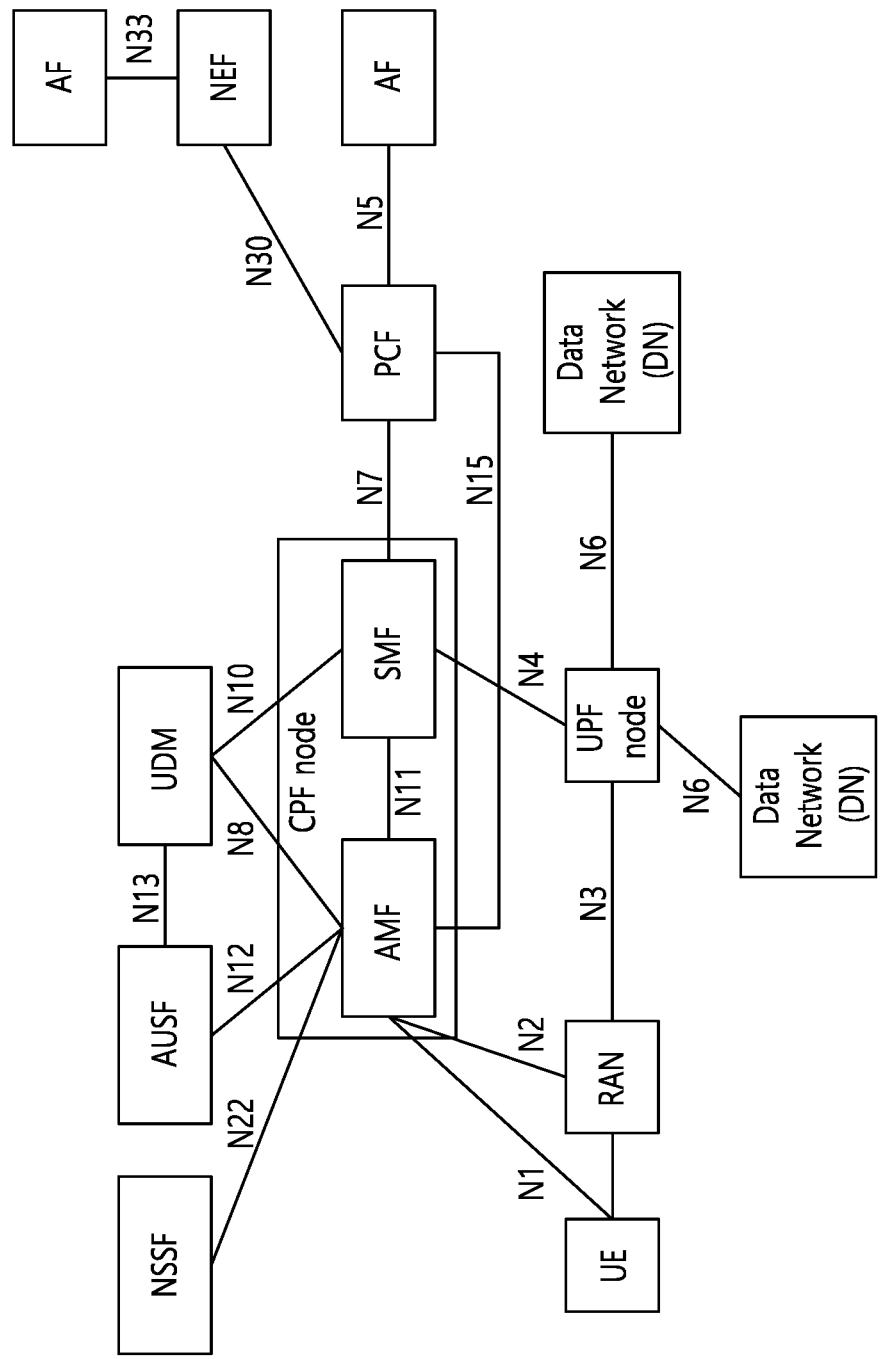
FIG. 3 is an exemplary diagram illustrating an architecture for supporting a concurrent access through two data networks.

In FIG. 3, the UE may simultaneously access two data networks using multiple PDU sessions.

FIG. 3 Illustrates an Architecture that Allows the UE to Simultaneously Access Two Data Networks Using One PDU Session.

FIG. 3 illustrates an architecture that allows the UE to simultaneously access two data networks using one PDU session.

For reference, descriptions of the reference points shown in FIGS. 2 and 3 are as follows.

N1 represents Reference point between UE and AMF.
N2 represents Reference point between NG-RAN and AMF.
N3 represents Reference point between NG-RAN and UPF.
N4 represents Reference point between SMF and UPF.
N5 represents Reference point between PCF and AF.
N6 represents Reference point between UPF and DN.
N7 represents Reference point between SMF and PCF.
N8 represents Reference point between UDM and AMF.
N9 represents Reference point between UPFs.
N10 represents Reference point between UDM and SMF.
N11 represents Reference point between AMF and SMF.
N12 represents Reference point between AMF and AUSF.
N13 represents Reference point between UDM and AUSF.
N14 represents Reference point between AMFs.
N15 represents Reference point between PCF and AMF in a non-roaming scenario and reference point between AMF and PCF of visited network in roaming scenario.
N16 represents Reference point between SMFs.
N22 represents Reference point between AMF and NSSF.
N30 represents Reference point between PCF and NEF.
N33 represents Reference point between AF and NEF.

In FIGS. 2 and 3, AF by a third party other than an operator may be connected to 5GC through a network exposure function (NEF).

Figure 4:
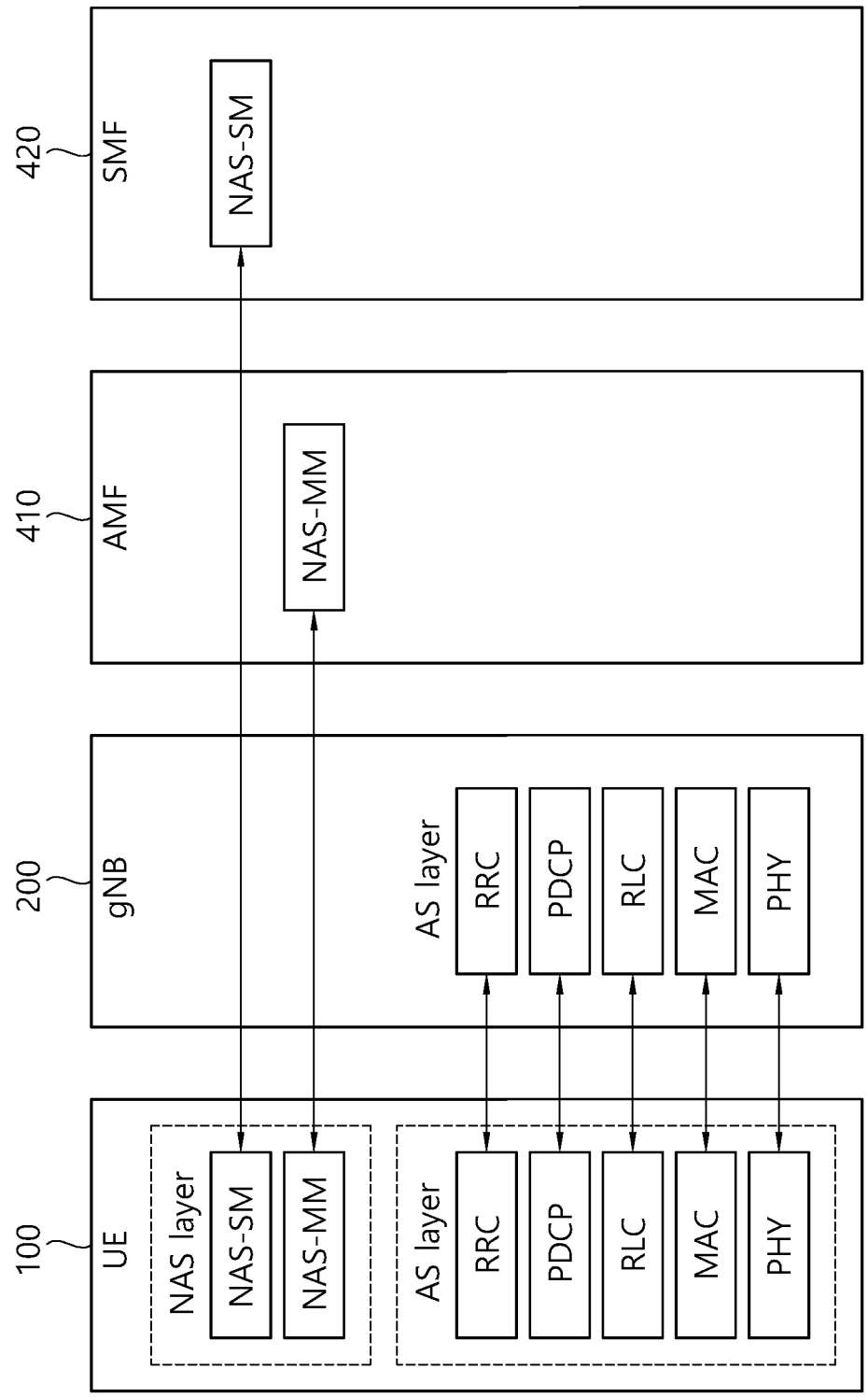
FIG. 4 is another exemplary diagram showing a structure of a radio interface protocol between a UE and a gNB.

FIG. 4 is Another Exemplary Diagram Showing a Structure of a Radio Interface Protocol Between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the open system interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a medium access control (MAC) layer, a radio link control (RLC) layer, and a packet data convergence protocol (PDCP) layer.

The third layer includes radio resource control (hereinafter abbreviated as RRC). The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The NAS layer performs functions such as connection management (session management) and mobility management.

The NAS layer is divided into a NAS entity for mobility management (MM) and a NAS entity for session management (SM).

1) NAS entity for MM provides the following functions in general.
  NAS procedures related to AMF include the following.
  Registration management and access management procedures. AMF supports the following functions.
  Secure NAS signal connection between UE and AMF (integrity protection, encryption)

2) The NAS entity for SM performs session management between the UE and the SMF.

The SM signaling message is processed, that is, generated and processed, at an NAS-SM layer of the UE and SMF. The contents of the SM signaling message are not interpreted by the AMF.

In the case of SM signaling transmission,
  The NAS entity for the MM creates a NAS-MM message that derives how and where to deliver an SM signaling message through a security header representing the NAS transmission of SM signaling and additional information on a received NAS-MM.
  Upon receiving SM signaling, the NAS entity for the SM performs an integrity check of the NAS-MM message, analyzes additional information, and derives a method and place to derive the SM signaling message.

Meanwhile, in FIG. 4, the RRC layer, the RLC layer, the MAC layer, and the PHY layer located below the NAS layer are collectively referred to as an access stratum (AS).

A network system (ie, 5GC) for next-generation mobile communication (ie, 5G) also supports non-3GPP access. An example of the non-3GPP access is typically a WLAN access. The WLAN access may include both a trusted WLAN and an untrusted WLAN.

In the system for 5G, AMF performs registration management (RM: Registration Management) and connection management (CM: Connection Management) for 3GPP access as well as non-3GPP access.

A Multi-Access (MA) PDU session using both 3GPP access and non-3GPP access may be used.

The MA PDU session is a PDU session that can be serviced simultaneously with 3GPP access and non-3GPP access using one PDU session.

Figure 5A:
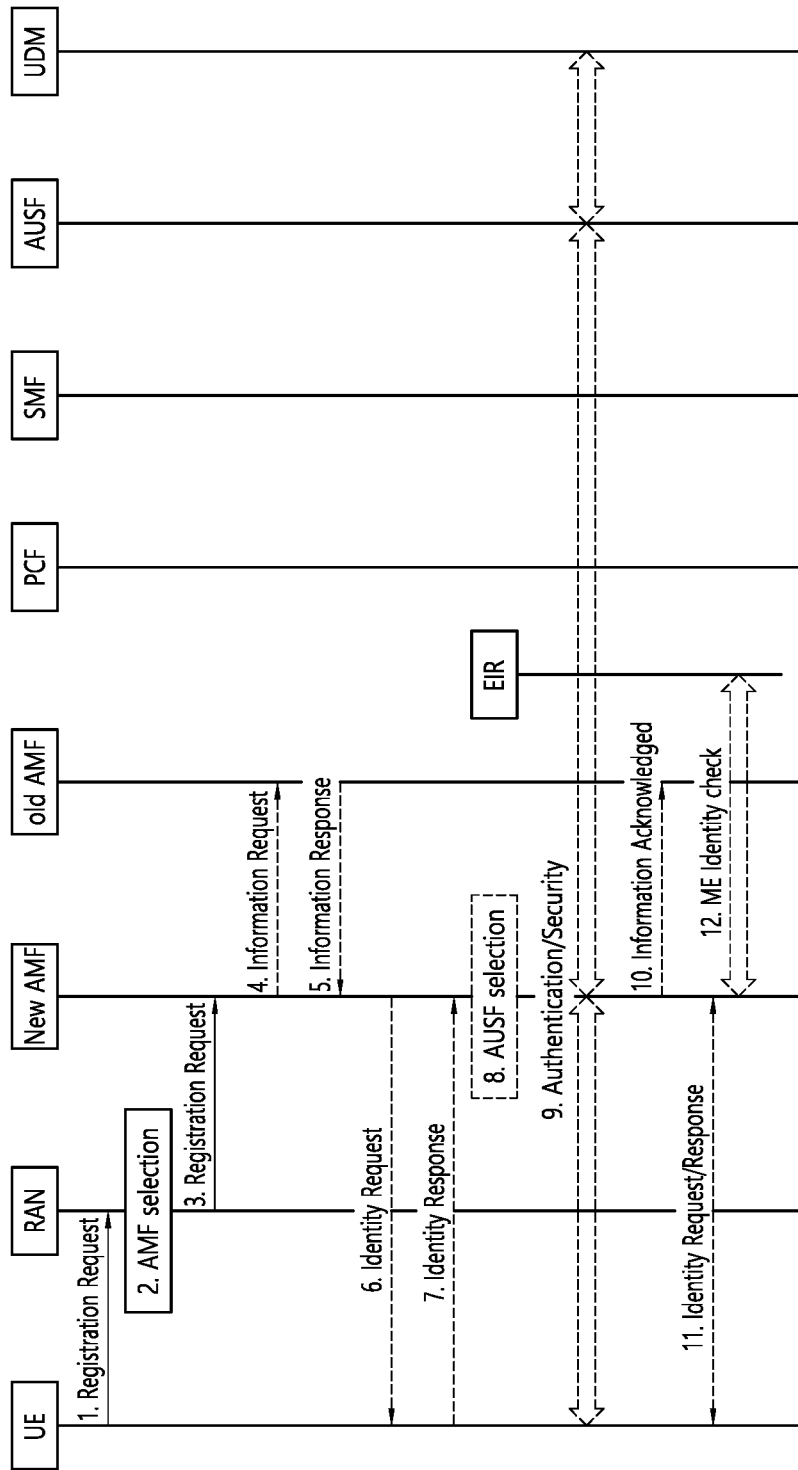
FIGS. 5a and 5b is a signal flow chart showing an exemplary registration procedure.
Figure 5B:
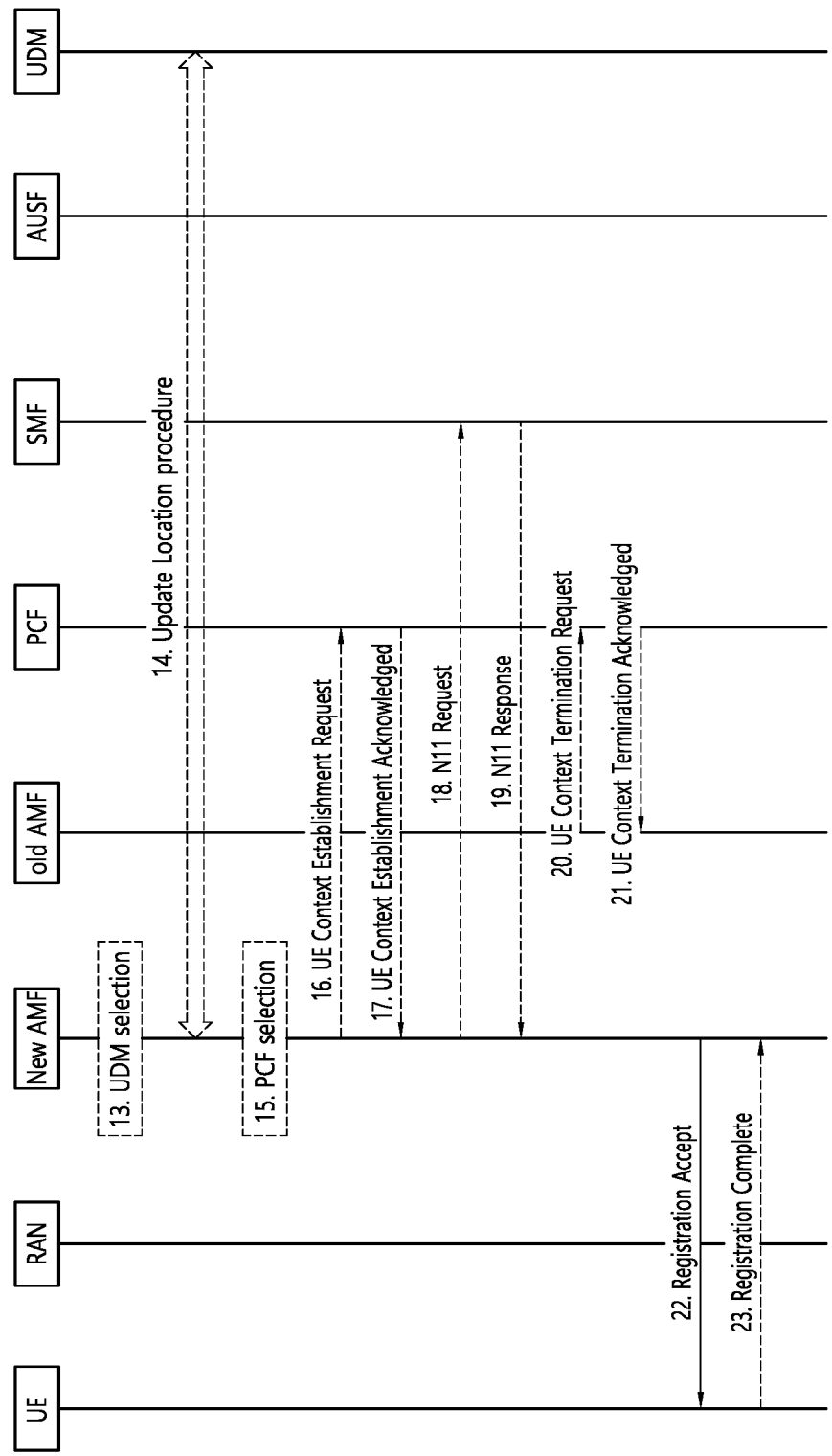

FIGS. 5a and 5b are Signal Flow Charts Showing an Exemplary Registration Procedure.

1) The UE may transmit an AN message to the RAN. The AN message may include an AN parameter and a registration request message. The registration request message may include information, such as a register type, a subscriber permanent ID or temporary user ID, a security parameter, NASSAI, 5G capability of the UE, a PDU session status, and so on.

In case of a 5G RAN, the AN parameter may include a SUPI or a temporary user ID, a selected network, and NASSAI.

The registration type may indicate whether the registration is an "initial registration" (i.e., the UE is in a non-registered state), "mobility registration update" (i.e., the UE is in a registered state, and the registration procedure is initiated by mobility), or "periodic registration update" (i.e., the UE is in a registered state, and the registration procedure is initiated due to the expiration of a periodic update timer). In case a temporary user ID is included, the temporary user ID indicates a last serving AMF. In case the UE has already been registered in a PLMN other than the PLMN of a 3GPP access through a non-3GPP access, the UE may not provide a UE temporary ID, which is allocated by the AMF during a registration procedure through the non-3GPP access.

The security parameter may be used for authentication and integrity protection.

The PDU session status indicates a PDU session that is available (and previously configured) in the UE.

2) In case the SUPI is included, or in case the temporary user ID does not indicate a valid AMF, the RAN may select an AMF based on a (R)AT and NSSAI.

In case the (R)AN cannot select an appropriate AMF, any AMF is selected according to a local policy, and the registration request is forwarded (or transferred) by using the selected AMF. If the selected AMF cannot provide service to the UE, the selected AMF may select another AMF that is more appropriate for the UE.

3) The RAN transmits an N2 message to a new AMF. The N2 message includes an N2 parameter and a registration request. The registration request may include a registration type, a subscriber permanent identifier or temporary user ID, a security parameter, NSSAI, MICO mode default settings (or configuration), and so on.

When a 5G-RAN is used, the N2 parameter includes location information related to a cell in which the UE is camping, a cell identifier, and a RAT type.

If the registration type indicated by the UE is a periodic registration update, Process 4 to Process 17, which will be described in detail later on, may not be performed.

4) The newly selected AMF may transmit an information request message to the previous AMF.

In case the temporary user ID of the UE is included in a registration request message, and in case the serving AMF is changed after the last registration, a new AMF may include an information request message, which includes complete registration request information for requesting SUPI and MM context of the UE, to the previous (or old) AMF.

5) The previous (or old) AMF transmits an information response message to the newly selected AMF. The information response message may include SUPI, MM context, and SMF information.

More specifically, the previous (or old) AMF transmits an information response message including SUPI and MM context of the UE.

In case information on an active PDU session is included in the previous (or old) AMF, SMF information including SMF ID and PDU session ID may be included in the information response message of the previous (or old) AMF.

6) In case the SUPI is not provided by the UE, or in case the SUPI is not searched from the previous (or old) AMF, the new AMF transmits an Identity Request message to the UE.

7) The UE transmits an Identity Response message including the SUPI to the new AMF.

8) The AMF may determine to perform triggering of an AUSF. In this case, the AMF may select an AUSF based on the SUPI.

9) The AUSF may initiate authentication of the UE and the NAS security function.

10) The new AMF may transmit an information response message to the previous (or old) AMF.

If the AMF is changed the new AMF may transmit the information response message in order to verify the forwarding of UE MM context.

If the authentication/security procedure is failed, the registration is rejected, and the new AMF may transmit a rejection message to the previous (or old) AMF.

11) The new AMF may transmit an Identity Request message to the UE.

In case a PEI is not provided by the UE, or in case a PEI is not searched from the previous (or old) AMF, an Identity Request message may be transmitted in order to allow the AMF to search the PEI.

12) The new AMF checks an ME identifier.

13) If Process 14, which will be described later on, is performed, the new AMF selects a UDM based on the SUPI.

14) If the AMF is modified after the final registration, if valid subscription context of the UE does not exist in the AMF, or if the UE provides a SUPI, wherein the AMF does not refer to a valid context, the new AMF initiates an Update Location procedure. Alternatively, even in a case where a UDM initiates Cancel Location for the previous AMF, the Update Location procedure may be initiated. The previous (or old) AMF discards the MM context and notifies all possible SMF(s), and, after obtaining AMF-related subscription data from the UDM, the new AMF generates MM context of the UE.

In case network slicing is used, the AMF obtains allowed NSSAI based on the requested NSSAI and UE subscription and local policy. In case the AMF is not appropriate for supporting the allowed NSSAI, the registration request is re-routed.

15) The new AMF may select a PCF based on the SUPI.

16) The new AMF transmits a UE Context Establishment Request message to the PCF. The AMF may request an operator policy for the UE to the PCF.

17) The PCF transmits a UE Context Establishment Acknowledged message to the new AMF.

18) The new AMF transmits an N11 request message to the SMF.

More specifically, when the AMF is changed, the new AMF notifies the new AMF that provides services to the UE to each SMF. The AMF authenticates the PDU session status from the UE by using available SMF information. In case the AMF is changed, the available SMF information may be received from the previous (or old) AMF. The new AMF may send a request to the SMF to release (or cancel) network resources related to a PDU session that is not activated in the UE.

19) The new AMF transmits an N11 response message to the SMF.

20) The previous (or old) AMF transmits a UE Context Termination Request message to the PCF.

In case the previous (or old) AMF has previously requested UE context to be configured in the PCF, the previous (or old) AMF may delete the UE context from the PCF.

21) The PCF may transmit a UE Context Termination Request message to the previous (or old) AMF.

22) The new AMF transmits a Registration Accept message to the UE. The Registration Accept message may include a temporary user ID, registration area, mobility restriction, PDU session status, NSSAI, periodic registration update timer, and allowed MICO mode.

The registration accept message may include information of the allowed NSSAI and the mapped NSSAI. The allowed NSSAI information for the access type of the UE may be included in the N2 message including the registration accept message. The information of the mapped NSSAI is information that maps each S-NSSAI (Session Network Slice Selection Assistance Information) of the allowed NSSAI (Network Slice Selection Assistance Information) to the S-NASSI of the NSSAI configured for Home Public Land Mobile Network (HPLMN).

In case the AMF allocated a new temporary user ID, the temporary user ID may be further included in the Registration Accept message. In case the mobility restriction is applied to the UE, information indicating the mobility restriction may be additionally included in the Registration Accept message. The AMF may include information indicating the PDU session status for the UE in the Registration Accept message. The UE may remove any internal resource being related to a PDU session that is not marked as being active from the received PDU session status. If the PDU session status information is included in the Registration Request, the AMF may include the information indicating the PDU session status to the UE in the Registration Accept message.

23) The UE transmits a Registration Complete message to the new AMF.

<PDU Session Establishment Procedure>

For the PDU Session Establishment procedure, two different types of PDU Session Establishment procedures may exist as described below.

A PDU Session Establishment procedure initiated by the UE.

A PDU Session Establishment procedure initiated by the network. For this, the network may transmit a Device Trigger message to an application (or applications) of the UE.

Figure 6B:
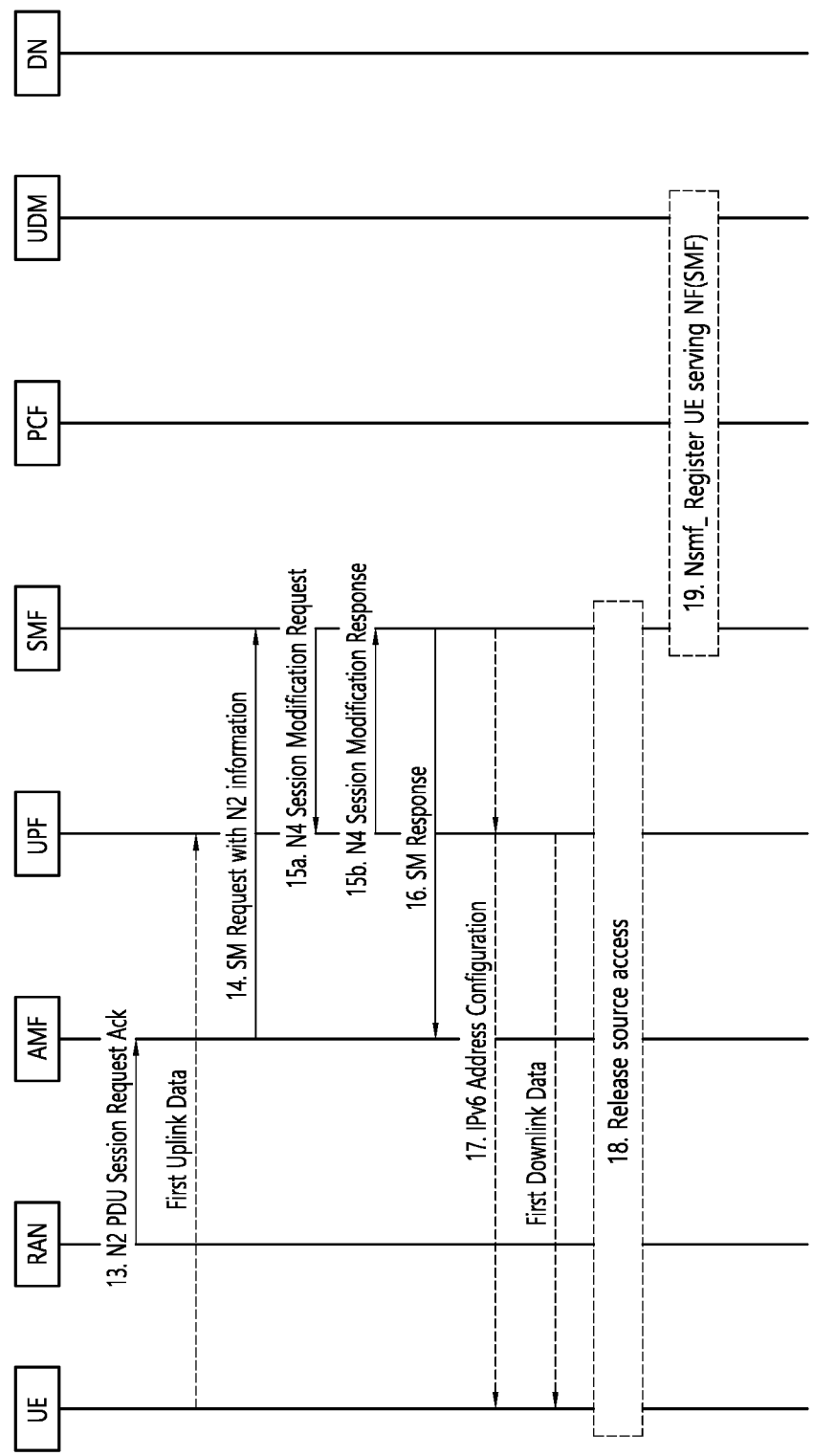

FIGS. 6a and 6b are a Signal Flowchart Illustrating an Exemplary PDU Session Establishment Procedure.

The procedure shown in FIGS. 6a and 6b assumes that the UE has already registered on the AMF according to the registration procedure shown in FIGS. 5a and 5b. Therefore, it is assumed that the AMF has already acquired user subscription data from UDM.

1) The UE transmits a NAS message to the AMF. The message may include Single-Network Slice Selection Assistance Information (S-NSSAI), DNN, PDU session ID, a Request type, N1 SM information (including PDU Session Request), and so on.

Specifically, the UE includes the S-NSSAI from the allowed (allowed) NSSAI of the current access type. If information on the mapped NSSAI is provided to the UE, the UE may provide both the S-NSSAI based on the allowed NSSAI and the corresponding S-NSSAI based on the information of the mapped NSSAI. Here, the mapped NSSAI information is information that maps each S-NSSAI of the allowed NSSAI to the S-NASSI of the NSSAI configured for HPLMN.

More specifically, The UE may extract and store the information of the allowed S-NSSAI and the mapped S-NSSAI included in the registration accept message received from the network (ie, AMF) in the registration procedure of FIGS. 5a and 5b. Accordingly, the UE may transmit the PDU session establishment request message by including both the S-NSSAI based on the allowed NSSAI and the corresponding S-NSSAI based on the mapped NSSAI information.

In order to establish a new PDU session, the UE may generate a new PDU session ID.

By transmitting a NAS message having a PDU Session Establishment Request message included in N1 SM information, the PDU Session Establishment procedure that is initiated by the UE may be started. The PDU Session Establishment Request message may include a Request type, an SSC mode, and a protocol configuration option.

In case the PDU Session Establishment is for configuring a new PDU session, the Request type indicates "initial access". However, in case an existing PDU session exists between the 3GPP access and the non-3GPP access, the Request type may indicate an "existing PDU session".

The NAS message being transmitted by the UE is encapsulated within an N2 message by the AN. The N2 message is transmitted to the AMF and may include user location information and access technique type information.

The N1 SM information may include an SM PDU DN request container including information on a PDU session authentication performed by an external DN.

2) In case the request type indicates an "initial request", and in case the PDU session ID has not been used for the existing PDU session of the UE, the AMF may determine that the message corresponds to a request for a new PDU session.

If the NAS message does not include the S-NSSAI, the AMF may determine default S-NSSAI for the requested PDU session according to the UE subscription. The AMF may relate a PDU session ID with an ID of the SMF and may store the PDU session ID.

3) The AMF transmits an SM request message to the SMF. The SM request message may include a subscriber permanent ID, DNN, S-NSSAI, a PDU session ID, an AMD IF, N1 SM information, user location information, and an access technique type. The N1 SM information may include a PDU session ID and a PDU Session Establishment Request message.

The AMF ID is used for identifying an AMF providing services to the UE. The N1 SM information may include the PDU Session Establishment Request message, which is received from the UE.

4a) The SMF transmits a Subscriber Data Request message to the UDM. The Subscriber Data Request message may include a subscriber permanent ID and DNN.

In the above-described Process 3, in case the Request type indicates an "existing PDU session", the SMF determines that the corresponding request is caused by a handover between the 3GPP access and the non-3GPP access. The SMF may identify the existing PDU session based on the PDU session ID.

In case the SMF has not yet searched the SN-related subscription data for the UE that is related to the DNN, the SMF may request the subscription data.

4b) The UDM may transmit a Subscription Data Response message to the SMF.

The subscription data may include an authenticated Request type, an authenticated SSC mode, and information on a default QoS profile.

The SMF may verify whether or not the UE request follows the user subscription and local policy. Alternatively, the SMF may reject the UE request via NAS SM signaling (including the related SM rejection cause), which is forwarded (or transferred) by the AMF, and then the SMF may notify to the AMF that this shall be considered as a release of the PDU session ID.

5) The SMF transmits a message to the DN through a UPF.

More specifically, in case the SMF is required to authorize/authenticate a PDU session establishment, the SMT selects a UPF and triggers the PDU.

If the PDU Session Establishment authentication/authority assignment fails, the SMF ends the PDU Session Establishment procedure and notifies the rejection to the UE.

6a) If dynamic PCC is distributed, the SMF selects a PCF.

6b) The SMF may start a PDU-CAN session establishment towards the PCF in order to obtain a default PCC rule for the PDU session. In case the Request type indicates an "existing PDU session", the PCF may start a PDU-CAN session modification instead.

7) In case the Request type of Process 3 indicates an "initial request", the SMF selects an SSC mode for the PDU session. If Process 5 is not performed, the SMF may also select a UPF. In case of Request type IPv4 or IPv6, the SMF may allocate an IP address/prefix for the PDU session.

8) In case dynamic PCC is deployed and the PDU-CAN session establishment is not yet completed, the SMF may begin (or start) PDU-CAN Session Start.

9) In case the Request type indicates an "initial request", and in case Process 5 is not performed, the SMF may use the selected UPF and start an N4 Session Establishment procedure. And, otherwise, the SMF may use the selected and start an N4 Session Modification procedure.

9a) The SMF transmits an N4 Session Establishment/Modification request message to the UPF. And, the SMF may provide packet discovery, execution, and reporting rules of packets that are to be installed in the UPF for the PDU session. In case the SMF allocates CN tunnel information, the CN tunnel information may be provided to the UPF.

9b) By transmitting an N4 Session Establishment/Modification response message, the UPF may respond. In case the CN tunnel information is allocated by the UPF, the CN tunnel information may be provided to the SMF.

10) The SMF transmits an SM response message to the AMF. The message may include a cause, N2 SM information, and N1 SM information. The N2 SM information may include a PDU session ID, a QoS profile, and CN tunnel information. The N1 SM information PDU Session Establishment Accept message. The PDU Session Establishment Accept message may include an allowed QoS rule, an SSC mode, S-NSSAI, and allocated IPv4 address.

As information that shall be forwarded to the RAN by the AMF, the N2 SM information may include the following.

CN Tunnel information: This corresponds to a core network address of an N3 tunnel corresponding to the PDU session.

QoS Profile: This is used for providing mapping between a QoS parameter and a QoS flow identifier (QFI) to the RAN.

PDU Session ID: This may be used for indicating a relation between AN resources for the UE and the PDU session to the UE via AN signaling for the UE.

Meanwhile, the N1 SM information includes a PDU Session Establishment Accept message that shall be provided to the UE by the AMF.

Multiple QoS rules may be included in the N1 SM information and the N2 SM information within the PDU Session Establishment Accept message.

The SM response message also includes information enabling the PDU session ID and AMF to determine not only which target UE to use but also which access is to be used for the UE.

11) The AMF transmits an N2 PDU Session Request message to the RAN. The message may include N2 SM information and an NAS message. The NAS message may include a PDU session ID and a PDU Session Establishment Accept message.

The AMF may transmit an NAS message including a PDU session ID and a PDU Session Establishment Accept message. Additionally, the AMF may include the N2 SM information received from the SMF in the N2 PDU Session Request message and may then transmit the message including the N2 SM information to the RAN.

12) The RAN may perform a specific signaling exchange with a UE being related to the information received from the SMF.

The RAN also allocates RAN N3 tunnel information for the PDU session.

The RAN forwards the NAS message, which is provided in Process 10. The NAS message may include a PDU session ID and N1 SM information. The N1 SM information may include a PDU Session Establishment Accept message.

The RAN transmits the NAS message to the UE only in a case where a needed RAN resource is configured and allocation of RAN tunnel information is successful.

13) The RAN transmits an N2 PDU Session Response message to the AMF. The message may include a PDU session ID, a cause, and N2 SM information. The N2 SM information may include a PDU session ID, (AN) tunnel information, and a list of allowed/rejected QoS profiles.

The RAN tunnel information may correspond to an access network address of an N3 tunnel corresponding to the PDU session.

14) The AMF may transmit an SM Request message to the SMF. The SM Request message may include N2 SM information. Herein, the AMF may forward the N2 SM information received from the RAN to the SMF.

15a) In an N4 session for the PDU session has not already been configured, the SMF may start an N4 Session Establishment procedure along with the UPF. Otherwise, the SMF may use the UPF to start an N4 Session Modification procedure. The SMF may provide AN tunnel information and CN tunnel information. The CN tunnel information shall be provided only in a case where the SMF selects the CN tunnel information in Process 8.

15b) The UPF may transmit an N4 Session Establishment/Modification Response message to the SMF.

16) The SMF may transmit an SM Response message to the AMF. When this process is ended (or completed), the AMF may forward the related event to the SMF. This occurs during a handover, in which the RAN tunnel information is modified or the AMF is re-deployed.

17) The SMF transmits information to the UE through the UPF. More specifically, in case of PDU Type IPv6, the SMF may generate an IPv6 Router Advertisement and may transmit the generated advertisement to the UE through the N4 and UPF.

18) In case the PDU Session Establishment Request is caused by a handover between the 3GPP access and the non-3GPP access, i.e., if the Request type is configured as an "existing PDU session", the SMF releases the user plane through a source access (3GPP or non-3GPP access).

19) In case the ID of the SMF is not included in Process 4b by the UDM of the DNN subscription context, the SMF may call (or page or summon) a "UDM Register UE serving NF service" including an SMF address and DNN. The UDM may store the ID, address, and DNN of the SMF.

During the procedure, if the PDU Session Establishment is not successful, the SMF notifies this to the AMF.

<Service Request Procedures>

The service request procedure is used to request establishment of a secure connection to AMF by a UE or a 5G core network (5GC). The service request procedure is used to activate the user plane connection of the established PDU session even when the UE is in a CM-IDLE state and a CM-CONNECTED state. For reference, in order to reflect NAS signaling connection between the AMF and the UE, two CM states of the CM-IDLE state and the CM-CONNECTED state are used.

The UE does not initiate a service request procedure if there is an ongoing service request procedure.

The service request procedure includes a service request procedure initiated by the UE (i.e., a UE triggered service request) and a service request procedure initiated by the network (i.e., a network triggered service request).

Hereinafter, an example of the UE triggered service request procedure will be described with reference to FIGS. 7a to 7c, and an example of the network triggered service request procedure will be described with reference to FIG. 8. The service request procedure described in FIGS. 7a to 7c and 9 is only an example, and the service request procedure in the present disclosure includes all the service request procedures triggered by the UE and all the service request procedures triggered by the network.

Figure 7B:
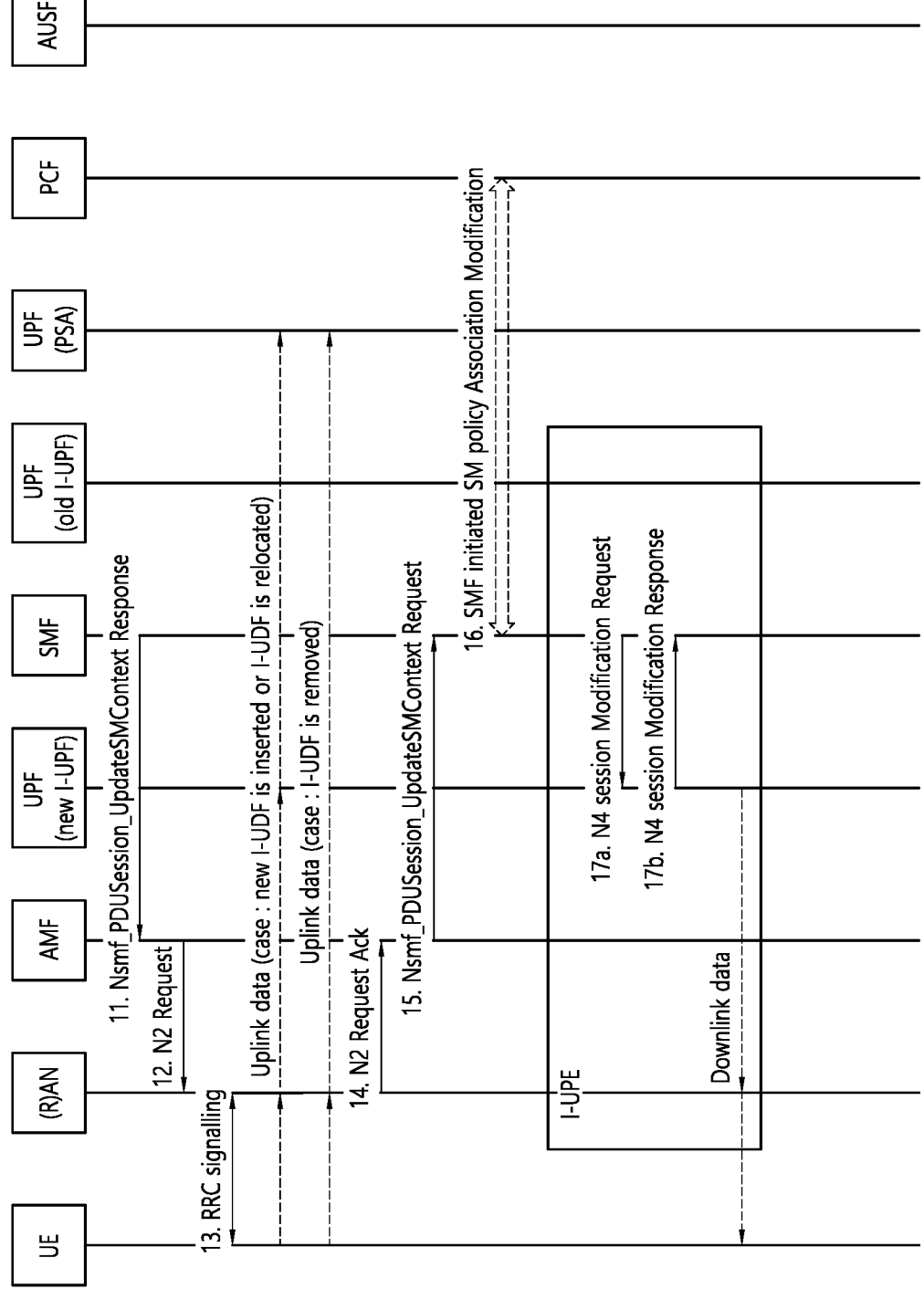
Figure 7C:
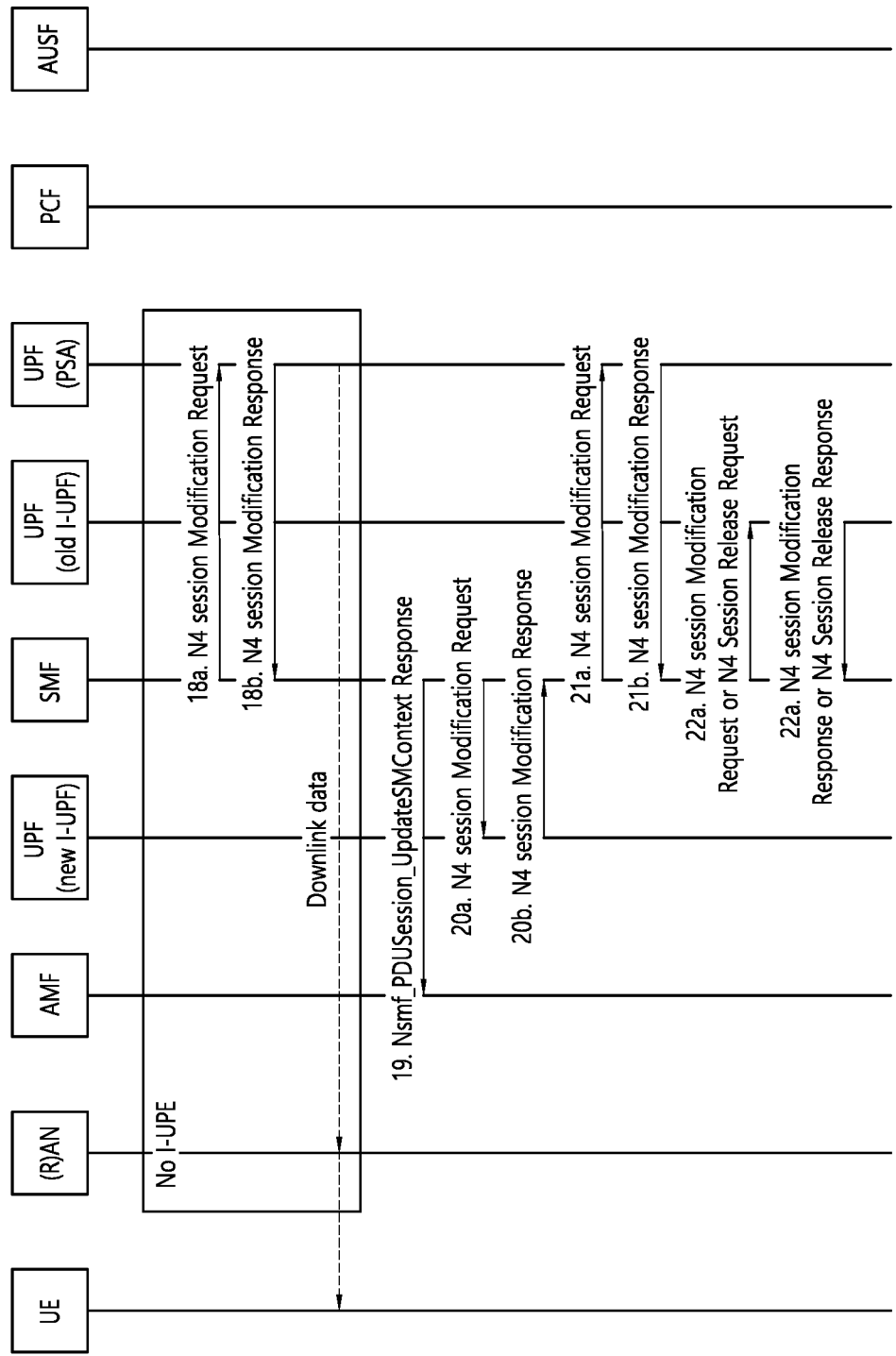

FIGS. 7a to 7c are Signal Flowcharts Illustrating an Exemplary UE Triggered Service Request Procedure.

The UE in the CM-ILDE state initiates a service request procedure to transmit a response on an uplink signaling message, user data, or network paging request. After receiving the service request message, the AMF may perform authentication. After establishing a signaling connection for AMF, the UE or the network may transmit a signaling message (e.g., establishment of a PDU session from the UE to the SMF through the AMF).

The service request procedure may be used by a UE in CM-CONNECTED state to request activation of a user plane connection for a PDU session and to respond to a NAS notification message received from the AMF.

For any service request procedure, if necessary, the AMF may include state information of the PDU session in a service accept message to synchronize a PDU session state between the UE and the network.

If the service request is not accepted by the network, the AMF responds to the UE with a service reject message. The service rejection message may include an indication or a cause code for requesting that the UE perform a registration update procedure.

In the UE triggered service request procedure, both SMF and UPF belong to a PLMN that serves the UE. For example, in a home routed roaming case, the SMF and UPF of the HPLMN are not affected by the service request procedure (that is, the SMF and UPF of the HPLMN are not involved in the service request procedure).

In response to a service request according to user data, the network may take additional action if the user plane connection activation is not successful.

The UE triggered service request procedure may be applied to a scenario with or without an intermediate UPF and a scenario with or without an intermediate UPF reselection.

1) Signaling from UE to (R)AN: the UE may transmit an access network (AN) message (including AN parameters, service request (list of PDU sessions to be activated, list of allowed PDU sessions), security parameters and PDU session status (status)) to the (R)AN.

The list of PDU sessions to be activated is provided by the UE when the UE attempts to re-activate the PDU session. The list of allowed PDU sessions is provided by the UE when the service request is a response to a NAS notification or paging of a PDU session related to non-3GPP access. And, the list of allowed PDU sessions identifies PDU sessions that may be moved to 3GPP access.

In case of NG-RAN:
AN parameters include the selected PLMN ID and establishment cause. The establishment cause provides a reason for requesting establishment of an RRC connection.

The UE transmits a service request message (message to AMF) encapsulated in an RRC message to the NG-RAN. The RRC message may be used to carry 5G system architecture evolution (SAE)-temporary mobile subscriber identity) (5G-S-TMSI).

When a service request is triggered for user data, the UE notifies a PDU session in which a user plane (UP) connection is to be activated in a service request message using a list of PDU sessions to be activated.

When the service request is triggered only for signaling, the UE does not include a list of PDU sessions to be activated.

When a service request procedure is triggered for a paging response and the UE has user data to be transmitted at the same time, the UE may inform about the PDU session with a UP connection to be activated in the service request message using the list of PDU sessions to be activated. Otherwise, the UE does not inform about any PDU session in the service request for paging response.

In a specific case, if there is no pending uplink data of PDU sessions, if a service request is triggered only for signaling, or if a service request is triggered for a paging response, the UE may include the PDU session to the list of PDU sessions to be activated.

Figure 8:
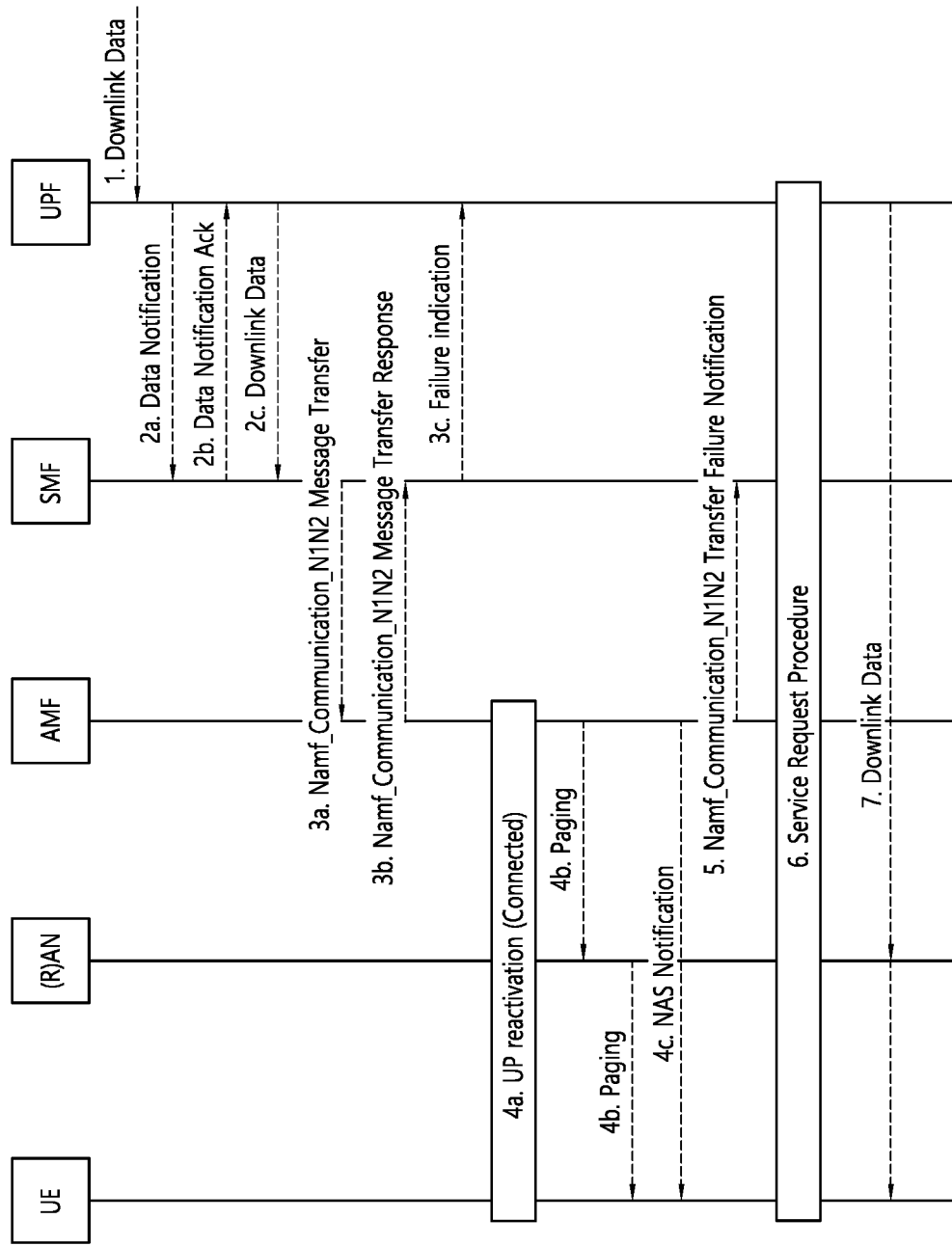
FIG. 8 is a signal flowchart illustrating an exemplary network initiated service request procedure.

When a service request through 3GPP access is triggered in response to a NAS notification indicating paging or non-3GPP access, the UE includes the non-3GPP PDU session that may be reactivated through 3GPp in the allowed PDU session list (See the example to be described in step 6 of FIG. 8).

The PDU session state indicates a PDU session available in the UE.

When the UE is located outside an available area of the LADN, the UE does not trigger a service request procedure for a PDU session corresponding to the LADN. Also, when the service request is triggered for other reasons, the UE does not include the PDU session in the list of PDU sessions to be activated.

When the UE is in the CM-CONNETED state, only a list of PDU sessions to be activated and a list of allowed PDU sessions may be included in the service request.

2) (R)AN to AMF signaling: (R)AN may transmit an N2 message to AMF. The N2 message may include N2 parameters, a service request, and a UE context request.

If the AMF cannot handle the service request, the AMF will reject the service request.

When NG-RAN is used, N2 parameter may include 5G-S-TMSI, the selected PLMN ID, location information, and establishment cause.

When the UE is in the CM-IDLE state, the NG-RAN may acquire 5G-S-TMSI in the RRC procedure. The NG-RAN may select AMF based on 5G-S-TMSI. The location information is related to a cell on which the UE camps.

Based on the PDU session state, the AMF may perform a PDU session release procedure for PDU sessions indicated by the UE that the PDU session ID is not available in the network.

3a) Signaling from AMF to (R)AN: AMF may transmit an N2 request to (R)AN. Here, the N2 request may include a security context, a handover restriction list, and a list of recommended cells/TAs/NG-RAN node identifiers.

When the 5G-AN requests for the UE context or the AMF needs to provide the UE context (e.g., when the AMF needs to initiate a fallback procedure for an emergency service), the AMF may initiate an NG application protocol (NGAP) procedure. For a UE in a CM-IDLE state, the 5G-AN stores security context in the UE AN context. The handover restriction list is related to mobility restrictions.

The 5G-AN uses the security context to protect messages exchanged with the UE.

When the NG-RAN node provides a list of recommended cells/TAs/NG-RAN node identifiers during the AN release procedure, the AMF may include the list of recommended cells/TAs/NG-RAN node identifiers in the N2 request. When the RAN determines to enable the RRC inactive state for the UE, the RAN may use this information to allocate a RAN notification area.

3) If the service request is not transmitted as being integrity protected or integrity protection verification failed, the AMF may initiate a NAS authentication/security procedure.

When the UE in the CM-IDLE state initiates a service request only for signaling connection, the UE and the network may exchange NAS signaling after successful establishment of the signaling connection, and steps 4 to 11 and steps 15 to 22 of FIGS. 7a to 7c may be omitted.

4) [Conditional Operation] Signaling from AMF to SMF: The AMF may transmit an Nsmf_PDUSession_UpdateSMContext Request to the SMF. Here, the Nsmf_PDUSession_UpdateSMContext Request may include a PDU session ID, operation type, UE location information, access type, RAT type, and UE presence in LADN service area.

Nsmf_PDUSession_UpdateSMContext Request is invoked in the following cases:
When the UE includes a list of PDU sessions to be activated in the service request message;
When this procedure is triggered by the SMF but a PDU session identified by the UE is correlated with a PDU session ID different from the PDU session ID that triggers this procedure;
When this procedure is triggered by the SMF but a current UE location is outside the "area of validity for the N2 SM information" provided by the SMF (see step 3a in FIG. 8). In this case, the AMF does not transmit the N2 information provided by the SMF (see step 3a in FIG. 8). If the current UE location is outside the "available area of N2 SM information", steps 4 to 11 are omitted.

If the DNN corresponds to the LADN, "the presence of the UE in the LADN service area" indicates whether the UE is inside (IN) or outside (OUT) the LADN service area. If the AMF does not provide an indication of "the presence of a UE in the LADN service area" and the SMF determines that the DNN corresponds to the LADN, the SMF considers the UE to be outside the LADN service area.

The AMF determines whether the PDU session(s) will be activated. In addition, the AMF transmits the Nsmf_P-DUSession_UpdateSMContext Request related to the PDU session to the SMF along with an operation type set to "UP active" to indicate establishment of the user plane resource for the PDU session. The AMF determines an access type and an RAT type based on a global RAN node ID related to an N2 interface.

If this procedure is triggered in response to a paging or NAS notification indicating non-3GPP access and the UE is not on the list (provided by the UE) of PDU sessions allowed in the paged or notified PDU session, the AMF may notify the SMF that the user plane for the PDU session cannot be reactivated. The service request procedure may be terminated without reactivation of the user plane for other PDU sessions in the list of allowed PDU sessions.

While the previous NAS signaling connection through the NG-RAN is maintained, the AMF may receive a service request through the NG-RAN to establish another NAS signaling connection. In this case, in order to release the previous NAS signaling connection, AMF may trigger an AN release procedure for the old NG-RAN according to the following logic:

For the PDU session indicated in the "list of PDU sessions to be activated", the AMF may request the SMF to immediately activate the PDU session by performing this step 4.

For a PDU session included in the "list of PDU session ID(s) with active N3 user plane" but not included in the "list of PDU sessions to be activated", the AMF may request the SMF to deactivate the PDU session.

5) If the PDU session ID corresponds to the LADN and the SMF determines that the UE is located outside the available area of the LADN based on the "UE presence in the LADN service area" provided by the AMF, the SMF may determine to perform the following actions (based on a local policy).

SMF may maintain the PDU session. However, the SMF may reject the activation of the user plane connection of the PDU session and notify the AMF accordingly. When the service request procedure is triggered by the network initiated service request of FIG. 8, the SMF may notify the UPF (UPF that has sent data notification) that the UPF should discard downlink data for the PDU session and/or should not provide an additional data notification message; or The SMF may release the PDU session: The SMF may release the PDU session and inform the AMF that the PDU session has been released.

In the above two cases, the SMF responds to the AMF with an appropriate reject cause, and user plane activation of the PDU session may be stopped.

When the SMF determines that the UE is located in the LADN available area, the SMF may check a UPF selection criterion based on the location information received from the AMF and determine to perform one of the following operations:

The SMF accepts the activation of the UP connection and may continue to use the current UPF;

When the UE moves outside the service area of the UPF (the UPF previously connected to the AN), the SMF, while maintaining the UPF acting as a PDU session anchor, may accept activation of the UP connection and select a new intermediate UPF (or may add/remove intermediate UPFs (I-UPF)). The steps to perform the addition/change/removal of the I-UPF are described below through conditional steps.

NOTE 1: When old and/or new I-UPF implements a UL uplink classifier (CL) or branching point (BP) function and a PDU session anchor for connectivity of local access to the data network, the signaling described in this figure is intended as signaling for adding, removing, or changing a PDU session anchor, and signaling for adding, releasing, or changing UL CL or BP, should be performed by a different procedure.

The SMF may reject activation of the UP connection of the PDU session in session and service continuity (SSC) mode 2. In addition, after the service request procedure, the SMF may trigger re-establishment of a PDU session in order to perform allocation of a new UPF (UPF acting as a PDU session anchor). (This operation may be performed, for example, when the UE is moved outside the service area of the anchor UPF connected to the NG-RAN)

6a) [Conditional operation] Signaling from SMF to new UPF (or new I-UPF): The SMF may transmit an N4 session establishment request to the UPF.

When the SMF selects a new UPF acting as an I-UPF for a PDU session or when the SMF chooses to insert an I-UPF for a PDU session (which did not have an I-UPF), the SMF may transmit a N4 session establishment request to the UPF. Here, the N4 establishment request provides packet detection to be installed in the I-UPF, data forwarding, enforcement, and reporting rules. PDU session anchor addressing information for a PDU session (PDU session anchor addressing information at an N9 reference point (a reference point between two UPFs)) is also provided to the I-UPF.

When a service request is triggered by the network, and the SMF selects a new UPF to replace the existing UPF (or the existing I-UPF), the SMF may include a data forwarding indication in the N4 session establishment request. The data forwarding indication may indicate to the UPF that second tunnel endpoint needs to be reserved for DL data buffered after being provided from the previous I-UPF.

6b) Signaling from new UPF (or I-UPF) to the SMF: The new UPF (or I-UPF) may transmit an N2 session establishment response (N4 Session establishment response) to the SMF.

The new I-UPF may transmit an N4 session establishment response to the SMF. When the UPF allocates CN tunnel information, the new I-UPF may transmit DL core network (CN) tunnel information for the UPF acting as a PDU session anchor and UL tunnel information of the new I-UPF to the SMF. When a data transfer indication is received, a new UPF (or I-UPF) operating as an N3 terminating point may transmit DL tunnel information of the new I-UPF to the SMF for data transmission from the existing UPF (or I-UPF) to the SMF. If the previous I-UPF resource exists, the SMF may drive a timer to be used in step 22a to release the corresponding resource.

7a) [Conditional operation] Signaling from SMF to UPF (PSA: PDU session anchor) signaling: SMF may transmit an N4 session modification request to the UPF.

When the SMF selects a new UPF to operate as an I-UPF for a PDU session, the SMF may transmit an N4 session modification request message to the PDU session anchor UPF to provide DL tunnel information received from the new I-UPF. When a new I-UPF is added for a PDU session, the UPF (PSA) may provide DL data to the new I-UPF as indicated in the DL tunnel information.

If a service request is triggered by the network and the SMF removes the existing I-UPF and does not replace the existing I-UPF with a new I-UPF, the SMF may include the data forwarding indication in the N4 session modification request. The data forwarding indication may indicate to the UPF (PSA) that the second tunnel endpoint needs to be reserved for buffered DL data received from the existing I-UPF. In this case, the UPF (PSA) may start buffering DL data that may be simultaneously received from the N6 interface.

7b) The UPF (PSA) may transmit an N4 session modification response message to the SMF.

When the UPF (PSA) receives the data forwarding indication, the UPF (PSA) becomes an N3 endpoint and the UPF (PSA) may transmit CN DL tunnel information for the previous UPF (or I-UPF) to the SMF. The SMF may start a timer. If the previous I-UPF resource exists, the SMF may drive a timer to be used in step 22a in order to release the corresponding resource.

When the UPF connected to the RAN is a UPF(PSA) and the SMF receives Nsmf_PDUSession_UpdateSMContext Request (including operation type set to "UP activate" to indicate establishment of user plane resource for the PDU session), if the SMF finds that the PDU session is active, the SMF may initiate an N4 session modification procedure to remove the AN tunnel information and remove the AN tunnel information from the UPF.

8a) [Conditional operation] Signaling from SMF to existing UPF (or I-UPF): The SMF may transmit N4 session modification (including new UPF address, new UPF DL tunnel ID) to the existing UPF (or I-UPF).

When a service request is triggered by the network and the SMF removes the existing UPF (or I-UPF), the SMF may transmit an N4 session modification request message to the existing UPF (or I-UPF) to provide DL tunnel information for buffered DL data. When the SMF allocates a new I-UPF, the DL tunnel information is received from a new UPF (or I-UPF) operating as an N3 endpoint. If the SMF does not allocate a new I-UPF, the DL tunnel information is transmitted from the UPF (PSA) operating as an N3 endpoint. The SMF may drive a timer for monitoring a forwarding tunnel as in step 6b or 7b.

When the SMF receives the Nsmf_PDUSession_UpdateSMContext Request of step 4 (including an operation type set to "UP activate" to instruct establishment of user plane resources for the PDU session), if the SMF knows that the PDU session has been activated, the SMF may remove the AN tunnel information to remove tunnel information of the AN in the UPF and may initiate an N4 session modification procedure.

8b) Signaling from the existing UPF (or I-UPF) to the SMF: The existing UPF (or I-UPF) may transmit an N4 session modification response message to the SMF.

9) [Conditional operation] Signaling from an existing UPF (or I-UPF) to a new UPF (or I-UPF): The existing UPF (or I-UPF) may deliver downlink data buffered with a new UPF (or I-UPF).

When the I-UPF is changed and a forwarding tunnel is established for a new I-UPF, the existing UPF (or I-UPF) transfers the buffered data to the new UPF (or I-UPF) operating as an N3 endpoint.

10) [Conditional operation] Signaling from the existing UPF (or I-UPF) to the UPF (PSA): The existing UPF (or I-UPF) may transfer buffered downlink data to the UPF (PSA).

When the existing I-UPF is removed, the new I-UPF is not allocated t the PDU session, and a forwarding tunnel is established for the UPF (PSA), the existing UPF (or I-UPF) may transfer the data buffered to the existing UPF (or I-UPF) to a new UPF (PSA) acting as an N3 endpoint.

11) [Conditional Operation] Signaling from SMF to AMF: SMF may transmit Nsmf_PDUSession_UpdateSMContext Response to AMF. Nsmf_PDUSession_UpdateSMContext Response may include N2 SM information (PDU session ID, QFI(s) (QoS Flow ID), quality of service (QoS) profile, CN N3 tunnel information, S-NSSAI, user plane security enforcement, UE integrity protection maximum data rate, and a cause. When the UPF connected to the RAN is UPF (PSA), the CN N3 tunnel information is UL tunnel information of UPF (PSA). When the UPF connected to the RAN is a new I-UPF, the CN N3 tunnel information is UL tunnel information of the I-UPF.

For the PDU session in which the SMF determines to accept the activation of the UP connection in step 5, the SMF may generate only N2 SM information and transmit an Nsmf_PDUSession_UpdateSMContext Response to the AMF to establish a user plane. The N2 SM information may include information to be provided by AMF to the NG-RAN. When the SMF determines to change the PSA UPF for the SSC mode 3 PDU session, the SMF may trigger a change of the SSC mode 3 PDU session anchor as an independent procedure after accepting UP activation of the PDU session.

The SMF may reject the activation of the UP of the PDU session by including the cause in the Nsmf_PDUSession_UpdateSMContext Response. The SMF may reject activation of the UP of the PDU session in the following cases, for example:

When the PDU session corresponds to the LADN and the UE is located outside the available area of the LADN as in step 5;

When the AMF informs the SMF that the UE is reachable only for a regulatory prioritized service and the PDU session to be activated is not for the regulatory prioritized service; or When the SMF determines to change the PSA UPF for the requested PDU session as in step 5. In this case, after the SMF transmits the Nsmf_PDUSession_UpdateSMContext Response, the SMF may perform another procedure to instruct the UE to re-establish the PDU session for SSC mode 2.

If the SMF receives a negative response in step 6b due to UPF resource unavailability.

When an EPS bearer ID is assigned to a PDU session, the SMF maps the EPS bearer ID and QFI to N2 SM information and transmits the same to the NG-RAN.

User plane security enforcement information is determined by the SMF during a PDU session establishment procedure. When integrity protection indicates "preferred" or "required", the SMF may also include UE integrity protection maximum data rate in the user plane security enforcement information.

12) Signaling from AMF to (R)AN: The AMF may transmit an N2 request to (R)AN. N2 request may include N2 SM information received from the SMF, security context, handover restriction list, subscribed UE-aggregate maximum bit rate (AMBR), MM NAS service acceptance (a list of recommended cells/TAs/NG-RAN node identifiers, and UE radio capability. Allowed NSSAI for the access type of the UE may be included in the N2 message.

When the UE triggers a service request while in the CM-CONNECTED state, only N2 SM information received from the SMF and MM NAS service acceptance may be included in the N2 request.

While the UE is in the CM-CONNECTED state, when a service request procedure is triggered by the network, only N2 SM information received from the SMF may be included in the N2 request.

When the service request procedure is triggered, the NG-RAN may store the security context and the NAS signaling connection Id for the UE in the CM-IDLE state. When the service request is not triggered by the UE only for the signaling connection, the RAN may store QoS information for a QoS flow of the activated PDU session, an N3 tunnel ID of the UE RAN context, and a handover restriction list.

MM NAS service acceptance may include a PDU session state of the AMF. During the session request procedure, certain local PDU session release may be notified to the UE through the PDU session state. The service acceptance message includes a PDU session reactivation result. The PDU session reactivation result provides an activation result for the PDU session of the allowed PDU session list which has generated a PDU session in the list of allowed PDU sessions and paging or NAS notification. If the PDU session reactivation result of the PDU session is failure, a cause of the failure may also be provided.

When there are a plurality of PDU sessions related to a plurality of SMFs, the AMF does not need to wait for a response from all SMFs in step 11. However, the AMF must wait for all responses from the plurality of SMFs before transmitting an MM NAS service acceptance message to the UE.

When step 12 is triggered for PDU session user plane activation, the AMF may include at least one N2 SM information received from the SMF in the N2 request. When there is additional N2 SM information received from the SMF, the AMF may include the additional N2 SM information received from the SMF in a separate N2 message (e.g., N2 tunnel setup request) and transmit the same. Alternatively, when a plurality of SMFs are involved, after all Nsmf_PDUSession_UpdateSMContext response service operations related to the UE are received from the SMF, the AMF may transmit one N2 request message to the (R)AN.

When the NG-RAN node provides a list of recommended cells/TAs/NG-RAN node identifiers during the AN release procedure, the AMF may include a list of recommended cells/TAs/NG-RAN node identifiers in the N2 request. When the NG-RAN determines to enable the RRC inactive state for the UE, the NG-RAN may use this information to allocate the RAN notification area.

The AMF based on the network configuration may include "RRC inactive assistance information" of the UE in the N2 request.

If possible, the AMF may include UE radio capability information in the N2 request and transmit the same to the NG-RAN node.

13) Signaling from (R)AN to UE: The NG-RAN may perform RRC connection reconfiguration with the UE. Specifically, the NG-RAN may perform RRC connection reconfiguration with the UE according to QoS information on all QoS flows of a data radio bearer and a PDU session in which the UP connection is activated. For the UE that was in the CM-IDLE state, if the service request is not triggered by the UE only for a signaling connection, user plane security may be established in this step. For the UE in the CM-IDLE state, when a service request is triggered by the UE only for signaling connection, the AS security context may be established in this step.

When the N2 request includes a NAS message, the NG-RAN may deliver the NAS message to the UE. The UE deletes the context of the PDU session that is not available in 5GC locally.

NOTE 2: The reception of the service acceptance message may not mean that the user plane radio resource has been successfully activated.

After the user plane radio resource is set up, uplink data from the UE may now be delivered to the NG-RAN. The NG-RAN may transmit uplink data to the UPF address and tunnel ID provided in step 11.

14) [Conditional operation] Signaling from (R)AN to AMF: The (R)AN may transmit acknowledgement for N2 request to the AMF. For example, the (R)AN may transmit an N2 request Ack to the AMF. Here, the N2 request Ack may include N2 SM information (including AN tunnel information, list of accepted QoS flows for the PDU sessions whose UP connections are activated and a list of rejected QoS Flows for the PDU Sessions whose UP connections are activated) and a PDU session ID.

The message including the N2 request Ack may include N2 SM information (e.g., AN tunnel information). When the AMF transmits a separate N2 message in step 11, the NG-RAN may respond to N2 SM information with a separate N2 message.

When a plurality of N2 SM messages are included in the N2 request message of step 12, the N2 request Ack may include a plurality of N2 SM information and information enabling the AMF to associate a response with a related SMF.

15) [Conditional operation] Signaling from AMF to SMF: The AMF may transmit an Nsmf_PDUSession_UpdateSM-Context request (including N2 SM information, RAT type, and access type) per PDU session to the SMF. The AMF may determine the access type and the RAT type based on the global RAN node ID associated with the N2 interface.

When the AMF receives the N2 SM information (one or more) in step 14, the AMF may deliver the N2 SM information to the related SMF per PDU session ID. When a UE time zone is changed compared to a previously reported UE time zone, the AMF may include UE time zone information element (IE) in the Nsmf_PDUSession_UpdateSMContext request.

16) [Optional action] Signaling from SMF to PCF: When dynamic PCC is distributed, SMF performs SMF initiated SM policy modification procedure to initiate notification of new location information to the PCF (if subscribed). The PCF may provide updated policies.

17a) [Conditional operation] Signaling from the SMF to new I-UPF: The SMF may transmit an N4 session modification request to a new I-UPF. The N4 session modification request may include AN tunnel information and a list of accepted QFIs.

When the SMF selects a new SMF to operate as an I-UPF for the PDU session in step 5, the SMF may initiate an N4 session modification procedure for the new I-UPF and provide AN tunnel information. Downlink data from the new I-UPF may be delivered to the NG-RAN and UE.

17b) [Conditional Operation] Signaling from UPF to SMF: The UPF may transmit an N4 session modification response to the SMF.

18a) [Conditional operation] Signaling from SMF to UPF (PSA): The SMF may transmit an N4 session modification request to UPF (PSA). The N4 session modification request may include AN tunnel information and a list of rejected QoS flows.

If the user plane is set up or modified and if there is no I-UPF after modification, the SMF may initiate the N4 session modification procedure for the UPF (PSA) and provide AN tunnel information. Downlink data from the UPF (PSA) may now be delivered to the NG-RAN and UE.

For QoS flows in the list of rejected QoS flows, the SMF may instruct the UPF to remove rules related to the corresponding QoS flow (e.g., packet detection rules, etc.).

18b) [Conditional operation] Signaling from UPF to SMF: The UPF may transmit an N4 session modification response to the SMF.

19) [Conditional operation] Signaling from SMF to AMF: The SMF may transmit an Nsmf_PDUSession_UpdateSM-Context response to the AMF.

20a) [Conditional operation] Signaling from SMF to new UPF (or I-UPF): The SMF may transmit an N4 session modification request to a new UPF (or I-UPF).

When the forwarding tunnel is established for the new I-UPF and when the timer set by the SMF for the forwarding tunnel in step 8a expires, the SMF may transmit an N4 session modification request to the new UPF (or I-UPF) operating as an N3 endpoint to release the forwarding tunnel.

20b) [Conditional operation] Signaling from new UPF (or I-UPF) to SMF: The new UPF (or I-UPF) may transmit an N4 session modification response to the SMF.

The new UPF (or I-UPF) operating as the N3 endpoint may transmit an N4 session modification response to the SMF.

21a) [Conditional operation] Signaling from SMF to UPF (PSA): The SMF may transmit an N4 session modification request to the UPF (PSA).

When the forwarding tunnel is established for the UPF (PSA) and when the timer set by the SMF for the forwarding tunnel in step 7b expires, the SMF may transmit an N4 session modification request to the UPF (PSA) operating as the N3 endpoint to release the forwarding tunnel.

21b) [Conditional operation] Signaling from UPF (PSA) to SMF: UPF (PSA) may transmit an N4 session modification response to the SMF.

UPF (PSA) operating as an N3 endpoint may transmit an N4 session modification response to the SMF.

22a) [Conditional operation] Signaling from SMF to previous UPF: The SMF may transmit an N4 session modification request or an N4 session release request to the previous UPF.

When the SMF determines to continue to use the previous UPF in step 5, the SMF may transmit the N4 session modification request to the previous UPF and provide AN tunnel information.

When the SMF selects a new UPF operating as an I-UPF in step 5 and the previous UPF is not a PSA UPF, the SMF may initiate resource release by transmitting an N4 session release request (including release cause) to the previous I-UPF after the timer in step 6b or 7b expires.

22b) Signaling from previous I-UPF to the SMF: The previous I-UPF may transmit an N4 session modification response or an N4 session release response to the SMF.

The previous UPF checks the modification or release of resources through a N4 session modification response or a N4 session release response.

An example of the UE initiated service request procedure is the same as steps 1 to 22b described above.

For mobility-related events, the AMF may invoke an Namf_EventExposure_Notify service operation after step 4.

When Namf_EventExposure_Notify is received with an indication that the UE is reachable, if the SMF has pending DL data, the SMF may invoke the Namf_Communication_N1N2MessageTransfer service operation for the AMF to establish a user plane for the PDU session. In other cases, the SMF may resume transmitting the DL data notification to the AMF in the case of DL data.

FIG. 8 is a Signal Flowchart Illustrating an Exemplary Network Initiated Service Request Procedure.

The network initiated service request procedure is used when there is a need for activating a user plane for the PDU session to transfer signaling (e.g., N1 signaling to the UE, mobile-terminated short message service (SMS)), mobile terminating (a destination of data is UE) user data with the UE.

When the network initiated service request procedure is triggered by a short message service function (SMSF), PCF, location management function (LMF), gateway mobile location center (GMLC), NEF or UDM, the SMF in FIG. 8 may be replaced by a corresponding NF. For example, when the network initiated service request procedure is triggered by the PCF, the PCF may perform operations performed by the SMF of FIG. 8.

When the UE is in the CM-IDLE state or the CM-CONNECTED state in 3GPP access, the network initiates a network service request procedure.

When the UE is in the CM-IDLE state and asynchronous type communication is not activated, the network may transmit a paging request to the (R)AN/UE. The paging request triggers a UE initiated service request procedure in the UE. When asynchronous type communication is activated, the network stores the received message, and when the UE enters the CM-CONNECTED state, the network may transfer the received message to the (R)AN and/or the UE.

When the UE is in the CM-IDLE state in non-3GPP access and the UE is simultaneously registered for 3GPP access and non-3GPP access in one public land mobile network (PLMN), the network may initiate the network initiated service request procedure via 3GPP access.

When the UE is in the CM-IDLE state in 3GPP access, in the CM-CONNECTED state in non-3GPP access, and the UE is simultaneously registered for 3GPP access and non-3GPP access in one PLMN, the network may initiate the network initiated service request procedure through 3GPP access.

In the network initiated service request procedure, both SMF and UPF belong to a PLMN serving the UE. For example, in a home routed roaming case, the SMF and UPF of a HPLMN are not affected by a service request procedure (that is, the SMF and UPF of the HPLMN are not involved in the service request procedure).

The procedure of FIG. 8 deals with a non exhaustive list of use-cases for 3GPP access as follows (detailed conditions to which each step is applied are described in the procedure below):

When the SMF needs to set up an N3 tunnel in order to deliver a downlink packet for a PDU session to the UE and the UE is in the CM-IDLE state: Step 3a includes an N2 message and step 4b (paging) may be performed.

When the SMF needs to set up an N3 tunnel in order to deliver a downlink packet for a PDU session to the UE and the UE is in a CM-CONNECTED state: Step 3a includes an N2 message and step 4a (UP activation) may be performed.

If an NF (e.g., SMF, SMSF, LMF or NEF) needs to transmit an N1 message to the UE and the UE is in the CM-IDLE state: Step 3a includes an N1 message, step 3b includes a cause "Attempting to reach UE", and step 4b (paging) occurs.

When the NF (e.g., SMSF, PCF, or UDM) triggers the AMF to set up a NAS connection with the UE and the UE is in the CM-IDLE state: Trigger differ according to procedures, step 4b (paging) is occurs.

1) When the UPF receives downlink data for the PDU session and AN tunnel information for the PDU session is not stored in the UPF, the UPF may buffer the downlink data or transfer the downlink data to the SMF based on an instruction received from the SMF.

2a) Signaling from the UPF to the SMF: The UPF may transmit a data notification to the SMF. The data notification may include an N4 session ID, information for identifying a QoS flow for a DL data packet, and DSCP.

When the first downlink data for a certain QoS flow arrives, if the SMF has not previously informed the UPF not to transmit a data notification to the SMF, the UPF may transmit a data notification message to the SMF. For reference, if the SMF previously informs the UPF not to transmit the data notification to the SMF, follow-up steps may be omitted.

When the UPF receives a downlink data packet for a different QoS flow in the same PDU session, the UPF may transmit another data notification message to the SMF.

When a paging policy differentiation feature is supported by the UPF and a PDU session type is IP, the UPF may include a DSCP of a TOS (Type of Service)(IPv4)/TC (Traffic Class)(IPv6) received from an IP header of the downlink data packet and information for identifying QoS flows for DL data packets in the data notification.

2b) Signaling from SMF to UPF: A data notification Ack may be transmitted.

2c) When the SMF instructs the UPF that it will buffer the data packet, the UPF may deliver the downlink data packet to the SMF.

When the paging policy differentiation feature is supported by the SMF, the SMF may determine a paging policy indication based on the DSCP of the TOS (IPv4)/TC (IPv6) value received from the IP header of the downlink data packet and identify a QFI of the QoS flow for the DL data packet.

3a) [Conditional operation] i) Signaling from SMF to AMF: The SMF may transmit a Namf_Communication_N1N2MessageTransfer (including SUPI, PDU session ID, N2 SM information (including QFI(s), QoS profile(s), CN N3 tunnel information, S-NS-SAI, and paging policy indication), area of validity for N2 SM information, ARP (Allocation and Retention Priority) including paging policy indication, 5QI and N1N2TransferFailure notification target address) to the AMF. Or, ii) signaling from NF to AMF: NF may transmit Namf_Communication_N1N2MessageTransfer (including SUPI and N1 messages) to the AMF.

Upon receiving the data notification message, the SMF may perform an operation to support the LADN for a PDU session corresponding to the LADN. The SMF may notify the UPF that transmitted the data notification to discard downlink data for the PDU session and/or not to provide an additional data notification message.

In other cases, the SMF may determine whether to contact the AMF. The SMF may not contact the AMF in the following cases:

If the SMF previously notified that the UE is unreachable; or

If the UE is reachable only for a regulatory prioritized service and the PDU session is not a regulatory prioritized service.

The SMF determines the AMF, and the SMF may invoke Namf_Communication_N1N2MessageTransfer to the AMF by including the PDU session ID derived from the N4 session ID received in step 2a.

If the SMF receives any additional data notification message or downlink data packet while waiting for the user plane connection to be activated and if the SMF buffers a data packet for a QoS flow related to a priority (e.g., ARP priority level) higher than the priority related to the previous data notification message or downlink data packet, the SMF may invoke a new Namf_Communication_N1N2MessageTransfer indicating a higher priority ARP and PDU session ID to the AMF.

When the SMF receives a message from a new AMF (not the AMF to which the SMF previously called theNamf_Communication_N1N2MessageTransfer), while waiting for the user plane connection to be activated, the SMF may re-invoke Namf_Communication_N1N2MessageTransfer to the new AMF.

When supporting paging policy differentiation, the SMF may show a 5QI related to QFI of step 2a, packet received in step 2c, or a paging policy indication related to downlink data received from ARP or UPF or downlink data triggered a data notification message in the Namf_Communication_N1N2MessageTransfer.

NOTE 1: The AMF may receive a request message to perform signaling to the UE/RAN (e.g., network-initiated deregistration, SMF initiated PDU session modification, etc.) from other network functions (NFs). When the UE is in the CM-CONNECTED state and the AMF delivers only an N1 message to the UE, the flow continues in step 6 below.

N2 SM information is optional. For example, when the SMF intends to transmit a PDU session modification command only to update the UE to the PCO, N2 SM information may be optional.

3b) [Conditional operation] The AMF may respond to the SMF.

If the UE is in the CM-IDLE state for the AMF and the AMF may page the UE, the AMF may directly transmit a Namf_Communication_N1N2MessageTransfer response to the SMF with the cause "Attempting to reach UE". The cause "Attempting to reach UE" may indicate to the SMF that the N2 SM information provided in step 3a may be ignored by the AMF if the UE is reachable and that the SMF is requested to provide the N2 SM information again.

While waiting for the UE to respond to the previous paging request, when the AMF receives a Namf_Communication_N1N2MessageTransfer request message having the same priority or lower priority as the previous message triggering paging or when the AMF determines not to trigger an additional paging request for the UE based on a local policy, the AMF may reject the Namf_Communication_N1N2MessageTransfer request message.

When the UE is in the CM-CONNETED state in the AMF, the AMF may immediately transmit a Namf_Communication_N1N2MessageTransfer response to the SMF with a "N1/N2 transfer success" cause.

If the UE is in the CM-IDLE state and the AMF determines that the UE is not reachable for paging, the AMF may transmit a Namf_Communication_N1N2MessageTransfer response to the SMF or other network functions (NF transmitting the request message to the AMF in step 3a). Alternatively, the AMF may perform asynchronous type communication and store UE context based on the received message. When asynchronous type communication is invoked, when the UE is reachable (e.g., when the UE enters the CM-CONNECTED state), the AMF may initiate communication with the UE and the (R)AN.

When the AMF determines that the UE is not reachable for the SMF (e.g., as the UE is in a mobile initiated connection only (MICO) mode or the UE is registered only through non-3GPP access and the UE is in the CM-IDLE state), the AMF may reject the request from the SMF. When the SMF does not subscribe to a UE reachability event, the AMF may include an indication (indication that the SMF does not need to trigger a Namf_Communication_N1N2MessageTransfer request for the AMF) in the rejection message. The AMF may store the indication that the SMF has been informed that the UE is not reachable.

When the UE is not in the MICO mode and the AMF detects that the UE is in a non-allowed Area, the AMF may reject a request from the SMF and notify the SMF that the UE is reachable only for the regulatory prioritized service, unless the request from the SMF is for the regulation priority service. The AMF may store the indication that the SMF has been informed that the UE is only reachable for the regulatory prioritized service.

If a registration procedure with an AMF change is in progress when a previous AMF receives Namf_Communication_N1N2MessageTransfer, the previous AMF may reject the request with an indication that Namf_Communication_N1N2MessageTransfer has been temporarily rejected.

When a Namf_Communication_N1N2MessageTransfer response is received with the indication that the request has been temporarily rejected, the SMF may start a locally set guard timer and may wait until a random message comes from the AMF. When a message from the AMF is received, the SMF may re-call Namf_Communication_N1N2MessageTransfer (together with N2 SM information) to the AMF that transmitted the message. In other cases, the SMF may perform step 3a when the guard timer expires. If the SMF determines that control region buffering is applied, the SMF may request the UPF to start transmitting a downlink data PDU to the SMF.

3c) [Conditional operation] SMF may respond to UPF. For example, the SMF may transmit a failure indication to the UPF.

The SMF may notify the UPF of a user plane setup failure.

When the SMF receives an indication that the UE is not reachable or that the UE is reachable only for the regulation priority service from the AMF, the SMF may perform the following operation based on the network policy:

The SMF may instruct the UPF to stop sending data notifications;

The SMF may instruct the UPF to stop buffering the DL data and discard the buffered data;

The SMF may instruct the UPF to stop sending data notifications, stop buffering DL data, and discard the buffered data; or While the UE is not reachable, the SMF suppresses transmitting an additional Namf_Communication_N1N2MessageTransfer message for DL data.

Based on the operator policy, the SMF may apply a suspension of the charging procedure.

When the SMF receives an indication from the AMF that the Namf_Communication_N1N2MessageTransfer requested by the SMF has been temporarily rejected, the SMF may instruct the UPF to apply temporary buffering based on the network policy.

4a) [Conditional operation] When the UE is in the CM-CONNECTED state in the access related to the PDU session ID received from the SMF in step 3a, steps 12 to 22 of FIGS. 7a to 7c may be performed without transmitting a paging message to the (R)AN node and the UE to activate the user plane connection for the PDU session (e.g., radio resources and N3 tunnels may be established). In step 12 of FIGS. 7a to 7c, the AMF may not transmit a NAS service acceptance message to the UE. Parts other than steps 12 to 22 of FIGS. 7a to 7c may be omitted.

4b) [Conditional operation] Even when the UE is in the CM-IDLE state in 3GPP access, the PDU session ID received from the SMF in step 3a is related to the 3GPP access, and the UE is in the CM-CONNECTED state for non-3GPP access, if the AMF determines to notify the UE through 3GPP access based on the local policy, the AMF may transmit a paging message to the NG-RAN node through 3GPP access.

When the UE is simultaneously registered through 3GPP access and non-3GPP access in the same PLMN, the UE is in the CM-IDLE state in 3GPP access and non-3GPP access mode, and the PDU session ID of step 3a is related to the non-3GPP access, the AMF may transmit a paging message related to the access "non-3GPP" to the NG-RAN node through 3GPP access.

When the UE is in RM (Registration Management)-REGISTERED state and CM-IDLE state and the UE is reachable in 3GPP access, the AMF may transmit a paging message (including NAS ID for paging, registration area list, paging DRX length, paging priority indication, and access associated to the PDU session) to the (R)AN node belonging to the registration area in which the UE is registered. When the paging message is received from the AMF, the NG-RAN node may page the UE by including access related to the PDU session in the paging message.

For reference, two RM states of an RM-DEREGISTERED state and an RM-REGISTERED state are used in the UE and the AMF to reflect the registration state of the UE in the PLMN.

When supporting paging policy differentiation, the paging strategy may be set in the AMF for different combinations of DNN, paging policy indication, ARP, and 5QI.

For the RRC-inactive state, a paging strategy may be set in (R)AN for other combinations of paging policy indication, ARP, and 5QI.

The paging priority indication may be included only in the following cases:

When the AMF receives a Namf_Communication_N1N2MessageTransfe message including an ARP value related to priority services (e.g., MPS, MCS) set by an operator.

One paging priority level may be used for multiple ARP values. Mapping of the ARP value for the paging priority level may be set in the AMF and NG-RAN according to an operator policy.

The (R)AN may prioritize paging of the UE according to the paging priority indication (or paging policy indicator).

While waiting for a response from the UE to the paging request message transmitted without a paging priority indication (or paging policy indicator), if the AMF receives a Namf_Communication_N1N2MessageTransfer message indicating an ARP value related to the priority service (e.g., MPS, MCS) set by the operator, the AMF may transmit another paging message together with an appropriate paging priority (or paging policy indicator). For the Namf_Communication_N1N2MessageTransfer message received later having the same priority or higher priority, the AMF may determine whether to transmit a paging message with an appropriate paging priority based on the local policy.

Paging strategies may include the following:

Paging retransmission scheme (e.g., how often paging is repeated or at what time interval paging is repeated);

Determine whether to transmit a paging message to the (R)AN node during specific AMF high load conditions;

Whether to apply sub-area-based paging (e.g., first paging in the last known cell-id or TA and retransmission in all registered TAs)

NOTE 2: Setting a paging priority (or paging policy indicator) in the paging message is independent of any paging strategy.

In order to reduce the signaling load and network resources used to successfully page the UE, the AMF and (R)AN may support additional paging optimization using at least one or more of the following means:

By the AMF implementing specific paging strategies (e.g., the AMF may send an N2 paging message to the (R)AN node that has recently served the UE);

By that AMF taking into account information (information on recommended cells and NG-RAN nodes) on recommended cells and NG-RAN nodes provided by (R)AN when switching to the CM-IDLE state. The AMF may determine the (R)AN node to be paged by considering the (R)AN node-related part of the information, include the information on the recommended cells in the N2 paging message, and provide the information to each of the (R)AN nodes;

By the (R)AN taking into account paging attempt count information provided by the AMF in paging.

When the UE radio capability for paging information is available in the AMF, the AMF may include the UE radio capability for paging information in the N2 paging message and transmit the corresponding N2 paging message to the (R)AN node.

When information on recommended cells and NG-RAN nodes are available in the AMF, the AMF may determine the (R)AN node for paging in consideration of the information, and when paging the (R)AN node, the AMF may transparently transmit the information on the recommended cell to the (R)AN node.

The AMF may include paging attempt count information in the N2 paging message. The paging attempt count information may be the same for all (R)ANs selected for paging by the AMF.

4c) [Conditional operation] When the UE is simultaneously registered for 3GPP access and non-3GPP access in the same PLMN, the UE is in the CM-CONNECTED state in 3GPP access, and the PDU session ID of step 3a is associated with the non-3GPP access, the AMF may transmit a NAS notification message including a non-3GPP access type to the UE through 3GPP access and may set a notification timer. When step 4c is performed, step 5 may be omitted.

When the UE is simultaneously registered for 3GPP access and non-3GPP access in the same PLMN, the UE is in the CM-IDL state in 3GPP access and in the CM-CONNECTED state in non-3GPP access, the PDU session ID of step 3a is associated with 3GPP access, and the AMF determines to notify the UE through the non-3GPP access based on the local policy, the AMF may transmit a NAS notification message including the 3GPP access type to the UE through the non-3GPP access and set a notification timer.

5) [Conditional operation] Signaling from AMF to SMF: The AMF may transmit a notification related to failure of Namf_Communication_N1N2Transfer to the SMF. For example, the AMF may transmit a Namf_Communication_N1N2TransferFailure notification to the SMF.

The AMF oversees the paging procedure using a timer. If the AMF fails to receive a response with respect to the paging request message from the UE, the AMF may apply additional paging according to any available paging strategy described in step 4b.

If the UE does not respond to the paging, the AMF sends a Namf_Communications_N1N2MessageTransfer Failure notification to a notification target address provided by the SMF in step 3a to the SMF to notify the SMF unless the AMF recognizes an ongoing MM procedure that prevents the UE from responding to the SMF. Here, the AMF recognizes the ongoing MM procedure that prevents the UE from responding may be a case in which, for example, the AMF receives an N14 context request message indicating that the UE performs a registration procedure with another AMF.

When the Namf_Communication_N1N2TransferFailure notification is received, the SMF may notify the UPF.

6) When the UE is in the CM-IDLE state in 3GPP access and a paging request for a PDU session related to 3GPP access is received, the UE may initiate the UE initiated service request procedure described in FIGS. 7a to 7c. In step 4 of FIG. 8A, the AMF may call a Nsmf_PDUSession_UpdateSMContext request associated with a PDU session identified in the service request message (excluding the PDU session for the PDU session ID included in Namf_Communication_N1N2MessageTransfe in step 3a of FIG. 8) to the SMF. To support the transfer of buffered data, the SMF may instruct the UPF to establish a data transfer tunnel between the old UPF and the new UPF or PSA as described in steps 6a, 7a, and 8b of FIG. 8A.

When the UE is in the CM-IDLE state in both non-3GPP access and 3GPP access and receives a paging request for a PDU session associated with non-3GPP access, the UE may initiate the UE initiated service request procedure described in FIGS. 7a to 7c. Here, the UE initiated service request procedure may include a list of allowed PDU sessions that may be re-activated through 3GPP access according to the UE policy and whether an S-NSSAI of the PDU session is included in the allowed NSSAI for 3GPP access. If there is no PDU session that may be re-activated through 3GPP access, the UE may include a list of empty allowed PDU sessions. When the AMF receives a service request message from the UE through the non-3GPP access (e.g., due to the UE successfully connecting to the non-3GPP access), the AMF may stop the paging procedure and process the received service request procedure. When the AMF receives the service request message and the list of allowed PDU sessions provided by the UE does not include the PDU session for the UE that has been paged, the AMF may invoke the Namf_EventExposure_Notify service to notify the SMF that the UE is reachable but did not accept re-activation of the PDU session.

When the UE is in the CM-IDLE state in non-3GPP access and in the CM-CONNECTED state in 3GPP access, upon receiving the NAS notification message including the non-3GPP access type through 3GPP access, the UE may initiate UE initiated service request procedure described in FIGS. 7a to 7c. Here, the UE initiated service request procedure may include a list of allowed PDU sessions that may be re-activated through 3GPP access according to the UE policy and whether the S-NSSAI of this PDU session is included in the allowed NSSAI for 3GPP access. If there is no PDU session that may be re-activated through 3GPP access, the UE may include a list of empty allowed PDU sessions. When the AMF receives the service request message and the list of the allowed PDU sessions provided by the UE does not include a PDU session for the UE that has been notified, the AMF may call the Namf_EventExposure_Notify service to notify the SMF that the UE is reachable but did not accept re-activation of the PDU session. When the AMF receives the service request message from the UE through non-3GPP access, the AMF may stop the notification timer and process the received service request procedure.

When the UE is in the CM-IDLE state in 3GPP access and in the CM-CONNECTED state in non-3GPP access, upon receiving the NAS notification identifying the 3GPP access type through the non-3GPP access, the UE may initiate the UE initiated service request procedure described in FIGS. 7a to 7c through 3GPP access if the 3GPP access is available. If the AMF does not receive the service request message before the notification timer expires, the AMF may page the UE through 3GPP access or notify the SMF that the UE was unable to re-activate the PDU session.

7) The UPF may transmit buffered downlink data to the UE through the (R)AN node that has performed the service request procedure.

The network may transmit downlink signaling when a network initiated service request procedure is initiated according to a request from another network described in step 3a.

<Connection Management (CM)>

The CM is used to establish or release a signaling connection between the UE and the AMF. For example, the CM includes the function of establishing and releasing the NAS signaling connection between the UE and the AMF through the N1 reference point. The NAS signaling connection enables NAS signaling exchange between the UE and the core network.

NAS signaling connection may include AN signaling connection (RRC connection over 3GPP access or connection between UE and N3IWF over non-3GPP access) between AN (Access Network) and UE and N2 connection for UE between AN and AMF.

The two CM states are used to reflect the NAS signaling connection between the UE and the AMF. The two CM states are:
  CM-IDLE
  CM-CONNECTED The CM status for 3GPP access and the CM status for non-3GPP access may be independent of each other. For example, the UE may be in a CM-IDLE state for 3GPP access and a CM-CONNECTED state for non-3GPP access.

Hereinafter, the CM-IDLE state, the CM-CONNECTED state, and the transition between the CM-IDLE state and the CM-CONNECTED state will be described.

1. CM-IDLE State

The UE in the CM-IDLE state does not have a NAS signaling connection with the AMF through the N1 interface. The UE may perform a cell selection or cell reselection procedure and a PLMN selection procedure.

For a UE in CM-IDLE state, there are no AN signaling connections, N2 connections and N3 connections. When the UE is in the CM-IDLE state and the RM (Registration Management)-REGISTERED state, the UE may perform the following operations:
  As long as the UE is not in Mobile Initiated Connection Only (MICO) mode, the UE may respond to paging by performing a service request procedure.
  When the UE has uplink signaling or user data to transmit, it may perform a service request procedure.

If the UE state in the AMF is RM-REGISTERED, UE information for initiating communication with the UE may be stored in the AMF. The AMF may use 5G-GUTI (Globally Unique Temporary Identifier) to retrieve stored information required to initiate communication with the UE.

The UE may provide 5G-Short-Temporary Mobile Subscriber Identity (5G-S-TMSI) as a part of AN parameters while performing a procedure for AN signaling connection establishment. Whenever an AN signaling connection is established between the UE and the AN (when entering the RRC Connected state through 3GPP access, or when establishing a connection between the UE and N3IWF through non-3GPP access), the UE may enter the CM-CONNECTED state.

Transmission of the Initial NAS message initiates the transition from the CM-IDLE state to the CM-CONNECTED state. Here, the initial NAS message may be, for example, a registration request message, a service request message, or a deregistration request message.

If the UE state in the AMF is CM-IDLE and RM-REGISTERED, the AMF may perform the following operation:
  When the AMF has mobile-terminated data or signaling to be transmitted to the UE, the AMF may perform a network triggered Service Request procedure by transmitting a paging request message to the UE. AMF may perform the network initiation service request procedure, except when the UE cannot respond due to MICO mode or mobility restrictions.

Whenever an N2 connection is established between the AN and the AMF for the UE, the AMF may enter the CM-CONNECTED state for the UE. Reception of the initial N2 message (eg, N2 INITIAL UE MESSAGE) initiates the transition from the CM-IDLE state to the CM-CONNECTED state in the AMF.

When the UE and the AMF are in the CM-IDLE state, for example, by activating the MICO mode, power efficiency and signaling efficiency may be optimized.

2. CM-CONNECTED State

The UE in the CM-CONNECTED state has a signaling connection with the AMF through the N1 reference point. NAS signaling connection may use RRC connection between UE and NG-RAN and New Generation Application Protocol (NGAP) UE association between AN and AMF for 3GPP (NGAP UE association). The UE may be in a CM-CONNECTED state with an NGAP UE association that is not bound to any TNLA (Transport Network Layer Association) between the AN and the AMF. When the NAS signaling procedure is completed, the AMF may decide to release the NAS signaling connection with the UE.

In the CM-CONNECTED state, the UE may perform the following operations:

whenever the AN signaling connection is released (for example, when entering RRC Idle state via 3GPP access, or when it is detected by the UE that the connection between the UE and N3IWF via non-3GPP access is disconnected), the UE may enter the CM-IDLE state.

When the UE CM state in the AMF is the CM-CONNECTED state, the AMF may perform the following operations:

When the AN release procedure is completed, if the logical NGAP signaling connection for the UE and the N3 user plane connection are released, the AMF may enter the CM-IDLE state for the UE.

Until the UE is de-registered from the core network, the AMF may maintain the UE CM state in the AMF in the CM-CONNECTED state.

The UE in the CM-CONNECTED state may be in the RRC deactivation state. If the UE is in RRC deactivation state, the following applies:

UE reachability is managed by the RAN, along with assistance information from the core network,
UE paging is managed by the RAN.
The UE manages paging using the UE's CN (5G-S-TMSI) and RAN identifier 3. Transition Between CM-IDLE State and CM-CONNECTED State Based on the above description of the CM-IDLE state and the description of the CM-CONNECTED state, an example of transition between the CM-IDLE state and the CM-CONNECTED state will be described.

When the CM state in the UE is the CM-IDLE state, when the AN signaling connection is established (eg, when the UE transmits an initial NAS message), the CM state is switched to the CM-CONNECTED state. If the CM state in the UE is in the CM-CONNECTED state, when the AN signaling connection is released, the CM state is changed to the CM-IDLE state.

If the CM state for the UE in the AMF is the CM-IDLE state, when the N2 context is established, the CM state is switched to the CM-CONNECTED state. If the CM state for the UE in the AMF is the CM-CONNECTED state, when the N2 context is released, the CM state is switched to the CM-IDLE state.

<RRC State>

In LTE, RRC state includes RRC_IDLE state and RRC_CONNECTED state. In 5G, the RRC state may include an RRC_IDLE state, an RRC_CONNECTED state, and an RRC_INACTIVE state. That is, the RRC_INACTIVE state is newly defined in 5G.

The RRC_INACTIVE state may mean an RRC state in which the UE (eg, UE) is a Connected state in the core network, but is an IDLE state in radio aspect between the UE and the NG-RAN. For example, when the terminal is in the RRC_INACTIVE state, the terminal is in a state in which the RRC connection is released from the side of the radio, the terminal is in the MM (Mobility Management)-REGISTERED state, and in the CM (Connection Management)_CONNECTED state from the side of the core network.

When the RRC_INACTIVE state is used, when the terminal is switched from the RRC_INACTIVE state to the RRC_CONNECTED state, the core can provide a connection to the terminal quickly without the need for signaling that occurs when transitioning to the CONNECTED state. In addition, in radio aspect between the terminal and the NG-RAN, radio resources can be prevented from being wasted unnecessarily, so that radio resources can be efficiently used.

Hereinafter, a procedure for the UE to switch from the RRC_IDLE state to the RRC_CONNECTED state will be described with reference to FIG. 9.

Figure 9:
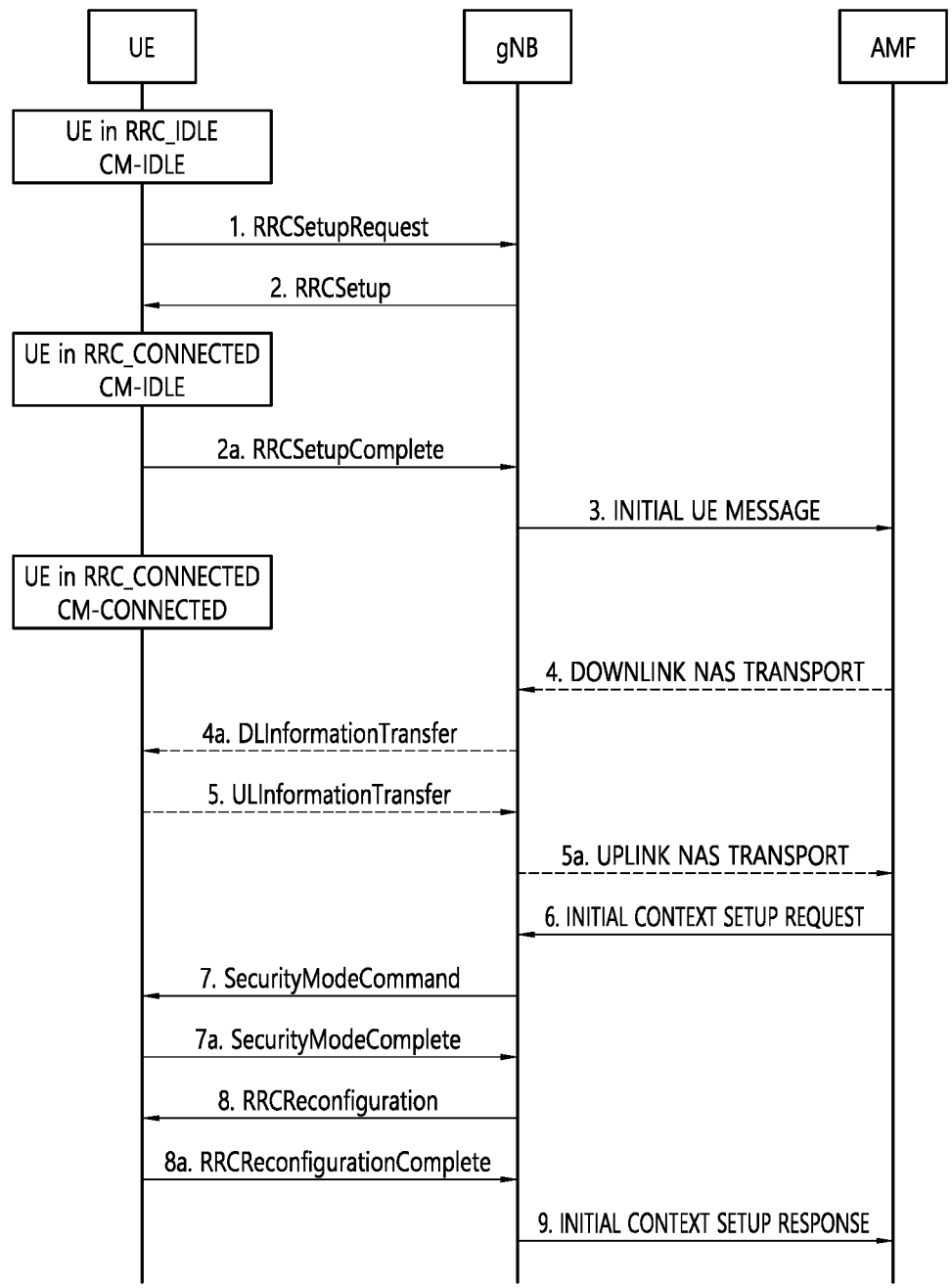
FIG. 9 is a diagram illustrating an example of a procedure for switching from RRC_IDLE triggered by a UE to RRC_CONNECTED.

FIG. 9 is a Diagram Illustrating an Example of a Procedure for Switching from RRC_IDLE Triggered by a UE to RRC_CONNECTED.

An example of a procedure for transition the RRC state of the UE from the RRC_IDLE state to the RRC_CONNECTED state will be described with reference to FIG. 9. That is, UE triggered transition from RRC_IDLE to RRC_CONNECTED will be described.

In the example of FIG. 9, a UE (eg, UE) may be in an RRC_IDLE state and may be in a CM-IDLE state.

1) In the RRC_IDLE state, the UE may transmit a request to the gNB to establish a new connection. For example, the UE may transmit an RRC setup request message (RRCSetupRequest message) to the gNB.

2 and 2a) The gNB may complete the RRC setup procedure. For example, the gNB may transmit an RRC setup message (eg, an RRCSetup message) to the UE. Upon receiving the RRCSetup message from the gNB, the UE may be in the RRC_CONNECTED state. The UE may transmit an RRC setup complete message (eg, an RRCSetupComplete message) to the gNB. The RRC setup complete message (eg, RRCSetupComplete message) may include a NAS message transmitted by the UE.

3) The first NAS message from the UE piggybacked to the RRC setup complete message (eg, RRCSetupComplete message) may be transmitted to the AMF. For example, the gNB may transmit an initial UE message (eg, INITIAL UE MESSAGE) including a NAS message transmitted by the UE to the AMF.

4, 4a, 5 and 5a) Additional NAS messages may be exchanged between the UE and the AMF. For example, the NAS may transmit a DOWNLINK NAS TRANSPORT message to the gNB. Then, the gNB may transmit a downlink information transfer message (eg, a DLInformationTransfer message) to the UE. The UE may transmit an uplink information transfer message (eg, a ULInformationTransfer message) to the gNB. Then, the gNB may transmit the UPLINK NAS TRASNPORT message to the AMF.

6) AMF may prepare UE context data. The UE context data may include information about a PDU session context, a security key, a UE radio capability, and a UE security capability (UE Security Capabilities), etc. In addition, the AMF may transmit an initial context setup request message (eg, an INITIAL CONTEXT SETUP REQUEST message) including UE context data to the gNB.

7 and 7a) gNB may activate AS security with UE. For example, the gNB may send a security mode command message (SecurityModeCommand message) to the UE. Then, the UE may transmit a security mode complete message (SecurityModeComplete message) to the gNB.

8 and 8a) The gNB may perform reconfiguration to set up Signaling Radio Bearer 2 (SRB2) and Data Radio Bearers (DRB). For example, the gNB may transmit an RRC reconfiguration message (eg, an RRCReconfiguration message) to the UE. Then, the UE may transmit an RRC reconfiguration complete message (eg, an RRCReconfigurationComplete message) to the gNB.

9) The gNB may inform the AMF that the setup procedure has been completed. For example, the gNB may transmit an initial context setup response message (eg, INITIAL CONTEXT SETUP RESPONSE message) to the AMF.

For reference, the RRC messages of steps 1 and 2 may use SRB0, and all subsequent messages may use SRB1. The messages of step 7 and step 7A may be integrity protected. From step 8, all messages may be integrity protected and may be ciphered.

In the case of a signaling-only connection, since SRB2 and DRB are not set up, step 8 may be omitted.

<Device to Device (D2D) Communication>

On the other hand, hereinafter, D2D communication will be described.

Figure 10:
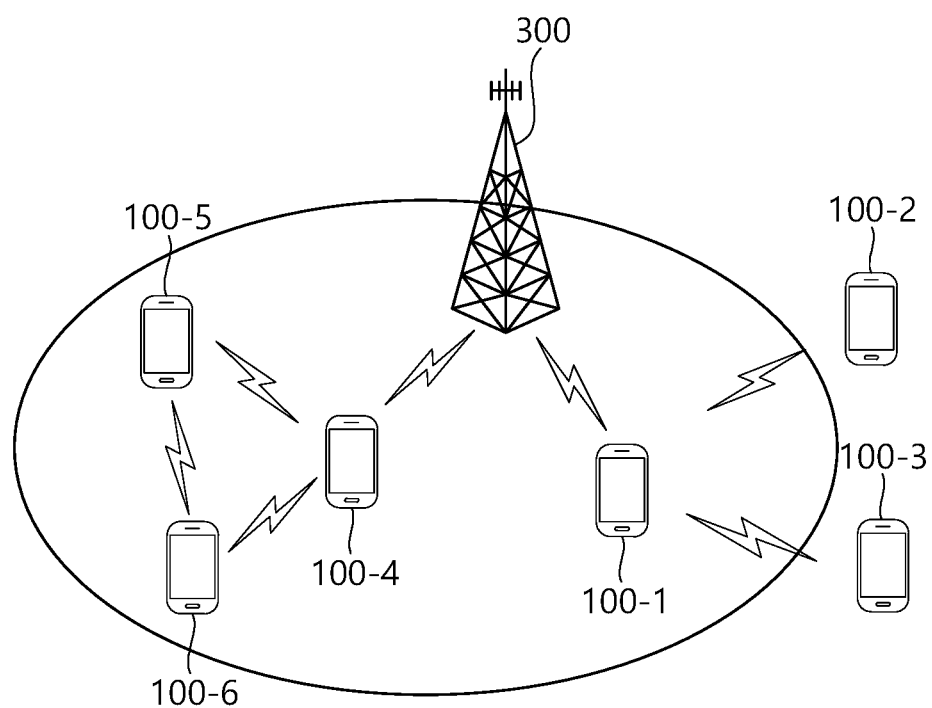
FIG. 10 shows a concept of Device to Device (D2D) communication.

FIG. 10 Shows a Concept of Device to Device (D2D) Communication.

Due to an increase in user requirements for a Social Network Service (SNS), communication between UEs at a physically close distance, i.e., Device to Device (D2D) communication, is required.

In order to reflect the above requirements, as shown in FIG. 10, between UE #1 100-1, UE #2 100-2, UE #3 100-3 or between UE #4 100-4, UE #5 100-5, UE #6 100-6, a method for directly communicating without intervention of a base station (gNB) 300 is being discussed. Of course, it is possible to communicate directly between the UE #1 100-1 and the UE #4 100-4 with the help of the base station (gNB) 300. Meanwhile, UE #4 100-4 may serve as a relay for UE #5 100-5 and UE #6 100-6. Similarly, UE #1 100-1 may serve as a repeater for UE #2 100-2 and UE #3 100-3 that are far away from the cell center.

On the other hand, D2D communication is also called a Proximity Service (ProSe). In addition, a UE performing a proximity service is also referred to as a ProSe UE. A link between UEs used for the D2D communication is also called a sidelink.

The physical channels used for the sidelink include the following.

Physical Sidelink Shared Channel (PSSCH)
Physical Sidelink Control Channel (PSSCH)
Physical Sidelink Discovery Channel (PSDCH)
Physical Sidelink Broadcast Channel (PSBCH)

In addition, there are the following physical signals used in the sidelink.

Demodulation Reference signal (DMRS)
Sidelink Synchronization signal (SLSS)

The SLSS includes a Primary Sidelink Synchronization Signal (PSLSS) and a Secondary Sidelink Synchronization Signal (SSLSS).

Figure 11:
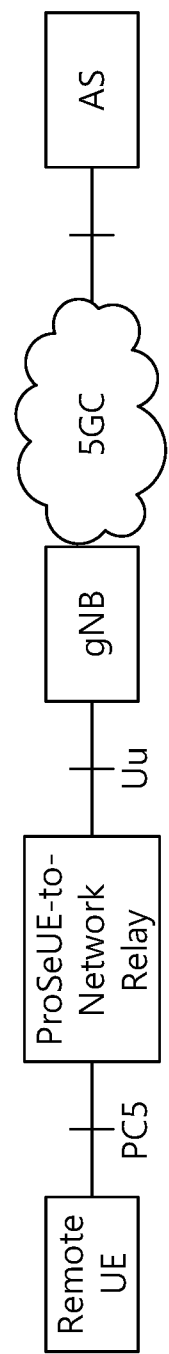
FIG. 11 shows an example architecture of a UE-to-Network Relay.
Figure 12:
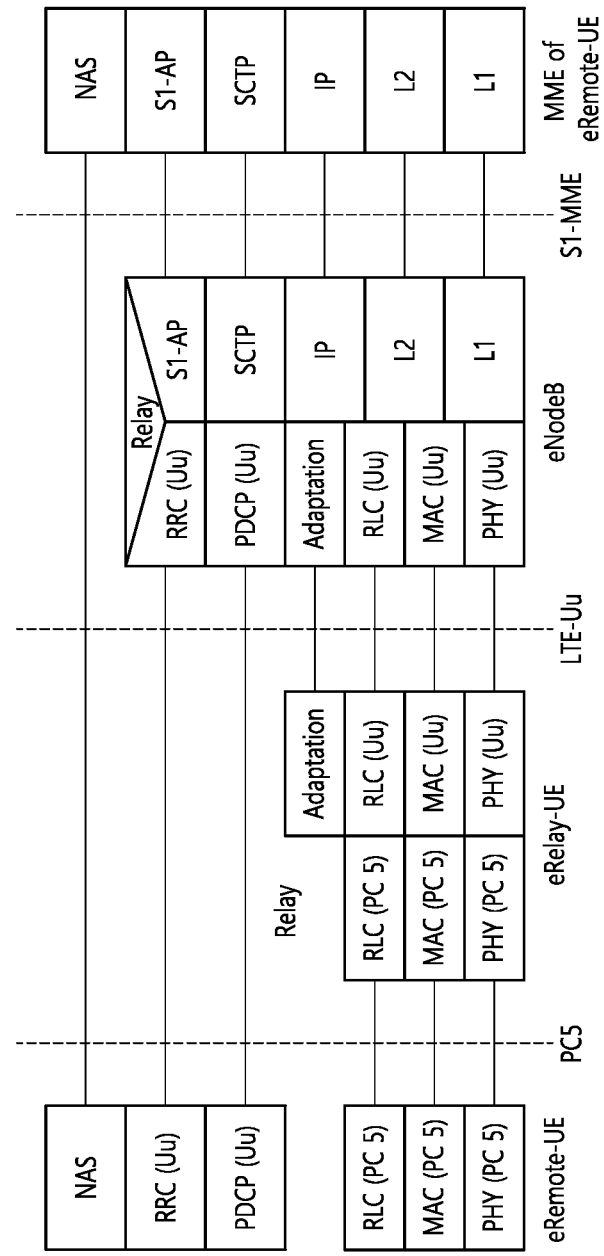
FIG. 12 shows an example of a protocol stack of a control plane for UE-to-Network Relay.
Figure 13:
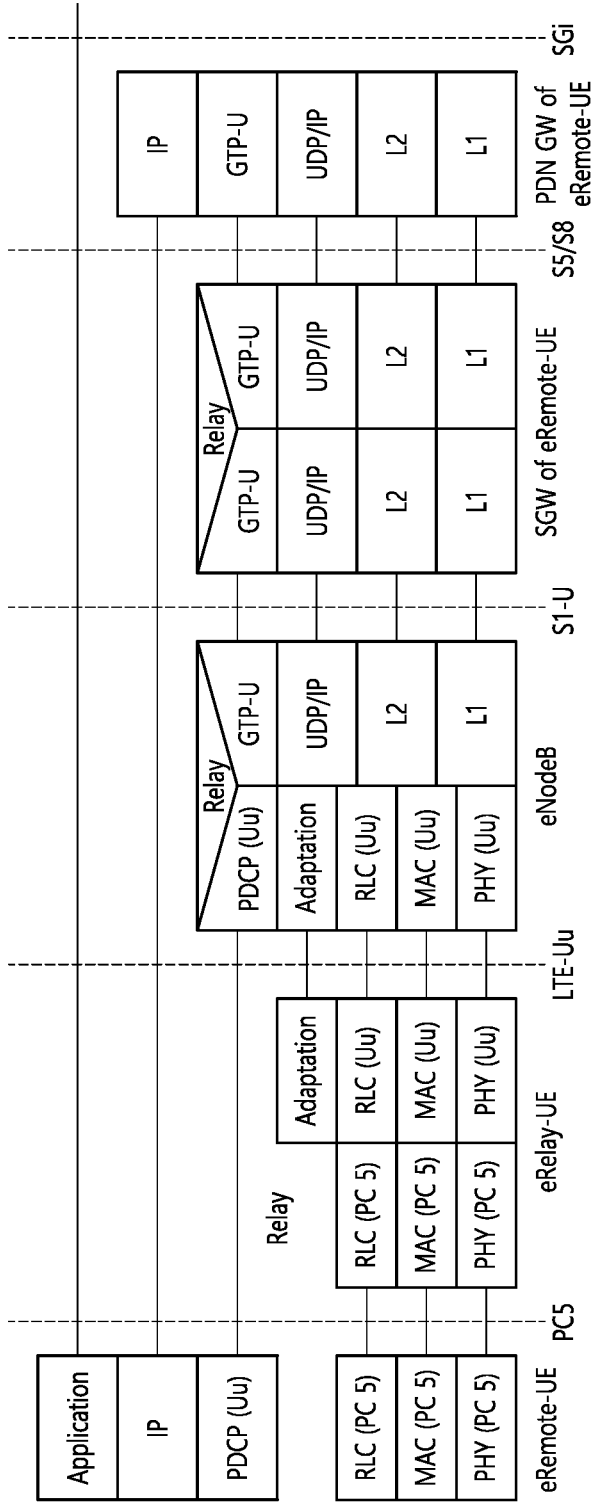
FIG. 13 shows an example of a protocol stack in the user plane for UE-to-Network Relay.

FIG. 11 shows an example architecture of a UE-to-Network Relay. FIG. 12 shows an example of a protocol stack of a control plane for UE-to-Network Relay. FIG. 13 shows an example of a protocol stack in the user plane for UE-to-Network Relay.

Referring to FIG. 11, UE-to-Network Relay supports the network connection of the Remote UE.

The PC5 link is the interface between the UE and the UE-to-network relay. The Uu link is the interface between the UE-to-network relay and the base station.

If the UE has established a PC5 link with the UE-to-network relay, the UE is considered as a remote UE.

The 5G ProSe UE-to-Network Relay entity (refer to 5G ProSe UE-to-Network Relay in FIG. 11) may provide a function for supporting network connectivity for Remote UEs. UE-to-Network Relay may be used for both public safety services and commercial services (eg, interactive services).

When a UE (eg Remote UE) has successfully established a PC5 link to a 5G ProSe UE-to-Network Relay, the UE (eg Remote UE) will be considered a Remote UE for a specific 5G ProSe UE-to-Network Relay. The Remote UE may be located within NG-RAN coverage or may be located outside NG-RAN coverage.

5G ProSe UE-to-Network Relay may relay unicast traffic (UL and DL traffic) between the Remote UE and the network. The 5G ProSe UE-to-Network Relay shall provide a general function to relay all IP traffic.

For unicast traffic between Remote UEs and 5G ProSe UE-to-Network Relays, One-to-one Direct Communication may be used.

The protocol stack of FIGS. 12 and 13 may be a protocol stack for a Layer-2 UE-to-Network Relay. Examples of the protocol stack for the Layer-2 UE-to-Network Relay of FIGS. 12 and 13 show the protocol stack in the EPS, but this is only an example, and the protocol stack may also be used for 5GS. For example, the gNB may use the protocol stack of the eNodeB, the AMF may use the MME protocol stack, and the UPF may use the protocol stack of the SGW/PGW. In addition, in FIGS. 12 and 13, a Uu interface may be used for the LTE-Uu interface between the UE and the base station, and the interface between the base station and the network core entity and the interface between the network core entities can be interpreted as being replaced with interfaces defined in 5GS.

Communication between the remote UE and the UE-to-Network Relay is performed as one-to-one direct communication.

<UE Configuration Update>

UE configuration may be updated at any time by the network. For example, the network may update the UE configuration at any time by using the UE configuration update procedure.

UE configuration may include the following information:
  the UE configuration may include Access and Mobility Management related parameters determined by the AMF and provided by the AMF. Access and mobility management parameters may include NSSAI mapping information for configured NSSAI and subscribed S-NSSAI, mapping information for allowed NSSAI and subscribed S-NSSAI, Service Gap time, PLMN-assigned UE Radio Capability ID, PLMN-assigned UE Radio Capability ID deletion indication (or information). If the UE configuration update procedure is triggered by the AMF after network slice-specific authentication and authorization for the S-NSSAI, the access and mobility management parameters may also include a list of rejected NSSAIs.
  UE policy provided by PCF If the AMF wants to change the UE configuration for access and mobility management related parameters, the AMF may initiate a UE configuration update procedure as illustrated in FIG. 14 below.

When the UE configuration update procedure requires the UE to initiate the registration procedure, the AMF may explicitly instruct the UE to initiate the registration procedure.

Figure 14:
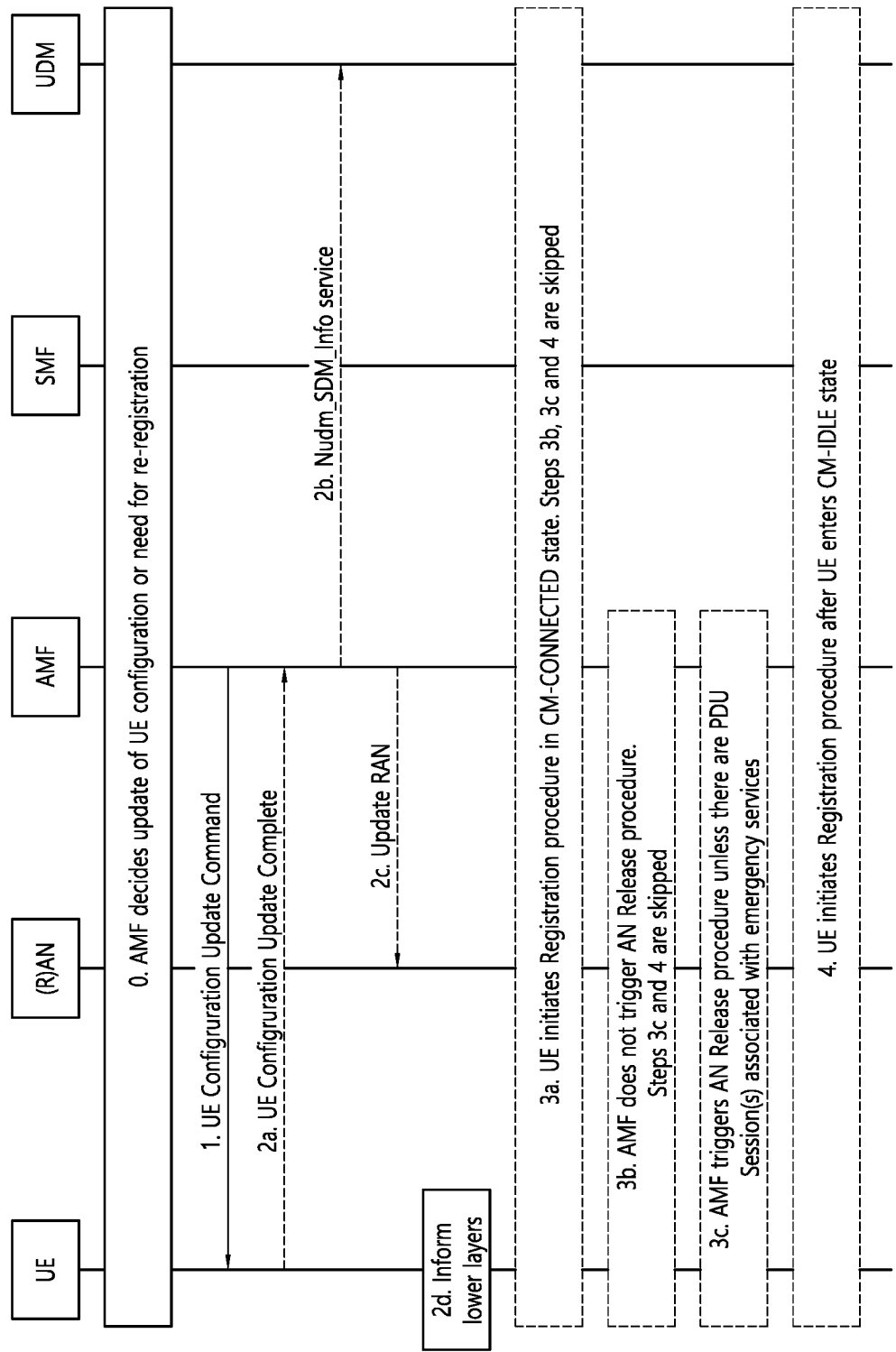
FIG. 14 shows an example of a UE configuration update procedure.

The UE configuration update procedure of the example of FIG. 14 may also be triggered when the AAA server performing network slice-specific authentication and authorization for S-NSSAI revokes authorization.

The following drawings were created to explain a specific example of the present specification. Since the names of specific devices described in the drawings or the names of specific signals/messages/fields are presented by way of example, the technical features of the present specification are not limited to the specific names used in the following drawings.

FIG. 14 Shows an Example of a UE Configuration Update Procedure.

The example of FIG. 14 shows an example of a UE configuration update procedure for access and mobility management related parameters.

If the AMF wants to update access and mobility management related parameters in the UE configuration, the UE configuration update procedure may be initiated by the AMF.

UE configuration update procedure may trigger the UE (while the UE is in the CM-CONNECTED state) to perform Mobility Registration Update procedure based on the network indication (or information), in order to modify NAS parameters (eg, NAS parameters needs negotiation (eg, Mobile Initiated Connection Only (MICO) mode)) Alternatively, the UE configuration update procedure may trigger the UE to perfrom a mobility registration update procedure (eg, a change in allowed NSSAI requiring re-registration) after the UE enters the CM-IDLE state, based on the network indication (or information) of the UE.

The UE configuration update may be transmitted through an access type to which the UE configuration update is applied (eg, 3GPP access or non-3GPP access) (if the corresponding access type is available). When the AMF intends to update the NAS parameters of the UE (NAS parameters that require acknowledgment of the UE), the AMF may provide an indication (or information) to the UE on whether the UE should acknowledge the command. AMF may not request approval for Network Identity and Time Zone (NITZ) commands. AMF may request acknowledgment for NSSAI information (eg allowed NSSAI), 5G-GUTI, TAI list and Mobility Restriction, LADN information, MICO, operator-defined access category definitions, PLMN-assigned UE radio capability ID and SMS subscription.

0) The AMF may determine the need to change the UE configuration for various reasons. For example, various reasons may include UE mobility change, Network (NW) policy, receipt of Subscriber Data Update Notification from UDM, change of network slice settings, a case in which it is necessary to allocate an PLMN-assigned UE radio capability ID, and the like. Alternatively, the AMF may determine that the UE should perform a registration procedure.

If the UE is in the CM-IDLE state, the AMF may wait until the UE is in the CM-CONNECTED state. Alternatively, the AMF may initiate a network-initiated service request procedure (eg, refer to the network-initiated service request procedure in the example of FIG. 8).

For reference, the AMF may use a service operation (eg, Nnssf_NSSelection_Get service operation) to determine whether the network slice setting needs to be updated. In this case, in order for the AMF to determine whether an update of the UE is required, the AMF may compare the stored information with an output from the NSSF.

When the service area restriction for the UE is updated, the AMF may include the mobility restriction list in the N2 message transferring the UE configuration update command message to the UE.

1) The AMF may transmit a UE configuration update command message to the UE. Here, the UE configuration update command message may include one or more UE parameters. UE parameters may include, for example, configuration update indication (or information), 5G-GUTI, TAI List, allowed NSSAI, mapping information of allowed NSSAI, NSSAI configured for serving PLMN, mapping information of configured NSSAI, rejected S-NSSAI, NITZ, Mobility Restrictions, Local Access Data Network (LADN) Information, MICO, Definition of Operator-Defined Access Categories, PLMN-Assigned UE Radio Capability ID, SMS Subscribed Indication, PLMN-Assigned UE Radio capability ID deletion indication (or information). Optionally, the AMF may update the rejected S-NSSAI in the UE configuration update command message.

The AMF may also include Configuration Update Indication parameters indicating the following information in the UE configuration update command message:
information that a change in network slicing subscription information has occurred;
information that the UE should acknowledge the command; and
Information on whether a registration process is requested.

When the AMF indicates a change in network slicing subscription information, the UE may locally erase all network slicing settings for all PLMNs and, if applicable, update the settings for the current PLMN based on the received information. When the AMF indicates a change in network slicing subscription information, the UE may be requested to acknowledge in step 2).

2a) When the UE configuration update indication (or information) requests acknowledge of the configuration update command message of the UE, the UE may transmit a UE configuration update complete message to the AMF. Except when only NITZ is provided, the AMF may request the UE's acknowledge for all UE configuration updates. If the registration procedure is not required, the following steps 3a), 3b), 3c) and 4) may be omitted. When the settings update indication (or information) is included in the UE settings update command message, and the settings update indication (or information) requires a registration procedure, the UE may perform step 3a) or step 3b) or step 3c) and step 4) according to other NAS parameters included in the settings update command message.

If the PLMN-assigned UE radio capability ID is included in step 1), when the AMF receives the UE configuration update complete message, the AMF may store the UE radio capability ID in the UE context.

When the UE receives the PLMN-allocated UE radio capability ID deletion indication (or information) in step 1), the UE may delete the PLMN-allocated UE radio capability ID for this PLMN. If the UE configuration update is used only for the purpose of deleting the UE radio capability ID, the following steps may be omitted.

2b) [conditional operation] The AMF may provide acknowledgment to the UDM by sending a service message related to the UDM (eg, by using the Nudm_SDM_Info service operation). Here, the authorization provided to the UDM may be an authorization indicating that the UE has received a network slicing subscription information change indication (or information) (when a change in network slicing subscription information is indicated in step 1) and has taken action accordingly.

2c) [Conditional operation] If the AMF resets 5G-GUTI through 3GPP access, when the AMF receives an acknowledgment from the UE in step 2a, the AMF may inform a new UE Identity Index Value (eg, a new identity index value derived from the 5G-GUTI) to the NG-RAN.

[Conditional operation] If the UE is registered in the same PLMN through both 3GPP access and non-3GPP access, AMF resets 5G-GUTI through non-3GPP, and the UE is in CM-CONNECTED state through 3GPP access, when AMF receives acknowledge from the UE in step 2a, the AMF may inform the NG-RAN of a new UE Identity Index Value (eg, an identity index value derived from a new 5G-GUTI).

[Conditional operation] If the AMF has set the PLMN-assigned UE radio capability ID to the UE, the AMF may inform the NG-RAN of the UE radio capability ID when the AMF receives an acknowledgment from the UE in step 2a.

2d) [Conditional operation] If the UE is set up with a new 5G-GUTI in step 2a) through non-3GPP access, and the UE is registered in the same PLMN through both 3GPP access and non-3GPP access, the UE may deliver new 5G-GUTI to a lower layer of access (eg, the RRC layer).

When a new 5G-GUTI is configured for the UE through 3GPP access in step 2a), a new 5G-GUTI may be delivered to a lower layer of the 3GPP access of the UE.

For reference, steps 2c) and 2d) may be necessary because the NG-RAN may use a part of the RRC Inacitve state and 5G-GUTI to calculate the paging frame. After the 5G-AN (Access Network) approves the UE to receive the UE configuration update complete message, the 5G-AN (Access Network) may assume that the UE configuration update complete message is stably delivered to the AMF.

3a) In the case where only NAS parameters that can be updated without the need for switching CM status in the CM-IDLE state are included (eg MICO mode), for re-negotiation with the network for the updated NAS parameters, immediately after acknowledging (immediately after sending an acknowledgment message), the UE may immediately initiate the registration procedure. Steps 3b), 3c) and 4) may be omitted.

3b) provided to the UE by the AMF, new mapping information of the new assigned NSSAI and/or allowed NSSAI and/or the new configured NSSAI does not affect existing connectivity to slices to the slice (eg, all N-SSAI to which the UE is connected), the AMF does not need to release the NSA signaling connection after receiving an acknowledgment from the UE in step 2). And, immediate registration is not required. The UE may immediately start using the new mapping information of the new assigned NSSAI and/or the allowed NSSAI. Until the UE performs the registration procedure and includes the requested NSSAI based on the newly configured NSSAI, the UE cannot be connected to the S-NSSAI that is not included in the allowed NSSAI but included in the new configured NSSAI for the serving PLMN. Steps 3c) and 4) may be omitted.

3c) The new allowed NSSAI and/or the new mapping of the allowed NSSAI and/or the new established NSSAI provided to the UE by the AMF may affect the ongoing existing connectivity for the network slice. In this case, the AMF may include in the UE configuration update command message along with the mapping of the new allowed NSSAI and the associated allowed NSSAI (if there is a mapping of the NSSAI).

If the AMF cannot determine a new allowed NSSAI after the subscribed S-NSSAI is updated, the AMF may not include the allowed NSSAI in the UE configuration update command message. The AMF may provide an indication (or information) to the UE to initiate a registration procedure. After the AMF receives an acknowledgment from the UE in step 2), unless there is one established PDU Sessions associated with regulatory prioritized services, the AMF may release the NAS signaling connection for the UE. When there is one established PDU session associated with the regulated priority service, the AMF may inform the SMF to release the PDU session associated with the non-regulated priority service for this UE.

The UE may transmit a NAS message carrying a PDU session establishment request message for a non-emergency PDU session to the AMF. Before the registration procedure requested by the AMF is successfully completed by the UE, the AMF may reject the NAS message carrying the PDU session establishment request message for the non-emergency PDU session transmitted by the UE.

4) After the UE enters the CM-IDLE state, the UE may initiate an appropriate registration procedure. And, the UE may not include 5G-S-TMSI or Globally Unique AMF ID (GUAMI) in Access Stratum signaling. If there is a PDU session established associated with the emergency service and the UE receives an indication (or information) to perform the registration procedure, the UE may initiate the registration procedure only after the PDU session associated with the emergency service is released.

For reference, if the UE receives the UE configuration update command message without an indication (or information) requesting to perform re-registration, the UE may trigger the registration procedure for other reasons.

II. Problems to be Solved by the Disclosure of this Specification

In EPS, a study on Layer-2 UE-to-Network Relay was conducted. An example of a control plane protocol stack and an example of a user plane protocol stack when a Layer-2 UE-to-Network Relay (eg, eRelay-UE) provides a network connection service to a Remote UE (eg, eRemote UE) is shown in FIG. 12 and FIG. 13.

When the Remote UE is connected to the network through a Layer 2 Relay (i.e., Layer-2 UE-to-Network Relay), the Remote UE may transmit NAS messages and RRC messages to the network through the Layer 2 Relay UE, and may receive NAS messages and RRC messages from the network through 2 Relay UEs. When the Remote UE is connected to the network through a Layer 2 Relay (ie, Layer-2 UE-to-Network Relay), the network must perform mobility management for the Remote UE.

On the other hand, when the Remote UE is connected to the network through a Layer 3 Relay (ie, Layer-3 UE-to-Network Relay), the Remote UE may transmit a NAS message and an RRC message to the network through the Layer 3 Relay UE, or may receive NAS messages and RRC messages from the network through the Layer 3 Relay UE. That is, when the Remote UE is connected to the network through a Layer 3 Relay (ie, Layer-3 UE-to-Network Relay), the Remote UE cannot transmit or receive NAS messages and RRC messages to the network by itself. When the Remote UE is connected to the network through a Layer 3 Relay (ie, Layer-3 UE-to-Network Relay), the Remote UE can only be managed for traffic to the Remote UE by the Layer 3 Relay and/or the network.

In EPS, Layer 3 Relay (ie, Layer-3 UE-to-Network Relay) was introduced, and Layer 2 Relay (ie, Layer-2 UE-to-Network Relay) was not introduced. In 5GS, the introduction of Layer 2 Relay (ie, Layer-2 UE-to-Network Relay) is being discussed. To support proximity based services, potential enhancements to the 5G system architecture may be applied. For example, a common framework for supporting proximity-based services needs to be developed. That is, it is necessary to satisfy the requirements for public safety proximity services and commercial proximity services.

Additionally, two sets of goals related to public safety related services and commercial services may be pursued. The two sets of goals may include Set A and Set B described below.

Set A: System Enhancements for Public Safety Related Proximity Services

Based on a common framework, this part can focus on improving the system to support the service requirements defined for public safety services. Objectives for system enhancements may include:

Support of one-to-many direct communication including cases of out-of-coverage

Support of one-to-one direct communication including the case of out-of-coverage Support of UE-to-Network Relay (including QoS aspects)

Support of direct discovery, including cases of out-of-coverage

Support of UE-to-UE relay mechanism. This goal may consider commercial services.

Set B: System Enhancements for Commercial Proximity Services

Based on a common framework, this part can mainly focus on commercial specific proximity services. Objectives for system enhancements may include:

Support of PC5 direct communication including unicast and groupcast

Support of discovery and group management for interactive services in PC5 interface Support of authorization for PC5 direct communication (including authorization of communication with group or authorization of communication without group)

Support QoS enhancement for various services of PC5 interface (eg, high data rate and/or low delay transmission)

Support of path selection and path switching between the network-controlled Uu interface and PC5 interface. Path switching of user traffic can minimize user experience interruption.

Support of mechanisms for operators to charge for PC5 communication (eg, per group basis, per individual UE basis)

For reference, in the disclosure of this specification, a Relay UE may mean a Layer-2 Relay UE. Relay UE, Layer-2 UE-to-Network Relay, eRelay-UE (evolved Relay UE), and evolved ProSe UE-to-Network Relay UE may all be used with the same meaning. In the disclosure of this specification, a Remote UE may mean a Layer-2 Remote UE. Remote UE, Layer-2 UE-to-Network Relay, eRemote-UE (evolved Remote UE), and evolved ProSe Remote UE may all be used with the same meaning.

When describing a Remote UE, the RRC_CONNECTED state may mean that the UE has a context in the eNB or gNB.

The network (eg, AMF) may request the UE to perform re-registration due to a change in slicing information of the UE (eg, UE) or other reasons. In this case, the AMF may transmit a UE Configuration Update (UCU) Command message including "registration requested" information to the UE. Hereinafter, the UE configuration update command message and the UCU command message will be used interchangeably.

When the UE receives a UE configuration update command (UCU command) message including "registration requested" information from the AMF, except a few exceptional situations (eg, the UE is using an emergency PDU session), the UE may transmit an ack for the UCU command message (eg, a UCU COMPLETE message) to the AMF. After transmitting the ack for the UCU command message (eg, UCU COMPLETE message), the UE may release the NAS signaling connection. After the UE transitions (or switches) to the IDLE mode, the UE may start the registration procedure again.

A terminal (hereinafter, referred to as a Relay UE) operating as a ProSe Relay (eg, ProSeUE-to-Network Relay in the example of FIG. 11) may be actively operating as a relay. For example, one or more Remote UEs may transmit data or signaling to the network through the Relay UE and receive data or signaling from the network through the Relay UE.

When the network requests re-registration for such a relay UE (that is, when the AMF requests a UCU procedure including "registration requested" information from the relay UE (eg, UE configuration update command (UCU command) message is transmitted), the Relay UE disconnects (or releases) the NAS signaling connection and transitions to the IDLE state.

In this case, when the user plane resource of the PDU session directly used by the relay UE is allocated (or when the PDU session or user plane resource is activated), the relay UE may postpone the release of the NAS signaling connection. However, if the Remote UEs connected to the Relay UE are using the PDU session, the PDU session being used by the Remote UEs is not the PDU session directly used by the Relay UE itself, so the Relay UE cannot postpone the release of NAS signaling.

As a result, from the Remote UE's point of view, the NAS signaling connection is released, so that signaling and data cannot be exchanged with the network through the Relay UE, thus, there may be situations in which time and data are wasted due to transmission to a Relay UE, for which NAS signaling is already released.

Specifically, in this case, in order for the Relay UE to perform re-registration, the CM state of the Relay UE transitions (or switches) to the IDLE mode, and accordingly, the Remote UE(s) delivered through the Relay UE perform data/signaling transmission is also forcibly stopped. As data/signaling transmission is forcibly stopped, the user experience of the Remote UE may be greatly degraded. In addition, due to the sudden interruption of data/signaling transmission, problems such as data/signaling loss of the Remote UE may occur.

In addition, after the Relay UE successfully performs the re-registration procedure, in order for the Remote UE to retransmit the interrupted data/signaling, the Remote UE may re-perform procedure for connecting and/or establishing PC5 link with the Relay UE. In addition, the Remote UE recognizes that the Relay UE is available from the point in time when the re-registration procedure of the Relay UE is completed, and a time difference occurs for the Remote UE to re-establish a connection through the Relay UE, so the end-to-end of the Remote UE delay is also increased. Due to the various situations described above, there is a problem that the user experience of the Remote UE is deteriorated.

III. Disclosure of the Present Specification

The disclosures described below in this specification may be implemented in one or more combinations. Each of the drawings shows an embodiment of each disclosure, but the embodiments of the drawings may be implemented in combination with each other.

The disclosure of the present specification proposes a method of efficiently supporting UE configuration update of a Relay UE. A method of efficiently supporting UE configuration update of a relay UE proposed in the disclosure of the present specification may be configured by a combination of one or more operations/configurations/steps described through various examples below.

For reference, in this specification, user equipment (UE) and a terminal are used interchangeably. In addition, UE-to- Network Relay, ProSe UE-to-Network Relay, Relay, Relay UE, UE-NW Relay, eRelay, eRelay UE, eRelay-UE, ProSe Relay, and ProSe Relay UE are used as a same term to describe a Relay UE. In addition, Remote UE, eRemote UE, eRemote-UE, ProSe Remote UE, and ProSe Remote are mixed to describe Remote UE.

Operations described in the disclosure of this specification may be applied to various services (eg, enhanced Mobile Broadband (eMBB) V2X, public safety, IoT, etc.).

In the disclosure of this specification, PC5 may mean NR PC5, LTE PC5, or both NR PC5 and LTE PC5. In the disclosure of the present specification, NG-RAN may mean gNB or both gNB and ng-eNB.

Hereinafter, in the disclosure of the present specification (eg, the first to fourth examples of the disclosure of the present specification), it is assumed that the Remote UE is in a state in which the Remote UE requires a network connection service, and thus performs a network connection service request to the Relay UE. For this reason, it is assumed that a PC5 unicast link is formed (or created or established) between the Remote UE and the Relay UE. In the disclosure of this specification, the PC5 unicast link may be used in combination with a direct connection, a unicast link, an L2 link, a Layer-2 link, and the like.

A UE configuration update procedure according to the disclosure of this specification will be described in detail. For example, a Generic UE configuration update procedure will be described.

The UE configuration update procedure may be performed for purposes such as the following examples:

a) the AMF provides new parameter information in the configuration update command message, so that the AMF can update the UE settings for access and mobility management related parameters, determined and provided by the AMF; or b) To update the access and mobility-related parameters determined and provided by the AMF, the AMF may request the UE to perform a registration procedure for mobility and periodic registration and an update procedure for the network.

The UE configuration update procedure may be initiated by the network. When the UE has an established 5G Mobility Management (5GMM) context, and the UE is in 5GMM-CONNECTED mode, the UE configuration update procedure may be used. If the UE is in 5GMM-IDLE mode, the AMF may initiate a general UE configuration update procedure using a paging procedure or a notification procedure. In order to confirm whether access and mobility management related parameters are updated by the UE, the AMF may request a confirmation response from the UE.

In order to allocate a new 5G-GUTI to the UE, the UE configuration update procedure may be initiated by the network. For example, a UE configuration update procedure may be initiated after a successful service request procedure invoked in response to a paging request by the network and before the N1 NAS signaling connection is released. When the service request procedure is triggered due to 5G Session Management (5GSM) downlink signaling pending, after transmission of 5GSM downlink signaling, a UE configuration update procedure for allocating a new 5G-GUTI may be initiated by the network.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 15:
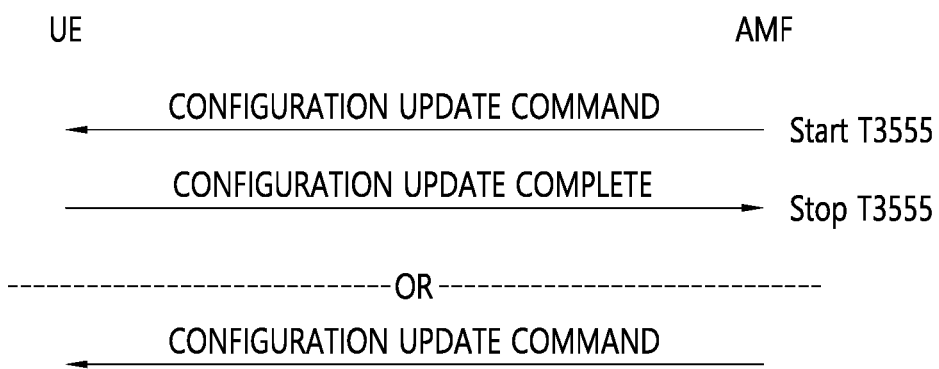
FIG. 15 shows an example of a UE configuration update procedure according to the disclosure of this specification.

FIG. 15 Shows an Example of a UE Configuration Update Procedure According to the Disclosure of this Specification.

Refer to FIG. 15, the AMF may transmit a configuration update command message to the UE. The AMF may start a timer (eg, T3555 timer) after transmitting the configuration update command message. The T3555 timer may be an example of a timer that is started after the AMF transmits a configuration update command message. The default time value of the T3555 timer may be, for example, 6 seconds. When the AMF transmits a configuration update command message including an acknowledgment bit set to "acknowledgement requested", the AMF may start the T3555 timer. The T3555 timer may be stopped when the AMF receives a configuration update complete message from the UE. When the T3555 timer expires, the AMF may resend the configuration update command message.

The UE may transmit a configuration update complete message to the AMF. When the AMF receives a configuration update complete message from the UE, it may stop a timer (eg, T3555 timer).

Alternatively, the AMF may transmit a configuration update message without driving a timer (eg, a T3555 timer).

For reference, in the example of FIG. 15, two examples in which the AMF transmits a configuration update command message (eg, an example in which the AMF transmits a configuration update message and drives a timer, and an example in which the AMF does not drive the timer and transmits a configuration update message) An example of transmission) is shown. The first example may be an example of a case in which acknowledgment of the configuration update command message is required from the AMF's point of view, and the second example is an example of a case in which acknowledgment of the configuration update command message is not required from the AMF's point of view.

When the UE receives a CONFIGURATION UPDATE COMMAND message, if the timer T3346 was in operation, the UE may stop the timer T3346. Then, the UE may update the appropriate information stored in the UE by using the content included in the configuration update command message.

The configuration update command message may include a configuration update indication (or information) Information Element (IE). When "acknowledgement requested" is marked in the Acknowledgment bit of the configuration update indication (or information) IE, the UE may transmit a configuration update completion message to the AMF.

When the UE receives a new 5G-GUTI included in the configuration update command message, the UE considers the new 5G-GUTI to be valid, and considers the old 5G-GUTI to be invalid. In this case, if the timer T3519 is running, the UE may stop the running timer T3519 and delete the Subscription Concealed Identifier (SUCI) stored in the UE. Otherwise (eg, when the UE has not received a new 5G-GUTI), the UE may consider the existing 5G-GUTI to be valid. When the settings update command message is sent to the UE through non-3GPP access, and the UE is in 5GMM-REGISTERD state in both 3GPP access and non-3GPP access within the same PLMN, the UE may provide 5G-GUTI to in a lower layer (eg, RRC layer) of 3GPP access.

When the UE receives a new Tracking Area Identifier (TAI) list included in the configuration update command message, the UE considers the new TAI list valid, and may consider the old TAI list invalid; Otherwise (eg, when the UE does not receive a new TAI list), the UE may consider the existing TAI list to be valid.

When the UE receives the new service area list included in the configuration update command message, the UE may consider the new service area list valid and the old service area list invalid; Otherwise, the UE may consider the existing service area list (if the existing service area list exists) to be valid.

When the UE receives the new NITZ information included in the configuration update command message, the UE may consider the new NITZ information valid, and may consider the old NITZ information invalid; Otherwise (eg, when the UE does not receive new NITZ information), the UE may consider the existing NITZ information to be valid.

When the UE receives new Local Access Data Network (LADN) information included in the configuration update command message, the UE may consider the new LADN information valid, and may consider the old LADN information invalid; Otherwise (eg, when the UE does not receive new LADN information), the UE may consider the existing LADN information to be valid.

When the UE receives a new allowed NSSAI for the associated access type (NSSAI) for the associated access type included in the configuration update command message, the UE may consider the newly allowed NSSAI for the associated access type to be valid, and may store the newly allowed NSSAI for the relevant access type. And the UE may consider the old allowed NSSAI for the relevant access type to be invalid; otherwise (eg, when the UE does not receive a new allowed NSSAI for the related access type), the UE may consider the old allowed NSSAI for the related access type to be valid.

When the UE receives the newly configured NSSAI included in the configuration update command message, the UE may consider the newly configured NSSAI for the registered PLMN valid, and may consider the old configured NSSAI for the registered PLMN invalid; Otherwise (eg, when the UE does not receive the newly configured NSSAI), the UE may consider that the old configured NSSAI for the registered PLMN is valid. The UE may store the newly configured NSSAI.

When the UE receives a network slicing indication (or information) IE and a network slicing subscription information change indication (or information) set to "Network slicing subscription changed" included in the settings update command message, the UE may delete all PLMNs except the current PLMN and network slicing information for each PLMN.

The UE receives an operator-defined access category definitions IE (IE) included in the configuration update command message, and the operator-defined access category definitions IE includes one or more operator-defined access category definitions, the UE may delete the definition of the operator-defined access category stored for the Registered PLMN (RPLMN), and store the received definition of the operator-defined access category for the RPLMN. If the UE receives an operator-defined access category definitions IE (IE) included in the configuration update command message, and the operator-defined access category definitions IE does not contain a definition of an operator-defined access category, the UE may delete the definition of the operator-defined access category stored for the Registered PLMN (RPLMN). If the configuration update command message received by the UE does not include an operator-defined access category definitions IE (IE), the UE does not delete the definition of the operator-defined access category stored for the Registered PLMN (RPLMN).

When the UE receives the Short Message Service (SMS) indication (or information) included in the configuration update command message together with the SMS availability indication (or information) configured as in the following example:

a) When the UE receives an SMS availability indication (or information) set to "SMS over NAS not available", the UE may consider that SMS over NAS transport is not allowed by the network; and b) When the UE receives an SMS availability indication (or information) set to "SMS over NAS available", after completion of the general UE configuration update procedure, the UE may request using SMS through NAS by performing a registration procedure for mobility and periodic registration update.

The configuration update command message may include a configuration update indication (or information) IE's registration request bit. If the configuration update command message indicates "registration requested" in the registration request bit of the configuration update indication (or information) IE, and the configuration update command message corresponds to the following, operations explained below may be performed:

a) If the configuration update command message does not include other parameters, or includes at least one or more of the following parameters: a newly assigned NSSAI, a newly set NSSAI or network slicing subscription information change indication, and:

a-1) If there is an emergency PDU session, after the completion of the general UE configuration update procedure and release of the emergency PDU session, the UE may release the existing (existing) N1 NAS signaling connection, may initiate the registration process for mobility update and periodic registration update; or a-2) If the emergency PDU session does not exist, after the completion of the general UE configuration update procedure and the release of the existing (existing) N1 NAS signaling connection, the UE may start the registration procedure for mobility update and periodic registration update; or a-3) When the UE operates as a UE-to-Network Relay (ie, the UE is a Relay UE), and the Remote UE receiving the service through the as a UE-to-Network Relay is in RRC_CONNECTED state (eg, the Relay UE is relaying data and/or signaling between a Remote UE(s) and the network), the UE may include an N1 NAS signaling connection keep indication (or information) IE (N1 NAS signaling connection keep indication IE) in the configuration update completion message. The N1 NAS signaling connection keep indication (or information) IE (N1 NAS signaling connection keep indication IE) may be information for allowing the AMF to keep (keep) the N1 NAS signaling connection without releasing the N1 NAS signaling connection. That is, when the UE transmits a setup update complete message including an N1 NAS signaling connection keep indication IE (N1 NAS signaling connection keep indication IE), the AMF may keep N1 NAS signaling with the UE without releasing the N1 NAS signaling based on an N1 NAS signaling connection keep indication (or information) IE. In summary, when the UE receives a configuration update command message including "registration requested", the UE operates as a Relay UE, and the Remote UE is in RRC_CONNECTED state, then the UE may transmit configuration update completion message including an N1 NAS signaling connection keep indication IE to the AMF; or b) If the configuration update command message contains a MICO indication (or information), without a newly allowed NSSAI or a newly established NSSAI, after completion of the normal UE configuration update procedure, the UE may initiate registration procedures for mobility and registration updates in order to re-negotiate the MICO mode with the network.

The information described in 3-a) above (eg, a new IE or a new NAS message such as an example of an N1 NAS signaling connection keep indication IE) may include information that the transmission of the Remote UE is performed through a current terminal (Relay UE) and/or information requesting to maintain the NAS signaling connection. In other words, the UE may include information indicating that transmission of the Remote UE is performed through the current UE (Relay UE) and/or information requesting to maintain the NAS signaling connection in the configuration update completion message transmitted to the AMF.

The terminal may transmit the meaning of the information (eg, information indicating that transmission of a Remote UE is performed through a current UE (Relay UE) and/or information requesting to maintain a NAS signaling connection, etc.) to be transmitted to the AMF by using separate flag, or whether the Information Element itself including the following information (eg, information described in i) to iii) below) is included, or the existence of a new NAS message.

For example, when the terminal uses a new IE called N1 NAS signaling connection keep indication IE, the terminal may indicates the meaning of maintaining the NAS signaling connection to the AMF through the configuration update completion message, by including a flag (that is, frag requesting to keep the NAS signaling connection) requesting "NAS signaling connection keep" in the N1 NAS signaling connection keep indication IE. Alternatively, by including a new IE called N1 NAS signaling connection keep indication IE in the configuration update completion message, the terminal may indicate the meaning of requesting the AMF to maintain the NAS signaling connection through the configuration update completion message.

For another example, in order to request the AMF to maintain the NAS signaling connection, the UE transmits a newly defined NAS message (eg, CONFIGURATION UPDATE SUSPEND message) to the AMF instead of the configuration update completion message, the UE may indicate the meaning of maintaining the NAS signaling connection.

A configuration update completion message, a newly defined NAS message (eg, configuration update postpone message), or an N1 NAS signaling connection keep indication (or information) IE transmitted by the terminal to the AMF may include one or more of information among the information such as the following examples (information of examples in examples i) to iii) below).

i) Time information (eg, Suspend Time) for requesting release suspension (or postponement): This may be set to a time value configured in the form of a NAS timer or one of several predetermined time values. For example, when the terminal transmits time information for requesting release deferment (or postponement) to the AMF, the AMF may perform N1 A procedure for releasing the signaling connection after a time corresponding to the time value of the time information requesting release (release) deferment (or postponement).

ii) Information on whether or not Explicit NAS signaling connection release is required: This information may indicate whether NW (Network) initiated release (eg, release of NAS signaling connection) is explicitly required or whether to perform the re-registration procedure according to the local release of the terminal. When the UE transmits information on whether or not the explicit NAS signaling connection release is required to the AMF, the AMF remembers the need for release for the corresponding terminal (eg, UE), and may select whether to perform procedure for releasing the NAS signaling connection after a specific time or whether to wait for the re-registration procedure of the UE regardless of the procedure for a release the NAS signaling connection. For example, the AMF may select whether to perform the procedure for releasing the NAS signaling connection or to wait for the re-registration procedure of the terminal based on the operator's setting or the implementation of the AMF. Alternatively, the AMF may explicitly perform procedure for releasing the NAS signaling connection after the time value of the time information has elapsed, if "i) time information (eg, Suspend Time) to request release suspension (or postponement)" is provided. Here, the specific time may mean, for example, a time value of this time information when "i) time information (eg, Suspend Time) for requesting release (or postponement)" is provided. Alternatively, the specific time may mean an arbitrary time value (eg, a time value set by an operator or AMF). For example, the time value of the specific time may be a time value of about 10 to 15 seconds. iii) Information on whether Release Notification is required: if NAS message or IE transmitted by the UE (Relay UE) to the AMF includes a NAS signaling connection maintenance (eg, N1 NAS signaling connection keep indication IE) or release suspend request (eg, i) Suspend Time) according to the UCU (UE configuration update), the UE may inform the AMF of information for whether to directly notify when NAS signaling can be released after a transmission of NAS message or the IE. For example, the relay UE may inform the AMF that the relay UE intends to transmit a direct notification of when NAS signaling can be released through information on whether release notification is required. In this case, the AMF may delay (or postpone) the release of the NAS signaling connection until it receives this notification from the relay UE. Thereafter, when the NAS signaling is available for release (eg, signaling/data transmission of all remote UEs is terminated or all remote UEs are in RRC_IDLE state), the relay UE may transmit a notification indicating that release is possible to the AMF. After receiving the notification that release is possible, the AMF may perform a procedure for releasing NAS signaling. The "notification that release is possible" transmitted by the Relay UE may be included in a new NAS message (eg, a CONFIGURATION UPDATE RESUME message) or an existing message (eg, a configuration update completion message) and transmitted. Upon receiving the "notification that release is possible", the AMF may perform NAS signaling connection release. As another example, the relay UE may inform the AMF that the relay UE will not transmit a direct notification of when NAS signaling can be released through information on whether release notification is required. In this case, the AMF may determine the release time of the NAS signaling connection by a method other than a method of receiving a "notification that release is possible" from the UE. As an example, if the AMF receives information on whether or not release notification is required with i) Suspend Time information from the relay UE, after the time corresponding to the Suspend Time information has elapsed from the time when such information is received from the relay UE, the AMF may perform a procedure for releasing the NAS signaling connection.

The UE may transmit the above information as a combination of one or more of the above information to the AMF. Here, the above information includes, for example, whether or not to postpone the release (eg, N1 NAS signaling connection keep indication IE of a-2)), whether or not to explicit release is required (eg, explicit NAS signaling connection release suspend (or postponement) of ii)), release suspend time (eg, time information for requesting release suspend (or postpone) of i)), whether release notification or not (eg. information on whether release notification is required in iii)). For example, the terminal may request the suspension (or postponement) of the signaling connection release through the N1 NAS signaling connection keep indication IE, and may inform the AMF that the explicit release is not required through information on whether or not the explicit NAS signaling connection release is required. As another example, the UE may request the suspension (or postponement) of the signaling connection release through the N1 NAS signaling connection keep indication IE, may request that the explicit release is required through information on whether or not an explicit NAS signaling connection release is required, and may transmit the release suspend (or postponement) time value to the AMF through the time information for requesting and requesting the release suspend (or postponement), such that the AMF may perform explicit release of the NAS signaling connection after the time delivered by the terminal. For reference, basically, the terminal may transmit whether release is suspended (eg. an N1 NAS signaling connection keep indication IE of a-2)) to the AMF. For example, the configuration update completion message transmitted by the terminal to the AMF may basically include whether release is suspended (eg. an N1 NAS signaling connection keep indication IE of a-2)).

Whether or not 3 kinds of information (eg. whether or not to explicit release is required (eg, explicit NAS signaling connection release suspend (or postponement) of ii)), release suspend time (eg, time information for requesting release suspend (or postpone) of i)), whether release notification or not (eg. information on whether release notification is required in iii)) other than whether or not to postpone the release (eg, N1 NAS signaling connection keep indication IE of a-2)) is included in is a message transmitted by the terminal (eg. configuration update completion message) may vary according to conditions. For example, whether or not explicit release of NAS signaling connection is required of whether or not explicit release is required (eg, ii)), release suspend time (eg, time information for requesting release suspend (or postponement) of i), whether release notification (eg, information on whether release notification of iii) is required) may be included in a message (eg, configuration update completion message) transmitted by the UE independently of each other. For reference, release suspend time (eg, time information for requesting release suspend (or postpone) of i)) and whether release notification or not (eg. information on whether release notification is required in iii)) may not used simultaneously depending on conditions.

An example of an operation performed when the terminal transmits the combination of whether or not to explicit release is required (eg, explicit NAS signaling connection release suspend (or postponement) of ii)), release suspend time (eg, time information for requesting release suspend (or postpone) of i)), and/or whether release notification or not (eg. information on whether release notification is required in iii)) is shown in Table 3 below. For reference, in the example of Table 3, a situation in which the UE requests the AMF to postpone the release (ie, the maintenance of the NAS signaling connection) by transmitting whether or not to postpone the release (eg, N1 NAS signaling connection keep indication IE of a-2)) is assumed.

TABLE 3

| Case | Explicit release | Release notification | Suspend Time | operation |
|---|---|---|---|---|
| 1 | X | X | X | The relay UE may not transmit information on whether or not explicit release is required to the AMF or transmit information on whether or not explicit release is required indicating that explicit release is not required to the AMF to inform the AMF that explicit release is not required. The relay UE may notify the AMF that the release notification is not required by not transmitting information on whether the relay UE is a release notification to the AMF or by transmitting information on whether or not a release notification indicating that a release notification is not required to the AMF. The relay UE may not transmit Suspend Time to the AMF. The AMF waits without releasing the NAS signaling connection, and the relay UE may perform NAS signaling connection local release and perform registration again after an arbitrary time. |
| 2 | X | X | ○ | The relay UE may not transmit information on whether or not explicit release is required to the AMF or transmit information on whether or not explicit release is required indicating that explicit release is not required to the AMF to inform the AMF that explicit release is not required. The relay UE may notify the AMF that the release notification is not required by not transmitting information on whether the relay UE is a release notification to the AMF or by transmitting information on whether or not a release notification indicating that a release notification is not required to the AMF. The relay UE may transmit Suspend Time to the AMF. AMF may wait without releasing the NAS signaling connection. The relay UE may perform NAS signaling connection local release and may perform re-registration after an arbitrary time. For example, an arbitrary time may mean a time value based on suspend time. AMF can start release when suspend time expires. |

TABLE 3-continued

| Case | Explicit release | Release notification | Suspend Time | operation |
|---|---|---|---|---|
| 3 | X | ○ | * (Case 3 is a case that does not need to be considered as described on the right, so it does not matter whether the Suspend Time item is ○ or X) | The relay UE may not transmit information on whether or not explicit release is required to the AMF or transmit information on whether or not explicit release is required indicating that explicit release is not required to the AMF to inform the AMF that explicit release is not required. Since there is no need for explicit release, the relay UE does not need to notify the AMF that the release notification is required by transmitting information on whether the release notification is required to the AMF or the information on whether the release notification indicating that the release notification is required to the AMF. Case 3 is a case that does not need to be considered. Since there is no need for explicit release, there is no need for the UE to send a release notification. |
| 4 | ○ | X | X | The relay UE may notify the AMF of the need for explicit release by transmitting information on whether or not explicit release is required to the AMF or by transmitting information on whether or not explicit release is required indicating that explicit release is required to the AMF. The relay UE may notify the AMF that the release notification is not required by not transmitting information on whether a release notification to the AMF or by transmitting information on whether or not a release notification indicating that a release notification is not required to the AMF. The relay UE may not transmit Suspend Time to the AMF. The AMF waits without releasing the NAS signaling connection, and the AMF may initiate the NAS signaling connection release procedure. For example, the time when the AMF starts the NAS signaling connection release procedure is determined based on an arbitrary default value, or the time when the AMF starts the NAS signaling connection release procedure may be determined as the time that the AMF drives an inactivity timer based on a specific time value after communication with the remote UE is completed, and the timer expires. |
| 5 | ○ | X | ○ | The relay UE may notify the AMF of the need for explicit release by transmitting information on whether or not explicit release is required to the AMF or by transmitting information on whether or not explicit release is required indicating that explicit release is required to the AMF. The relay UE may notify the AMF that the release notification is not required by not transmitting information on whether a release notification to the AMF or by transmitting information on whether or not a release notification indicating that a release notification is not required to the AMF. The relay UE may transmit Suspend Time to the AMF. After waiting without releasing the NAS signaling connection, the AMF may start the NAS signaling connection release procedure when the Suspend time expires. |
| 6 | ○ | ○ | X | The relay UE may notify the AMF of the need for explicit release by transmitting information on whether or not explicit release is required to the AMF or by transmitting information on whether or not explicit release is required indicating that explicit release is required to the AMF. The relay UE may notify the AMF that a release notification is required by transmitting information on whether a release notification is required to the AMF or by transmitting information on whether a release notification indicating that a release notification is required to the AMF. The relay UE may not transmit Suspend Time to the AMF. After the AMF waits without releasing the NAS signaling connection, when the UE transmits a notification indicating that it is okay to release the NAS signaling to the AMF, the AMF may start the NAS signaling connection release procedure. |
| 7 | ○ | ○ | ○ | The relay UE may notify the AMF of the need for explicit release by transmitting information on whether or not explicit release is required to the AMF or by transmitting information on whether or not explicit release is required indicating that explicit release is required to the AMF. The relay UE may notify the AMF that a release notification is required by transmitting information on whether a release notification is required to the AMF or by transmitting information on whether a release notification indicating that a release notification is required to the AMF. The relay UE may transmit Suspend Time to the AMF. After the AMF waits without releasing the NAS signaling connection, when the UE transmits a notification indicating that it is okay to release the NAS signaling to the AMF, the AMF may start the NAS signaling connection release procedure. However, the AMF may immediately start the NAS signaling connection release procedure when the suspend time expires before receiving the notification transmitted by the UE. |

In the example of Table 3, Explicit release may mean above-described whether or not to explicit release is required (eg, explicit NAS signaling connection release suspend (or postponement) of ii)). Release notification may mean above-described whether release notification or not (eg. information on whether release notification is required in iii)). Suspend time may mean above-described release suspend time (eg, time information for requesting release suspend (or postpone) of i)).

For reference, for the above-described a-3) N1 NAS signaling connection keep indication (or information) IE, the Relay UE may transmit another NAS message to the AMF instead of the configuration update completion message. Here, "another NAS message" may be a message newly defined in order to request the AMF to maintain the NAS signaling connection or to defer release of the NAS signaling connection. For example, the Relay UE may transmit a "CONFIGURATION UPDATE SUSPEND message" to the AMF. In this case, even if the CONFIGURATION UPDATE SUSPEND message does not additionally include IE, the CONFIGURATION UPDATE SUSPEND message itself may indicate that the NAS signaling connection will be postponed (or deferred) or to keep the NAS signaling connection. Specifically, the Relay UE transmits a configuration update suspend message including an N1 NAS signaling connection keep indication (or information) IE (N1 NAS signaling connection keep indication IE), or transmits only a configuration update suspend message, to the AMF, such that the Relay UE may request to postpone (or defer) the NAS signaling connection release.

Additionally, as described above, when the Relay UE requests the AMF to postpone (or defer) the release of the NAS signaling connection, the Relay UE may monitor whether packet (or data, signaling, etc.) transmission between the Remote UE and the network is performed. When packet (or data, signaling, etc.) transmission between the Remote UE and the network is terminated, the Relay UE may start a timer in the terminal. Here, the timer operated by the relay UE may be a kind of inactivity timer (eg, remote UE inactivity timer) for packet (or data, signaling, etc.) transmission between the remote UE and the network. For example, if the timer expires after a certain period of time (eg, a preset time such as 10 seconds), the Relay UE may determine that transmission of packets (or data, signaling, etc.) for the Remote UE is no longer necessary, and Relay UE may consider the Remote UE is in an IDLE state. The inactivity timer (eg, remote UE inactivity timer) used by the relay UE may operate for each remote UE, and one inactivity timer (eg, remote UE inactivity timer) may operate for a plurality of remote UEs connected to the relay UE. The time value used for the inactivity timer (eg, remote UE inactivity timer) may be a predetermined value (eg, 10 seconds, 15 seconds, etc.) or a value determined according to a network policy. Alternatively, the relay UE may use the time value received from the network as a time value used for the inactivity timer (eg, remote UE inactivity timer), and the Relay UE may determine and use a flexible value according to the usage situation of the PC5 resource of the UE (Relay UE).

For example, the relay UE may determine a time value (eg, T) used for the inactivity timer based on the number of Remote UEs communicating with it. It is assumed that the default inactivity timer value of the Relay UE is t0 (eg, 10 seconds, 12 seconds, etc.) and the number of Remote UEs connected to the Relay UE is n (eg, an arbitrary positive integer). As an example, the Relay UE may determine a time value used for the inactivity timer based on a linear correlation with respect to the number of Remote UEs. The relay UE may determine the time value used for the inactivity timer as $T=n*t0$. As another example, the Relay UE may determine a time value used for the inactivity timer based on a relationship that increases proportionally with respect to the number of Remote UEs. The relay UE may determine the time value used for the inactivity timer as $T=t0*(1+a)^{(n-1)}$. Here, a may be a value related to a rate that increases whenever a Remote UE is added, and may be a value between 0 and 1.

As described above, after the Relay UE requests the AMF to postpone (or defer) the NAS signaling connection release by performing operation of a-3) described above, when the Relay UE determines that there is no Remote UE in the RRC_CONNECTED state (or when data and/or signaling between the Remote UE and the network connected to the Relay UE no longer exist, or when data and/or signaling between the Remote UE and the network connected to the Relay UE does not exist within a predetermined time (eg, time corresponding to the time value of the inactivity timer (eg, remote UE inactivity timer) described above 0), in order to request release of the N1 NAS signaling connection, the Relay UE may transmit a NAS message to the AMF. For example, the Relay UE may request the AMF to release the N1 NAS signaling connection using a newly defined message (eg, a CONFIGURATION UPDATE RESUME message) or an existing configuration update completion message. As initiated by the AMF, when the N1 NAS signaling connection is released, the UE (Relay UE) may initiate a registration procedure for mobility and periodic registration update.

When the Relay UE performs the registration procedure, it may transmit a registration request message to the RAN. The RAN may transmit the registration request message sent by the UE to the AMF (the existing AMF or the newly selected AMF). The relay UE may transmit the registration request message by including follow-on request information in the registration request message. The follow-on request information may be used to request not to release the NAS signaling connection established during the registration procedure after the registration procedure is completed. That is, the Relay UE may request that the AMF not to release the NAS signaling connection after the registration procedure is completed by transmitting follow-on request information. Requesting that the Relay UE not to release the NAS signaling connection is to prepare for the possibility that the Relay UE may service the remote UE after re-registration.

For reference, when the UE receives the rejected NSSAI included in the configuration update command message, the UE may perform the following operations based on the rejection cause in the rejected NSSAI:

If the rejection cause indicates "S-NSSAI is not available in the current PLMN", the UE may add the rejected S-NSSAI to the rejected NSSAI for the current PLMN, and until the UE is powered off (switch off) or until the universal integrated circuit card (UICC) containing the Universal Subscriber Identity Module (USIM) is removed, the UE may not attempt to use this S-NSSAI within the current PLMN; or When the rejection cause indicates "S-NSSAI is not available in the current registration area", the UE may add the rejected S-NSSAI to the rejected NSSAI for the current registration area, and until the UE leaves the current registration area of the UE or until the UICC including USIM is removed, the UE may not attempt to use this S-NSSAI within the current registration area.

When the UE receives the T3447 value in the configuration update command message, and indicates "service gap control supported" in the registration request message sent by the UE, the UE stores the new T3447 value, and the UE may delete T3447 value previously stored in the UE, and the UE may use new T3447 value when timer T3447 starts.

Hereinafter, the completion of the general UE configuration update by the network will be described. For example, an operation performed by the AMF upon receiving a configuration update completion message transmitted by a UE (eg, a Relay UE) may be described below.

When the AMF receives the configuration update complete message from the UE, the AMF may stop the timer T3555.

If a new 5G-GUTI is included in the configuration update command message sent by the AMF to the UE, the AMF may consider the new 5G-GUTI is valid, and may consider the old 5G-GUTI is invalid.

If the new TAI list is included in the configuration update command message sent by the AMF to the UE, the AMF may consider the new 5G-GUTI is valid, and may consider the old 5G-GUTI is invalid.

If the new service area list is included in the configuration update command message sent by the AMF to the UE, the AMF may consider the new 5G-GUTI is valid, and may consider the old 5G-GUTI is invalid.

If the newly allowed NSSAI information is included in the configuration update command message sent by the AMF to the UE, the AMF may consider the newly allowed NSSAI is valid, and may consider the old allowed NSSAI is invalid. If the newly configured NSSAI information is included in the configuration update command message sent by the AMF to the UE, the AMF may consider the newly configured NSSAI information is valid, and may consider the old configured NSSAI information is invalid. If there is an active PDU session having an S-NSSAI that is not included in the newly allowed NSSAI, the AMF may notify the SMF associated with this PDU session to initiate the network-requested PDU session release procedure.

The configuration update command message sent by the AMF to the UE may include registration request bit of a configuration update indication (or information) IE. When the configuration update indication (or information) IE's Registration requested bit indicates "registration requested", the following operations may be performed:

a) The configuration update command message may include information such as the following examples:
 a-i) allowed NSSAI, established NSSAI, or both;
 a-ii) network slicing indication (or information) IE and network slicing subscription information change indication (or information) set to "Network slicing subscription changed"; or
 a-iii) do not include other parameters; and
b) an emergency PDU session may not have been established for the UE;

If the Registration requested bit of configuration update indication (or information) IE indicates "registration requested", and corresponds to the above a) and b), AMF may initiate the N1 NAS signaling connection release. When the AMF is requested by the UE to maintain (or not release, or to defer (or postpone) release) the N1 NAS signaling connection (eg, when N1 NAS signaling keep indication (or information) IE (N1 NAS signaling connection keep indication IE) related operation is performed), the AMF may not initiate release of the N1 NAS signaling connection. Thereafter, when the AMF receives a request to release the N1 NAS signaling connection from the UE (or when the Suspend Timer expires in the example described above), the AMF may initiate the release of the N1 NAS signaling connection.

If the LADN information IE is included in the configuration update command message sent by the AMF, the AMF may consider the old LADN information is invalid, and when there is new LADN information, the AMF may consider the new LADN information is valid. In this case, if the tracking area identity received in the new LADN information does not include the current TA, the AMF may notify the SMF to release the PDU session for the LADN, or to release the user-plane resource for the PDU session for the LADN.

If the new T3447 value is included in the configuration update command message sent by the AMF, the AMF may consider the new T3447 value is valid, and apply the new T3447 value, and use the value when the next time the timer T3447 starts.

1. First Example of the Disclosure of the Present Specification

The N1 NAS signaling connection keep indication IE (N1 NAS signaling connection keep indication IE) of a-3) described above will be described in detail.

An example of Table 4 below shows an example of information included in a NAS message transmitted by the terminal to the AMF according to the operation of the terminal (eg, a relay UE) described above. For example, Table 4 shows an example of a NAS message (eg, a configuration update complete message) including an N1 NAS signaling connection keep indication (or information) IE (N1 NAS signaling connection keep indication IE) transmitted by a terminal (eg, a relay UE).

TABLE 4

| IEI | Information Element | Type | Presence | Format | Length |
|---|---|---|---|---|---|
| | Extended protocol discriminator | Extended protocol discriminator | M | V | 1 |
| | Security header type | Security header type | M | V | ½ |
| | Spare half octet | Spare half octet | M | V | ½ |
| | Configuration update complete message identity | Message type | M | V | 1 |
| ZZ | N1 NAS signaling connection keep indication (or New indication/ information) | N1 NAS signaling connection keep indication New indication/ information | O | TV | 1 or 2 |

According to the example of Table 4, NAS messages (eg, configuration update complete message) may include IEs (eg, Extended protocol discriminator IE, Security header type IE, Spare half octet information, Configuration update complete message identity IE and N1 NAS signaling connection keep indication (or New indication/information, or including New indication/information)). Here, the name "N1 NAS signaling connection keep indication" is only an example, and the scope of the disclosure of the present specification may include any name can be used to request to maintain the NAS signaling connection or to request to suspend (or postpone) the release of the NAS signaling connection. Type may mean a type of each IE. Presence may indicate whether each of the IEs should be included in the configuration update completion message. M stands for Mandatory, and information corresponding to M may be mandatorily included in the configured update completion message. O means optional, and information corresponding to O may optionally be included in the configuration update completion message. Format may mean the format of each IE. V is Value, and when the format of the IE includes V, it indicates that the IE include that Value information (eg, Value field). T is a Type, and indicates that header information such as IEI of IE exists. Length means the length of each IE, and the unit of the length may be an octet. According to the example of Table 4, the terminal may optionally include the N1 NAS signaling connection keep indication or a new indication (or information) in the configuration update completion message.

The N1 NAS signaling connection keep indication or new indication (or information) IE may be used for the purpose of the UE notifying the AMF of the use of the UE-to-Network relay connection as a relay UE. For example, the Relay UE may request AMF to maintain NAS signaling connection or to fer (or postpone) the release of the NAS signaling connection, by transmitting an N1 NAS signaling connection keep indication or a new indication (or information) IE to the AMF. The N1 NAS signaling connection keep indication or new indication (or information) IE may be a type 1 information element. The type 1 information element may mean an IE including the T and V fields described in Table 4 described above.

An example of Table 5 shows a first example of an N1 NAS signaling connection keep indication or a new indication (or information) IE.

TABLE 5

| 8 | 7 | 6 | 5 | 4 | 3 | 2 | 1 | |
|---|---|---|---|---|---|---|---|---|
| New indication IEI | | | | Suspend Time | | ENRI | NASC | octet 1 |

New indication IEI may mean IEI of N1 NAS signaling connection keep indication or new indication (or information). NASC may mean N1 NAS signaling connection keep indication, and NASC may include information on whether to maintain NAS signaling connection. ENRI may mean Explicit NAS signaling connection release indication, and ENRI may mean "ii) information on whether or not explicit NAS signaling connection release is required" as described above. Suspend Time may mean "i) time information (eg, Suspend Time) for requesting suspension (or postponement) of release" as described above.

In the example of Table 5, the N1 NAS signaling connection keep indication or new indication (or information) IE includes all of Suspend Time, ENRI and NASC. However, this is only an example, and the N1 NAS signaling connection keep indication or new indication (or information) IE may include a combination of one or more of Suspend Time, ENRI, and NASC. For example, the N1 NAS signaling connection keep indication or new indication (or information) IE may include ENRI and NASC, or may include Suspend Time and ENRI.

In addition, in the example of Table 5, each position of the New indication IEI, Suspend Time, ENRI and NASC the number of bits included in each New indication IEI, Suspend Time, ENRI and NASC are only examples, New indication IEI, Suspend Time, ENRI and NASC may be located in different locations, and the number of bits included in each of New indication IEI, Suspend Time, ENRI and NASC may be different from the example in Table 5.

The example of Table 6 shows a specific example of the information included in the first example of Table 5.

TABLE 6

| N1 NAS signaling connection keep indication (NASC) (octet 1, bit 1) Bit | | |
|---|---|---|
| 1 | | |
| 0 | | N1 NAS signaling connection not kept |
| 1 | | N1 NAS signaling connection kept |
| Explicit NAS signaling connection Release Indication (ENRI) (octet 1, bit 2) Bit | | |
| 2 | | |
| 0 | | explicit NAS signaling connection release not required |
| 1 | | explicit NAS signaling connection release required |
| Suspend Time (octet 1, bit 3 to bit 4) Bits | | |
| 4 | 3 | |
| 0 | 0 | 5 seconds |
| 0 | 1 | 10 seconds |
| 1 | 0 | 30 seconds |
| 1 | 1 | 60 seconds |

According to the example of Table 6, NASC may be located in octet 1, bit 1 in the example of Table 5. When the bit of NASC is 0, it may mean not to maintain the N1 NAS signaling connection (or to release the N1 NAS signaling connection). When the bit of NASC is 1, it may mean to maintain the N1 NAS signaling connection (or to suspend or postpone release of the N1 NAS signaling connection). According to the example of Table 6, ENRI may be located in octet 1, bit 2 in the example of Table 5. When the bit of ENRI is 0, it may mean that explicit release of the NAS signaling connection is not required. When the bit of ENRI is 1, it may mean that explicit release of NAS signaling connection is required.

According to the example of Table 6, the Suspend Time may be located in octet 1, bit 3 to bit 4 in the example of Table 5. Depending on the combination of bits included in the Suspend Time, the time value for requesting release suspension (or postponement) may be 5 seconds, 10 seconds, 30 seconds, or 60 seconds. In the example of Table 6, the combination of the bits of the Suspend Time is only an example, and the time value of the Suspend Time may be less than 4 types (eg, 5 seconds, 10 seconds, 30 seconds, 60 seconds) or more than 4 types, and the time value indicated by each bit combination may be different from the example in Table 6.

An example of Table 7 shows a second example of an N1 NAS signaling connection keep indication or a new indication (or information) IE. The second example of Table 7 is an example that an N1 NAS signaling connection keep indication or a new indication (or information) IE further includes release notification indication ("iii) information on whether the Release Notification is required" explained above.

TABLE 7

| 8 | 7 | 6 | 5 | 4 | 3 | 2 | 1 | |
|---|---|---|---|---|---|---|---|---|
| | | New indication IEI | | | | | | octet 1 |
| | Suspend Time | | | spare | RNI | ENRI | NASC | octet 2 |

The example of Table 7 is an example that further includes a Release Notification Indication (RNI) in the example of Table 5. RNI may refer to "iii) information on whether release notification is required" as described above. In addition, the example of Table 7 may include a spare that does not contain any information. Other information other than the RNI added in the example of Table 7 (eg, the description of New indication IEI, Suspend Time, ENRI and NASC) may be applied in the same manner as described in the example of Table 5. The example of Table 8 shows specific examples of information included in the second example of Table 7.

TABLE 8

N1 NAS signaling connection keep indication (NASC) (octet 2, bit 1)
Bit

| | |
|---|---|
| 1 | |
| 0 | N1 NAS signaling connection not kept |
| 1 | N1 NAS signaling connection kept |

Explicit NAS signaling connection Release Indication (ENRI) (octet 2, bit 2)
Bit

| | |
|---|---|
| 2 | |
| 0 | explicit NAS signaling connection release not required |
| 1 | explicit NAS signaling connection release required |

Release Notification Indication (RNI) (octet 2, bit 3)
Bit

| | |
|---|---|
| 3 | |
| 0 | Release Notification from the UE not required |
| 1 | Release Notification from the UE required |

Suspend Time (octet 2, bit 5 to bit 8)
Bits

| 8 | 7 | 6 | 5 | |
|---|---|---|---|---|
| 0 | 0 | 0 | 0 | No Suspend Time |
| 0 | 0 | 0 | 1 | 1 seconds |
| 0 | 0 | 1 | 0 | 5 seconds |
| 0 | 0 | 1 | 1 | 10 seconds |
| 0 | 1 | 0 | 0 | 15 seconds |
| 0 | 1 | 0 | 1 | 20 seconds |
| ... | | | | |
| 1 | 1 | 1 | 0 | 600 seconds |
| 1 | 1 | 1 | 1 | Reserved |

According to the example of Table 8, NASC may be located in octet 2, bit 1 in the example of Table 7. The description of a case in which a bit of NASC is 0 and a case of 1 may be applied in the same manner as the description of NASC in the example of Table 6. According to the example of Table 8, ENRI may be located in octet 2, bit 2 in the example of Table 5. The description of the case where the bit of ENRI is 0 and the case of 1 may be applied in the same way as the description of ENRI in the example of Table 6.

According to the example of Table 8, the Suspend Time may be located in octet 2, bit 5 to bit 8 in the example of Table 6. Depending on the combination of bits included in the Suspend Time, it indicates that there is no time to request the release suspension (or postpone), or the time value to request the release suspension (or postpone) is 1 second, 5 seconds, 10 seconds, or 15 seconds, 20 seconds, . . . , 600 seconds. In the example of Table 6, the combination of bits of Suspend Time is only an example, and the time value of Suspend Time may be less than 16 or more than 16, and the time value represented by each bit combination may also be different from the example in Table 8.

According to the example of Table 8, the RNI may be located in octet 2, bit 3 in the example of Table 7. When the bit of the RNI is 0, it may mean that a release notification from the UE is not required. When the bit of the RNI is 1, it may mean that a release notification from the UE is required.

2. Second Example of the Disclosure of the Present Specification

Based on the first example of the disclosure of the present specification and/or the contents described in the disclosure of the present specification, the terminal and/or the network (eg, AMF) may additionally perform operations as described below. For example, the terminal and/or the network (eg, AMF) may perform an operation of releasing the N1 NAS signaling connection. A second example of the disclosure of the present specification may be an example describing a procedure for releasing an N1 NAS signaling connection.

A signaling procedure for releasing the N1 NAS signaling connection may be initiated by a network (eg, AMF).

In N1 mode, when the lower layer (eg, RRC layer) indicates that the Access Stratum connection is released, the UE (eg, Relay UE) enters 5GMM-IDLE mode, and it can be considered that the N1 NAS signaling connection is released. Here, the N1 mode may mean an operation mode of the UE that allows access to the 5G core network via the 5G access network.

In order for the network to release the N1 NAS signaling connection, the UE may perform the following operations:

In cases such as the following examples, the UE may start timer T3540. For reference, the T3540 may be, for example, a timer with a default value of 10 seconds, the UE may stop the timer T3540 when the N1 NAS signaling connection is released, and when the timer T3540 expires, the N1 NAS signaling connection may be released:

1) when the UE receives a configuration update command message (including a configuration update indication (or information) IE with the Registration requested bit set to "registration requested"), and the configuration update command message includes information such as a following example of:

1-i) the configuration update command message includes the newly allowed NSSAI information or the newly configured NSSAI information or both;

1-ii) the configuration update command message includes a network slicing subscription information change indication (or information); or 1-iii) do not include other parameters;

2) if the user-plane resource for the PDU session is not set up;

3) If the Remote UE in RRC_CONNECTED state does not exist (or if data and/or signaling between the Remote UE connected to the Relay UE and the network no longer exists, or if data and/or signaling between the Remote UE connected to the Relay UE and the network does not exist for a certain period of time (eg, time corresponding to time value of the inactivity timer (eg remote UE inactivity timer) described above)). For example, when the Relay UE determines that the Remote UE in the RRC_CONNECTTED state does not exist; and 4) If an emergency PDU session is not established.

When all conditions among 1) to 4) described above are satisfied, the UE (eg, a relay UE) may start timer T3540.

When timer T3540 expires, the UE locally releases the established N1 NAS signaling connection, and may newly perform a registration procedure.

When all of the conditions 1) to 4) described above are satisfied, the following operations may be performed:

- If the lower layer indicates that the Access Stratum connection has been released, the UE may stop timer T3540 and perform a new registration procedure.
- If the lower layer indicates that the user-plane resource for the PDU session has been set up, the UE may stop timer T3540 and transmit user data through the user plane. For reference, in this case, a new registration procedure may be performed when the UE enters the 5GMM-IDLE mode.
- When the lower layer indicates that the user-plane resource for the Remote UE(s) has been set up, the UE may stop timer T3540, transmit user data through the user plane, or transmit signaling for the Remote UE(s). For reference, in this case, a new registration procedure may be performed when the Remote UE enters 5GMM-IDLE mode.
- Upon receiving a request to perform emergency service fallback only for the UE connected to 3GPP access from an upper layer (eg, an application layer or Operating System (OS) layer that requests data transmission or call setup), or when the UE establishes an emergency PDU session, the UE may stop timer T3540 and locally release the N1 NAS signaling connection.

3. Third Example of the Disclosure of the Present Specification

The Relay UE may receive S-NSSAI information of the Remote UE from the Remote UE in the process of generating a direct link with the Remote UE(s). The relay UE may determine whether a service is possible through the relay UE for the S-NSSAI requested by the remote UE, based on the S-NSSSAI information of the remote UE. In addition, the Relay UE may apply access control, etc. to the Remote UE based on the S-NSSAI information of the Remote UE.

When the relay UE receives the UE configuration update command message including "registration requested" from the AMF, the relay UE may operate (eg, determine) as in the examples described below.

For example, "registration requested" may be included in the UE configuration update command message due to a change in the allowed NSSAI or registered NSSAI for the relay UE. In this case, the relay UE may check the NSSAI information of the Remote UEs received from the Remote UE during the direct link generating process. If the S-NSSAI previously provided by the Relay UE to the Remote UE is no longer available (eg, if the S-NSSAI is deleted from the allowed NSSAI, or if the S-NSSAI is added to the rejected NSSAI), when there is no allowed NSSAI that the Relay UE can provide to the Remote UE, the Relay UE may remove or release the connection with the remote UE.

In order for the Relay UE to remove or release a connection with the corresponding remote UE, the Relay UE may perform a procedure such as releasing a direct link with the corresponding remote UE. In this case, the relay UE may inform the remote UE of "there is no available allowed NSSAI (eg, no available allowed NSSAI)" as a release cause or the like. Alternatively, the Relay UE may transmit the rejected NSSAI received from the AMF to the Remote UE.

In addition, in this case (that is, when the Relay UE tries to disconnect the PC5 connection with the remote UE), the Relay UE does not need to check whether data and/or signaling of the Remote UE connected to itself is transmitted through the PC5 connection to be released. When the relay UE determines that it should release the direct link (eg, PC5 connection) to all remote UEs connected to the relay UE, instead of performing procedures such as transmitting the above-described configuration update message or information requesting the maintenance of the NAS signaling connection to the AMF, the Relay UE may immediately transmit a configuration update completion message to the AMF and may release the signaling connection.

In the same case as the above example (eg, when the S-NSSAI previously provided by the Relay UE to the Remote UE is no longer available (eg, when the S-NSSAI is deleted from the allowed NSSAI, or the S-NSSAI is added to the rejected NSSAI)), for example, even after the relay UE's NSSAIs are updated through the UE configuration update command message, one or more S-NSSAIs that the remote UE can use remain in the allowed NSSAIs. In this case, the Relay UE may still perform the operation of requesting to postpone (or defer) the release of the NAS signaling connection, as described above in the disclosure of this specification, the first examples to the second examples of the disclosure of the present specification.

4. Fourth Example of the Disclosure of the Present Specification

A fourth example of the disclosure of the present specification describes a specific example of operations of a Relay UE, a Remote UE, and/or a network node (eg. AMF) according to the contents described in the disclosure of the present specification, the first example, the second example, and/or the third example of the disclosure of the present specification will be described. In a fourth example of the disclosure of the present specification, a specific example of the operation of a Relay UE, a Remote UE, and/or a network node (eg, AMF) will be described with reference to FIG. 16.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 16:
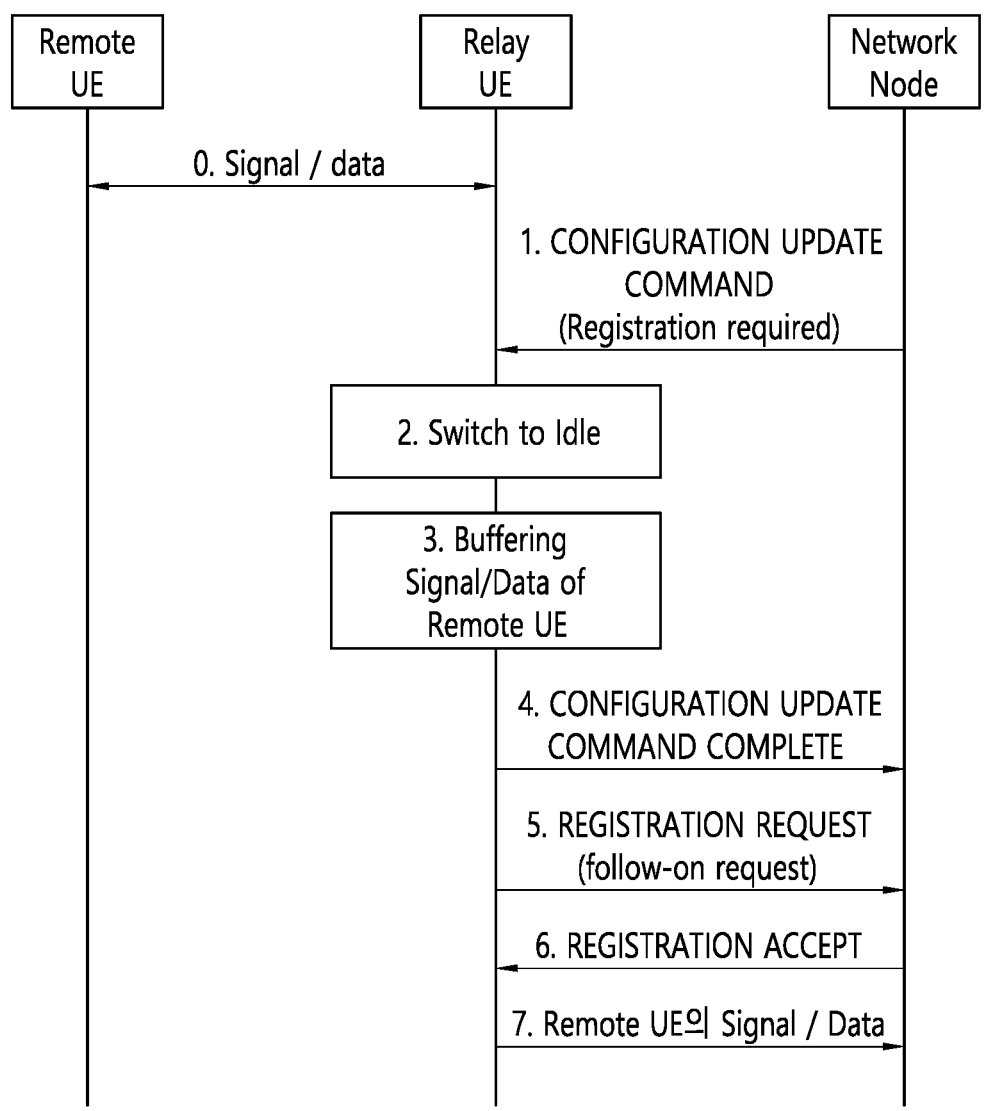
FIG. 16 shows a signal flow diagram according to a fourth example of the disclosure of the present specification.

FIG. 16 Shows a Signal Flow Diagram According to a Fourth Example of the Disclosure of the Present Specification.

FIG. 16 shows a Remote UE, a Relay UE, and a network node (eg, AMF). Also, although not shown in FIG. 16, communication between the Relay UE and the network node may be performed via an NG-RAN (eg, a base station such as gNB or ng-eNB).

For reference, the operations shown in FIG. 16 are only examples, and relay UE, Remote UE, base station (NG- RAN), and/or network node (eg, AMF) may perform operations not shown in FIG. 16, but according to the contents described in the disclosure of the specification, the first example, the second example, and/or the third example of the disclosure of the present specification.

0) The Relay UE has established (or generated) a direct link (eg, PC5 connection (or link)) with one or more Remote UEs, and the Relay UE is in a state performing data or signaling transmission of one or more Remote UEs. For example, the Relay UE may receive data or signaling from the Remote UE, and transmit the received data or signaling to a network node (eg, AMF, SMF, UPF, etc.) via NG-RAN. In addition, the Relay UE may receive data or signaling for the Remote UE from a network node (eg, AMF, SMF, UPF, etc.) via NG-RAN, and may transmit the received data or signaling to the Remote UE.

1) A network node (eg, AMF) may transmit a UCU message (CONFIGURATION UPDATE COMMAND message) including "registration required" information to the Relay UE. That is, the Relay UE may be requested to perform a registration procedure (eg, re-registration procedure) from the network while performing data or signaling transmission of one or more Remote UEs. Then, the Relay UE may operate as described below.

2) Since the Relay UE has received the UCU message (CONFIGURATION UPDATE COMMAND message) including "registration required" information, it can switch to IDLE mode to perform the registration procedure. For reference, step 2) in which the relay UE switches to the IDLE mode may be performed after step 4) is performed.

When the Relay UE needs to perform a registration procedure and is switched to the IDLE mode, the Uu communication unit of the Relay UE may transmit information that relaying is temporarily impossible to the PC5 communication unit of the Relay UE. Here, the Uu communication unit of the Relay UE may refer to a portion in which the Relay UE performs communication through the Uu interface. For example, the relay UE may refer to a physical layer of a modem performing communication through a Uu interface with a base station (eg, gNB or ng-eNB, etc.) and an upper layer of the physical layer. The PC5 communication unit of the Relay UE may refer to a part in which the Relay UE performs communication through the PC5 interface. For example, the PC5 communication unit of the Relay UE may refer to a physical layer of a modem performing communication through a PC5 interface with the Remote UE in the Relay UE and an upper layer of the physical layer. For reference, the upper layer here may include Layer 2 or Layer 3 or both of the Open System Interconnection (OSI) standard layer.

Hereinafter, the Uu communication unit may mean a Uu communication unit of a Relay UE, and the PC5 communication unit may mean a PC5 communication unit of the Relay UE.

"Information that relay is temporarily impossible" delivered by the Uu communication unit to the PC5 communication unit may include information, for example, "Perform re-registration procedure", "Temporarily stop Relay", "Relay UE enters IDLE mode", etc. Thereafter, each communication unit (Uu communication unit and PC5 communication unit) may perform the following operations.

When the PC5 communication unit receives event information (eg, information indicating that the relay to be transmitted is temporarily impossible) from the Uu communication unit, the PC5 communication unit may transmit response information (eg, Ack) to the Uu communication unit. However, the timing at which the PC5 communication unit transmits the response information to the information reception may be immediately after receiving the event information from the Uu communication unit, or may be after the transition to buffering described below is completed.

3) Realy UE may buffer data signaling of Remote UE. For reference, step 3) may be performed simultaneously with step 2) or may be performed before step 2). Also, step 3) may be omitted.

The PC5 communication unit may store the data/signaling received from the Remote UE(s) instead of relaying the data/signaling received from the Remote UE(s) through PC5 to the Uu communication unit. For example, the PC5 communication unit may store data/signaling received from the Remote UE(s) in a temporary memory or buffer located on a stack of the PC5 communication unit. That is, the packet forwarding path inside the Relay UE may be changed from the path of transferring from the top layer of the stack of the PC5 communication unit to the top layer of the relay stack of the Uu communication unit to the path of temporarily storing from the top layer of the stack of the PC5 communication unit to the upper layer of the PC5 communication unit or a buffer in the uppermost layer of the PC5 communication unit.

After the path change is completed, the PC5 communication unit may transmit a response (ack) to the Uu communication unit for receiving information from the Uu communication unit. Upon receiving this response, the Uu communication unit may transmit information to the NAS layer of the Relay UE. Information being delivered to the NAS layer after the path change is completed, may mean that information transmission (transmission of data or signaling) of the Relay UE is temporarily stopped.

4) The NAS layer may transmit a configuration update completion message to the network node (eg, AMF) as a response (eg, Ack) to the configuration update command message received in step 1). For reference, step 2) may be performed after step 4) is performed. For example, the Relay UE may switch to IDLE mode and perform a registration procedure.

The configuration update completion message transmitted by the Relay UE may include "N1 NAS signaling connection keep indication IE (N1 NAS signaling connection keep indication IE)" described above in the disclosure of this specification. Also, the Relay UE may transmit a newly defined NAS message (eg, a configuration update deferral message) instead of a configuration update completion message. A configuration update completion message, a newly defined NAS message (eg, a configuration update deferral message), or an N1 NAS signaling connection keep indication (or information) IE transmitted by the Relay UE, may include one or more of the three kinds of information (eg, i) release time information (eg, Suspend Time) to request a suspension (or postponement) of release, ii) information on whether or not an explicit NAS signaling connection release (Explicit NAS signaling connection release) is required, and iii) information on whether a Release Notification is required) described in the disclosure of this specification. As described above, operations based on Table 3 may also be performed.

5) The Relay UE may transmit a registration request message to a network node (eg, AMF) to perform a registration procedure. The Relay UE may transmit a registration request message by including "follow-on request" in the registration request message. The Relay UE may request not to release the NAS signaling connection from the AMF by transmitting a "follow-on request", after the registration procedure is completed. For example, if the Relay UE switches to IDLE mode due to a re-registration instruction from the network while the Relay UE is actively operating, the Relay UE may transmit "follow-on request" information to the network node (eg, AMF) when performing the re-registration procedure.

6) The network node (eg, AMF) may transmit a registration accept message to the Relay UE to inform that the registration procedure has been completed.

When the registration procedure is completed, that is, when the 5GMM state of the Relay UE becomes 5GMM-REGISTERED state and the 5GS update state becomes 5U1: UPDATED, the Uu communication unit may inform the PC5 communication unit that the relay impossible state (eg, "the relay is temporarily impossible state") has been terminated. Here, 5U1 may be an abbreviation for 5GS Update Status #1. For example, the Uu communication unit may transmit information indicating that the relay impossible state has terminated to the PC5 communication unit. The information indicating that the relay impossible state has terminated may include, for example, information such as "re-registration procedure complete", "termination of temporary relay interruption", "relay UE entering connected mode" or "relay possible", etc.

When the PC5 communication unit receives such event information (eg, information indicating that the relay impossible state is terminated) from the Uu communication unit, the PC5 communication unit may transmit response information (Ack) for priority information reception to the Uu communication unit. Alternatively, the PC5 communication unit may notify the Uu communication unit that the relay impossible state has terminated due to the resumption of data/signaling packet transmission, which will be described below, without a separate Ack transmission.

7) The PC5 communication unit may transmit data/signaling of the remote UE (eg, data/signaling received from the remote UE through the PC5 interface) stored in the temporary memory or buffer as described above to the Uu communication unit again. That is, the PC5 communication unit may transmit packets (packets related to data/signaling of the remote UE) stored in the buffer of the PC5 communication unit to the uppermost layer of the relay stack of the Uu communication unit. The uppermost layer of the relay stack of the Uu communication unit may be, for example, an adaptation layer, a PDCP layer, an RRC layer, or an RLC layer.

The order in which the PC5 communication unit transmits the stored (or buffered) packets to the Uu communication unit may be the order in which the first stored (or buffered) packets are delivered first according to the FCFS (First come First Served) principle, or the PC5 communication unit may transmit the stored (or buffered) signaling to the Uu communication unit preferentially over data. In order for the PC5 communication unit to transmit signaling to the Uu communication unit preferentially over data, the temporary memory or buffer of the PC5 communication unit may be operated separately for data storage and signaling storage so that data and signaling can be separately stored in the PC5 communication unit.

When the PC5 communication unit transmits all stored (or buffered) packets to the Uu communication unit, the PC5 communication unit directly transmit the data/signaling packets of the remote UE received by the PC5 communication unit from the remote UE to the Uu communication unit, instead of storing the data/signaling packet in the temporary memory or buffer of the PC5 communication unit. Alternatively, the PC5 communication unit may process the packet stored in the temporary memory or buffer and process the packet newly received from the remote UE equally or simultaneously.

Optionally, the PC5 communication unit records a time stamp when storing the data/signaling packet of the Remote UE in a temporary memory or buffer, such that the PC5 communication unit may delete corresponding packet from the temporary memory or buffer, after a predetermined time (eg, a preset time such as 10 seconds or a time value received from the network). The PC5 communication unit deletes the data/signaling packet of the Remote UE after storing it for a certain period of time, this is to prevent a meaningless waste of resources when the packet is transmitted after the relay interruption is terminated because the validity of the corresponding packet decreases when the relay interruption time becoming long. Here, the "a certain period of time" used to delete the data/signaling packet of the Remote UE may be determined by the PC5 communication unit based on the general re-transmission timer value in the case of signaling, and in the case of data, the "a certain period of time" may be determined by the PC5 communication unit based on retransmission timer value of the upper layer (IP layer, etc.). Alternatively, it may be determined based on QoS flow information set in the PC5 link. If it is difficult for the PC5 communication unit to perform buffering because the PDB value required by the QoS Flow is small, the Relay UE may release the related QoS Flows. In this process, the Relay UE may inform remote UEs that the PC5 link is released due to re-registration. For example, the Relay UE may inform the remote UE that the PC5 link is released due to re-registration with a timer through cause or indication (or information). Upon receiving this, the remote UE may find a new relay UE and receive a service, or may set up a QoS flow with the same relay UE again after the timer expires.

For reference, the reason why the AMF (Relay AMF) of the Relay UE determines or can recognize the AMF (remote AMF) of the remote UE is that when the relationship between the Relay UE and the Remote UE is formed (or established), it is because that the Relay UE and/or the Remote UE may perform interaction with the network (eg, may perform interaction for authentication/authorization). Specifically, when the relay UE and/or the remote UE perform interaction with the network (or after that), the serving AMF of each UE (remote UE or relay UE) (eg, relay AMF and remote AMF) may obtain and store information of the counterpart UE (eg, ID of the counterpart UE, temporary ID, serving AMF information, etc.) in the context of the serving UE. Alternatively, the serving AMF (eg, relay AMF and remote AMF) of each UE (remote UE or relay UE) may obtain the serving AMF information of the counterpart UE from the UDM.

As described in the disclosure of this specification, for the re-registration instruction of the network (eg, AMF) due to the UE configuration update, the terminal (eg, Relay UE) may perform operation requesting suspend (or postpone) the release of the NAS signaling connection to the network (eg, AMF). And, in order for the terminal to perform this operation, the terminal additionally include information (eg. i) time information for requesting release suspension (or postponement) (eg. Suspend Time), ii) information on whether an explicit NAS signaling connection release is required, and iii) information on whether a Release Notification is required) in NAS message (eg. a configuration update suspend message, or a configuration update resume message, etc.) transmitted to AMF As described in the disclosure of this specification, terminals (eg, Relay UEs and remote UEs) using UE-to- Network Relay in 5G systems may maintain the user experience of the Remote UE above a certain level, even if relay operation is temporarily impossible due to relay UE performing re-registration procedure according to a request of a network.

For reference, the operation of the terminal (eg, Remote UE or Relay UE) described in this specification may be implemented by the apparatus of FIGS. 17 to 21 to be described below. For example, the terminal (eg, Remote UE or Relay UE) may be the first device 100a or the second device 100b of FIG. 18. For example, an operation of a terminal (eg, a Remote UE or a Relay UE) described herein may be processed by one or more processors 1020a or 1020b. The operations of the UE described herein may be stored in one or more memories 1010a or 1010b in the form of instructions/programs (e.g. instructions, executable code) executable by one or more processors 1020a or 1020b. One or more processors 1020a or 1020b control one or more memories 1010a or 1010b and one or more transceivers 1031a or 1031b, and may perform the operation of the terminal (eg, UE) described in the disclosure of the present specification by executing instructions/programs stored in one or more memories 1010a or 1010b as disclosed herein.

In addition, instructions for performing an operation of a terminal (eg, a Remote UE or a Relay UE) described in the disclosure of the present specification may be stored in a non-volatile computer-readable storage medium in which it is recorded. The storage medium may be included in one or more memories 1010a or 1010b. And, the instructions recorded in the storage medium may be executed by one or more processors 1020a or 1020b to perform the operation of the terminal (eg, Remote UE or Relay UE) described in the disclosure of the present specification.

For reference, the operation of a network node (eg, AMF, SMF, UPF, UDM, DN, NG-RAN, etc.) or a base station (eg, NG-RAN, gNB, eNB, etc.) described in this specification will be may be implemented by the apparatus described below in FIGS. 17 to 21. For example, the network node may be the first device 100a or the second device 100b of FIG. 18. For example, the operation of the network node described herein may be processed by one or more processors 1020a or 1020b. The operations of the network node or base station described herein may be stored in one or more memories 1010a or 1010b in the form of instructions/programs (e.g. instruction, executable code) executable by one or more processors 1020a or 1020b. One or more processors 1020a or 1020b control one or more memories 1010a or 1010b and one or more transceivers 1031a or 1031b, and may perform the operation of the network node or the base station described in the disclosure of the present specification by executing instructions/programs stored in one or more memories 1010a or 1010b as disclosed herein.

IV. Examples to which the Disclosure of the Present Specification Applies

Although not limited thereto, the various descriptions, functions, procedures, suggestions, methods, and/or operational flowcharts of the disclosure of the present specification disclosed in this document may be applied in various fields requiring wireless communication/connection (eg, 5G) between devices.

Hereinafter, it will be exemplified in more detail with reference to the drawings. In the following drawings/descriptions, the same reference numerals may represent the same or corresponding hardware blocks, software blocks, or functional blocks, unless otherwise indicated.

Figure 17:
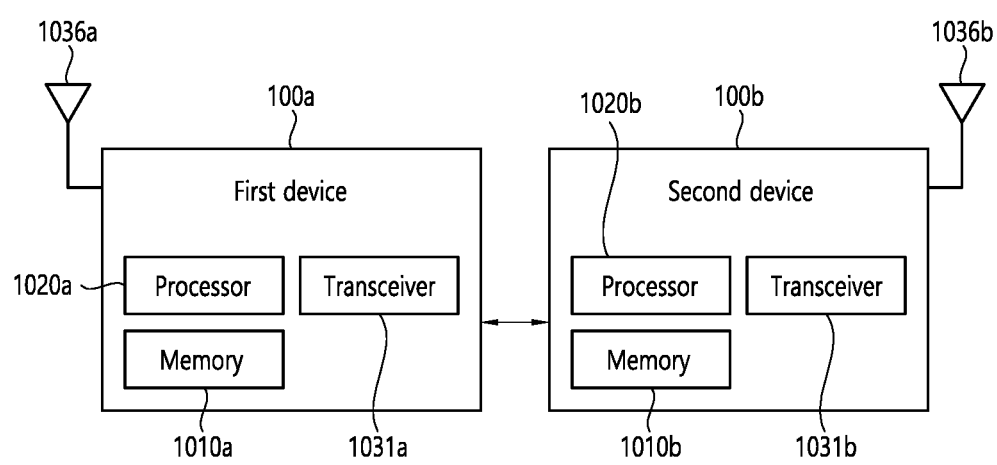
FIG. 17 illustrates a wireless communication system according to an embodiment.

FIG. 17 Illustrates a Wireless Communication System According to an Embodiment.

Referring to FIG. 17, the wireless communication system may include a first device 100a and a second device 100b. The first device 100a and the second device 100b may be wireless communication devices capable of performing wireless communication.

The first device 100a may be a UE described in the disclosure of the present specification. Or, the first device 100a may be a base station, a network node, a transmission terminal, a reception terminal, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

The second device 100b may be a network node (e.g., AMF or MME) described in the disclosure of the present specification. Or, the second device 100b may be a base station, a network node, a transmission terminal, a reception terminal, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

For example, the UE may include a cellular phone, a smart phone, a laptop computer, a terminal for digital broadcasting, a Personal Digital Assistants (PDA), a Portable Multimedia Player (PMP), a navigation, a slate PC, a tablet PC, an ultrabook, a wearable device (e.g., a watch type terminal (smartwatch), a glass type terminal (smart glass), a Head Mounted Display (HMD)), and so on. For example, the HMD may be a display device of a form, which is worn on the head. For example, the HMD may be used to implement VR, AR or MR.

For example, the drone may be a flight vehicle that flies by a wireless control signal without a person being on the flight vehicle. For example, the VR device may include a device implementing the object or background of a virtual world. For example, the AR device may include a device implementing the object or background of a virtual world by connecting it to the object or background of the real world. For example, the MR device may include a device implementing the object or background of a virtual world by merging it with the object or background of the real world. For example, the hologram device may include a device implementing a 360-degree stereographic image by recording and playing back stereographic information using the interference phenomenon of a light beam generated when two lasers called holography are met. For example, the public safety device may include a video relay device or an imaging device capable of being worn on a user's body. For example, the MTC device and the IoT device may be a device that does not require a person's direct intervention or manipulation. For example, the MTC device and the IoT device may include a smart meter, a vending machine, a thermometer, a smart bulb, a door lock or a variety of sensors. For example, the medical device may be a device used for the purpose of diagnosing, treating, reducing, handling or preventing a disease. For example, the medical device may be a device used for the purpose of diagnosing, treating, reducing or correcting an injury or obstacle. For example, the medical device may be a device used for the purpose of testing, substituting or modifying a structure or function. For example, the medical device may be a device used for the purpose of controlling pregnancy. For example, the medical device may include a device for medical treatment, a device for operation, a device for (external) diagnosis, a hearing aid or a device for a surgical procedure. For example, the security device may be a device installed to prevent a possible danger and to maintain safety. For example, the security device may be a camera, CCTV, a recorder or a blackbox. For example, the FinTech device may be a device capable of providing financial services, such as mobile payment. For example, the FinTech device may include a payment device or Point of Sales (PoS). For example, the climate/environment device may include a device for monitoring or predicting the climate/environment.

The first device 100a may include at least one processor such as a processor 1020a, at least one memory such as memory 1010a, and at least one transceiver such as a transceiver 1031a. The processor 1020a may perform the above-described functions, procedures, and/or methods. The processor 1020a may perform one or more protocols. For example, the processor 1020a may perform one or more layers of a radio interface protocol. The memory 1010a is connected to the processor 1020a, and may store various forms of information and/or instructions. The transceiver 1031a is connected to the processor 1020a, and may be controlled to transmit and receive radio signals.

The second device 100b may include at least one processor such as a processor 1020b, at least one memory device such as memory 1010b, and at least one transceiver such as a transceiver 1031b. The processor 1020b may perform the above-described functions, procedures and/or methods. The processor 1020b may implement one or more protocols. For example, the processor 1020b may implement one or more layers of a radio interface protocol. The memory 1010b is connected to the processor 1020b, and may store various forms of information and/or instructions. The transceiver 1031b is connected to the processor 1020b and may be controlled transmit and receive radio signals.

The memory 1010a and/or the memory 1010b may be connected inside or outside the processor 1020a and/or the processor 1020b, respectively, and may be connected to another processor through various technologies, such as a wired or wireless connection.

The first device 100a and/or the second device 100b may have one or more antennas. For example, an antenna 1036a and/or an antenna 1036b may be configured to transmit and receive radio signals.

Figure 18:
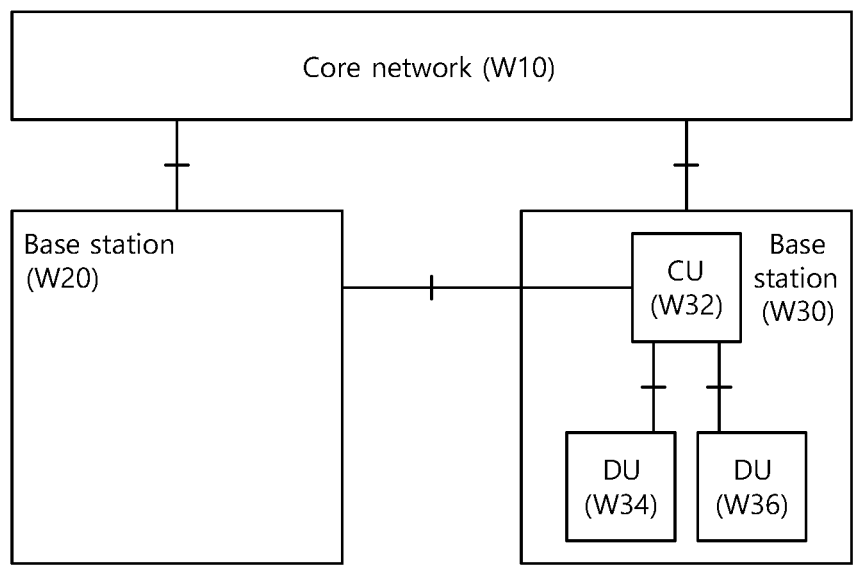
FIG. 18 illustrates a block diagram of a network node according to an embodiment.

FIG. 18 Illustrates a Block Diagram of a Network Node According to an Embodiment.

In particular, FIG. 18 is a diagram illustrating in detail a case in which a base station is divided into a Central Unit (CU) and a Distributed Unit (DU).

Referring to FIG. 18, base stations W20 and W30 may be connected to a core network W10. The base station W30 may be connected to a neighbor base station W20. For example, an interface between the base stations W20 and W30 and the core network W10 may be referred to as an NG. An interface between the base station W30 and the neighbor base station W20 may be referred to as an Xn.

The base station W30 may be divided into a CU W32 and DUs W34 and W36. That is, the base station W30 may be hierarchically divided and operated. The CU W32 may be connected to one or more DUs W34 and W36. For example, an interface between the CU W32 and the DU W34, W36 may be referred to as an F1. The CU W32 may perform a function of higher layers of the base station. The DU W34, W36 may perform a function of lower layers of the base station. For example, the CU W32 may be a logical node that hosts Radio Resource Control (RRC), Service Data Adaptation Protocol (SDAP) and Packet Data Convergence Protocol (PDCP) layers of the base station (e.g., gNB). The DU W34, W36 may be a logical node that hosts Radio Link Control (RLC), Media Access Control (MAC) and physical (PHY) layers of the base station. Alternatively, the CU W32 may be a logical node that hosts RRC and PDCP layer of a base station (e.g., en-gNB).

An operation of the DU W34, W36 may be partially controlled by the CU W32. The one DU W34, W36 may support one or more cells. One cell may be supported by only the one DU W34, W36. The one DU W34, W36 may be connected to the one CU W32, and the one DU W34, W36 may be connected to a plurality of CUs by a proper implementation.

Figure 19:
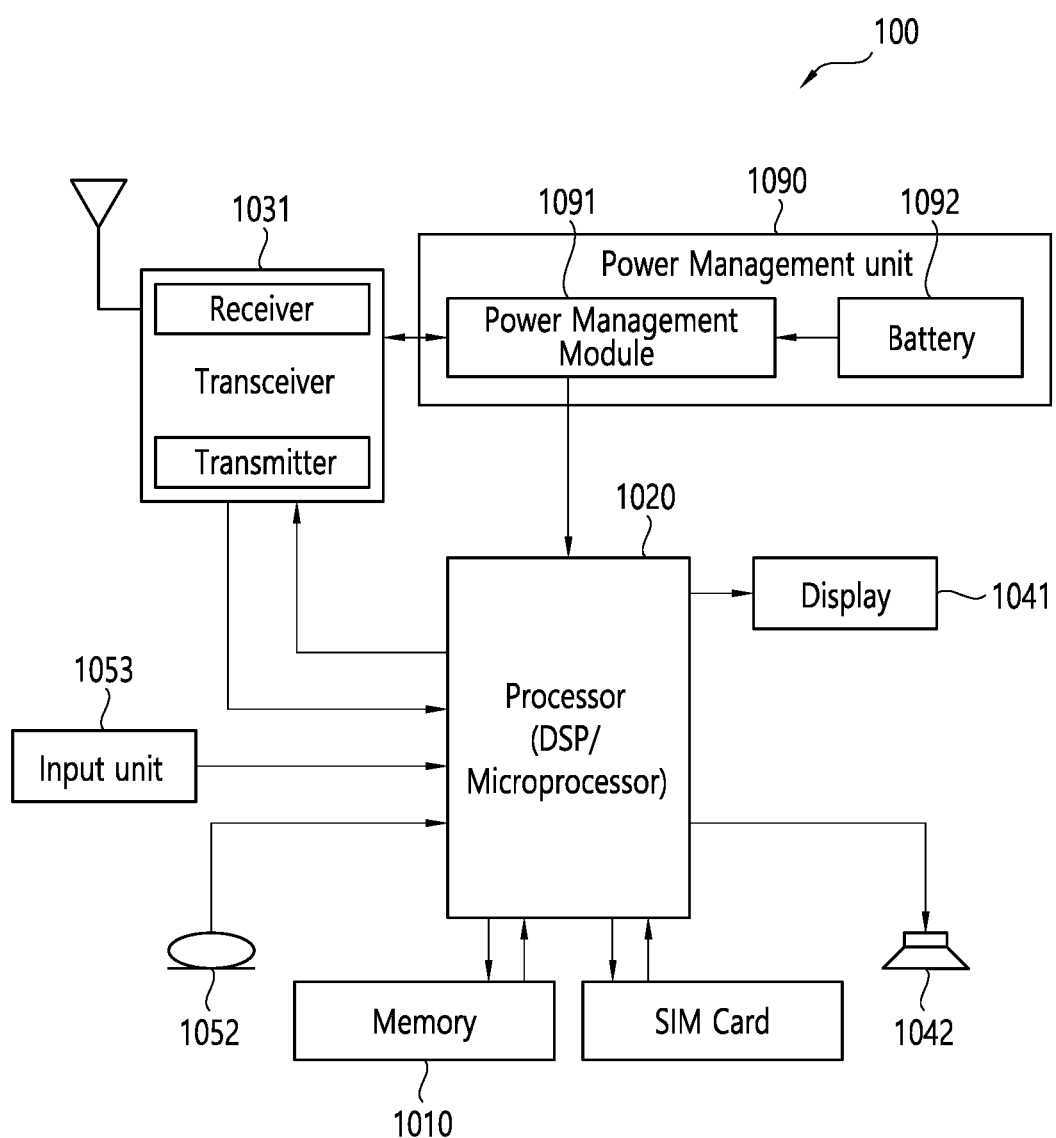
FIG. 19 is a block diagram illustrating a configuration of a UE according to an embodiment.

FIG. 19 is a Block Diagram Illustrating a Configuration of a UE According to an Embodiment.

In particular, the UE 100 shown in FIG. 19 is a diagram illustrating the first device of FIG. 17 in more detail.

A UE includes a memory 1010, a processor 1020, a transceiver 1031, a power management module 1091, a battery 1092, a display 1041, an input unit 1053, a speaker 1042, a microphone 1052, a Subscriber Identification Module (SIM) card, and one or more antennas.

The processor 1020 may be configured to implement the proposed function, process and/or method described in the present disclosure. Layers of a wireless interface protocol may be implemented in the processor 1020. The processor 1020 may include Application-Specific Integrated Circuit (ASIC), other chipset, logical circuit and/or data processing apparatus. The processor 1020 may be an Application Processor (AP). The processor 1020 may include at least one of a Digital Signal Processor (DSP), a Central Processing Unit (CPU), a Graphics Processing Unit (GPU) and a Modulator and Demodulator (Modem). An example of the processor 1020 may be SNAPDRAGON™ series processor manufactured by Qualcomm®, EXYNOS™ series processor manufactured by Samsung®, A series processor manufactured by Apple®, HELIO™ series processor manufactured by MediaTek®, ATOM™ series processor manufactured by INTEL®, or the corresponding next generation processor.

The power management module 1091 manages a power for the processor 1020 and/or the transceiver 1031. The battery 1092 supplies power to the power management module 1091. The display 1041 outputs the result processed by the processor 1020. The input unit 1053 receives an input to be used by the processor 1020. The input unit 1053 may be displayed on the display 1041. The SIM card is an integrated circuit used to safely store International Mobile Subscriber Identity (IMSI) used for identifying a subscriber in a mobile telephoning apparatus such as a mobile phone and a computer and the related key. Many types of contact address information may be stored in the SIM card.

The memory 1010 is operably coupled with the processor 1020 and stores various types of information to operate the processor 1020. The memory may include Read-Only Memory (ROM), Random Access Memory (RAM), flash memory, a memory card, a storage medium, and/or other storage device. When the embodiment is implemented in software, the techniques described in the present disclosure may be implemented in a module (e.g., process, function, etc.) for performing the function described in the present disclosure. A module may be stored in the memory 1010 and executed by the processor 1020. The memory may be implemented inside of the processor 1020. Alternatively, the memory 1010 may be implemented outside of the processor 1020 and may be connected to the processor 1020 in communicative connection through various means which is well-known in the art.

The transceiver 1031 is operably connected to the processor 1020 and transmits and/or receives a radio signal. The transceiver 1031 includes a transmitter and a receiver. The transceiver 1031 may include a baseband circuit to process a radio frequency signal. The transceiver controls one or more antennas to transmit and/or receive a radio signal. In order to initiate a communication, the processor 1020 transfers command information to the transceiver 1031 to transmit a radio signal that configures a voice communication data. The antenna functions to transmit and receive a radio signal. When receiving a radio signal, the transceiver 1031 may transfer a signal to be processed by the processor 1020 and transform a signal in baseband. The processed signal may be transformed into audible or readable information output through the speaker 1042.

The speaker 1042 outputs a sound related result processed by the processor 1020. The microphone 1052 receives a sound related input to be used by the processor 1020.

A user inputs command information like a phone number by pushing (or touching) a button of the input unit 1053 or a voice activation using the microphone 1052. The processor 1020 processes to perform a proper function such as receiving the command information, calling a call number, and the like. An operational data on driving may be extracted from the SIM card or the memory 1010. Furthermore, the processor 1020 may display the command information or driving information on the display 1041 such that a user identifies it or for convenience.

Figure 20:
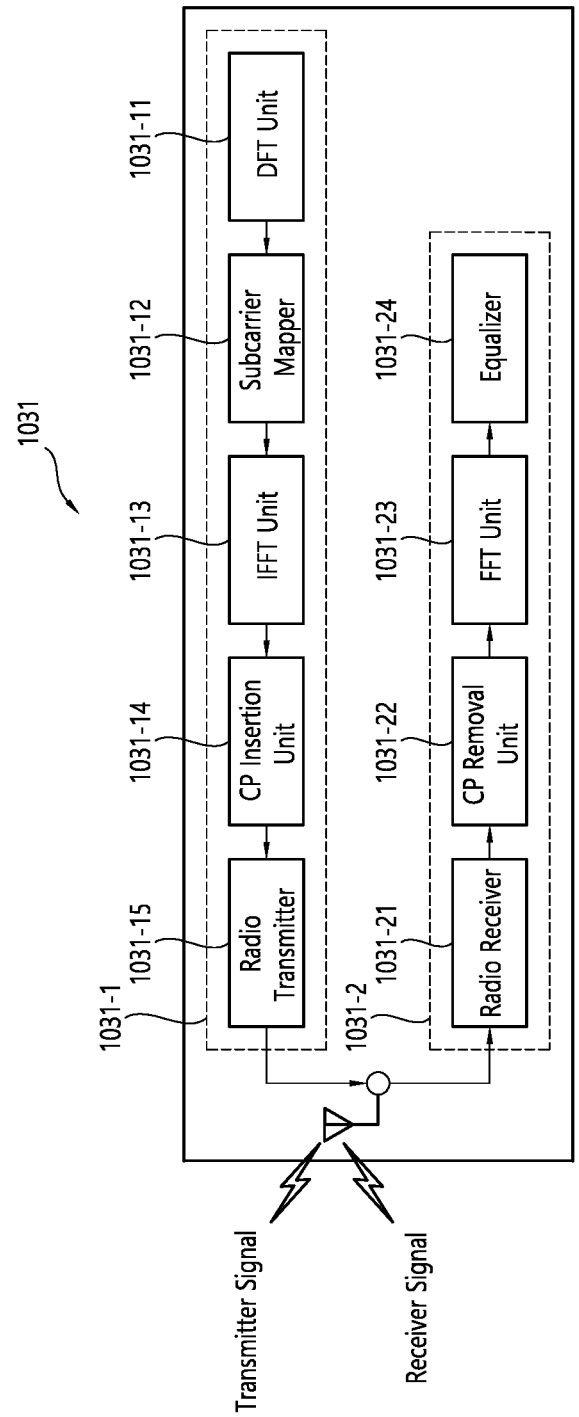
FIG. 20 is a detailed block diagram illustrating the transceiver of the first device shown in FIG. 17 or the transceiver of the device shown in FIG. 19 in detail.

FIG. 20 is a Detailed Block Diagram Illustrating the Transceiver of the First Device Shown in FIG. 17 or the Transceiver of the Device Shown in FIG. 19 in Detail.

Referring to FIG. 20, the transceiver 1031 includes a transmitter 1031-1 and a receiver 1031-2. The transmitter 1031-1 includes a Discrete Fourier Transform (DFT) unit 1031-11, a subcarrier mapper 1031-12, an Inverse Fast Fourier Transform (IFFT) unit 1031-13 and a CP insertion unit 1031-14, and a radio transmitter 1031-15. The transmitter 1031-1 may further include a modulator. In addition, for example, a scramble unit (not shown), a modulation mapper (not shown), a layer mapper (not shown) and a layer permutator (not shown) may be further included and may be disposed before the DFT unit 1031-11. That is, in order to prevent an increase in the Peak-to-Average Power Ratio (PAPR), the transmitter 1031-1 passes information through the DFT 1031-11 before mapping a signal to a subcarrier. After subcarrier mapping, by the subcarrier mapper 1031-12, of the signal spread (or precoded in the same sense) by the DFT unit 1031-11, a signal on the time axis is made through the IFFT unit 1031-13.

The DFT unit 1031-11 outputs complex-valued symbols by performing DFT on input symbols. For example, when Ntx symbols are input (Ntx is a natural number), the DFT size is Ntx. The DFT unit 1031-11 may be referred to as a transform precoder. The subcarrier mapper 1031-12 maps the complex symbols to each subcarrier in the frequency domain. The complex symbols may be mapped to resource elements corresponding to resource blocks allocated for data transmission. The subcarrier mapper 1031-12 may be referred to as a resource element mapper. The IFFT unit 1031-13 outputs a baseband signal for data that is a time domain signal by performing IFFT on an input symbol. The CP insertion unit 1031-14 copies a part of the rear part of the baseband signal for data and inserts it in the front part of the baseband signal for data. Inter-Symbol Interference (ISI) and Inter-Carrier Interference (ICI) are prevented through CP insertion, so that orthogonality can be maintained even in a multi-path channel.

On the other hand, the receiver 1031-2 includes a radio receiver 1031-21, a CP remover 1031-22, an FFT unit 1031-23, and an equalizer 1031-24, etc. The radio receiver 1031-21, the CP removing unit 1031-22, and the FFT unit 1031-23 of the receiver 1031-2 performs the reverse function of the radio transmitter 1031-15, the CP insertion unit 1031-14 and the IFFT unit 1031-13 of the transmitter 1031-1. The receiver 1031-2 may further include a demodulator.

Figure 21:
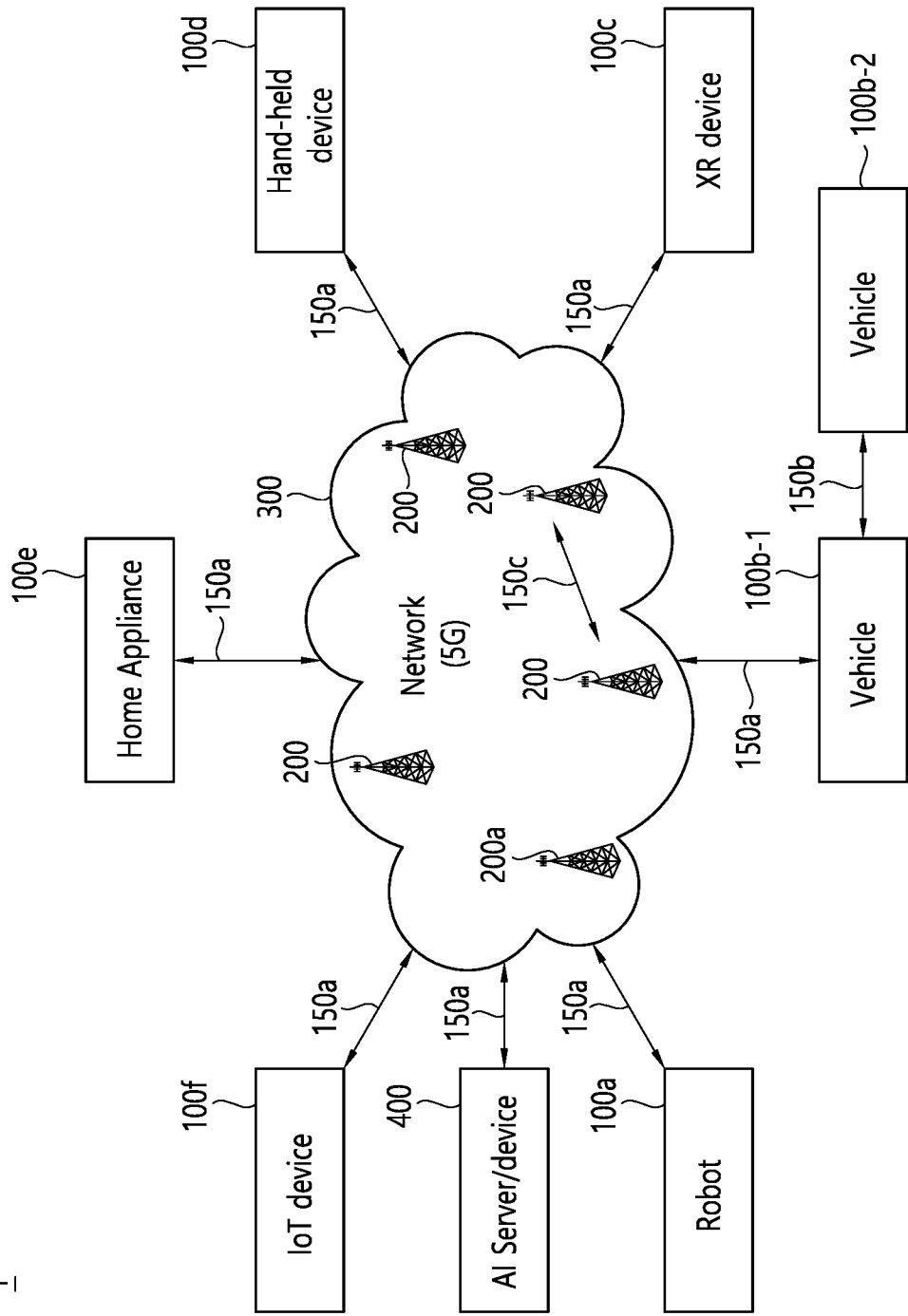
FIG. 21 illustrates a communication system 1 applied to the disclosure of the present specification.

FIG. 21 Illustrates a Communication System 1 Applied to the Disclosure of the Present Specification.

Referring to FIG. 21, the communication system 1 applied to the disclosure of the present specification includes a wireless device, a base station, and a network. Here, the wireless device refers to a device that performs communication using a radio access technology (e.g., 5G New RAT (NR)), Long-Term Evolution (LTE)), and may be referred to as a communication/wireless/5G device. Although not limited thereto, the wireless device may include a robot 100*a*, a vehicle 100*b*-1, 100*b*-2, an eXtended Reality (XR) device 100*c*, a hand-held device 100*d*, and a home appliance 100*e*, an Internet-of-Things (IoT) device 100*f*, and an AI device/server 400. For example, the vehicle may include a vehicle equipped with a wireless communication function, an autonomous driving vehicle, a vehicle capable of performing inter-vehicle communication, and the like. Here, the vehicle may include an Unmanned Aerial Vehicle (UAV) (e.g., a drone). XR devices include Augmented Reality (AR)/Virtual Reality (VR)/Mixed Reality (MR) devices, and may be implemented in the form of a Head-Mounted Device (HMD), a Head-Up Display (HUD) provided in a vehicle, a television, a smartphone, a computer, a wearable device, a home appliance, a digital signage, a vehicle, a robot, and the like. The hand-held device may include a smartphone, a smart pad, a wearable device (e.g., a smart watch, smart glasses), a computer (e.g., a laptop computer), and the like. Home appliances may include a TV, a refrigerator, a washing machine, and the like. The IoT device may include a sensor, a smart meter, and the like. For example, the base station and the network may be implemented as a wireless device, and the specific wireless device 200*a* may operate as a base station/network node to other wireless devices.

Here, the wireless communication technology implemented in the wireless devices 100*a* to 100*f*, 400, and 100 and 200 of FIG. 18 of the present specification may include LTE, NR, and 6G as well as the narrowband Internet of Things for low-power communication. At this time, for example, NB-IoT technology may be an example of LPWAN (Low Power Wide Area Network) technology, and may be implemented in standards such as LTE Cat NB1 and/or LTE Cat NB2, and is not limited to the above-mentioned names. Additionally or alternatively, the wireless communication technology implemented in the wireless devices 100*a* to 100*f*, 400, 100 and 200 in FIG. 18 of the present specification may perform communication based on the LTE-M technology. In this case, as an example, the LTE-M technology may be an example of an LPWAN technology, and may be called by various names such as enhanced machine type communication (eMTC). For example, LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described name. Additionally or alternatively, the wireless communication technology implemented in the wireless devices 100a to 100f, 400, and 100 and 200 of FIG. 18 of the present specification may include at least any one of ZigBee, Bluetooth, and low-power wide area network (Low) in consideration of low-power communication. Power Wide Area Network (LPWAN), but is not limited to the above-described name. For example, the ZigBee technology can create PAN (personal area networks) related to small/low-power digital communication based on various standards such as IEEE 802.15.4, and can be called by various names.

The wireless devices 100a to 100f may be connected to the network 300 via the base station 200. An Artificial Intelligence (AI) technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the base stations 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., Vehicle-to-Vehicle (V2V)/Vehicle-to-Everything (V2X) communication). The IoT device (e.g., a sensor) may perform direct communication with other IoT devices (e.g., sensors) or other wireless devices 100a to 100f.

Wireless communication/connections 150a, 150b and 150c may be established between wireless device 100a to 100f and base station 200, between base station 200/base station 200. Herein, the wireless communication/connections may be established through various RATs (e.g., 5G NR) such as uplink/downlink communication 150a, sidelink communication (or Device-to-Device (D2D) communication) 150b, inter-base station communication 150c (e.g., relay, Integrated Access and Backhaul (IAB)), etc. The wireless devices 100a to 100f and the base station 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

The following drawings were created to explain a specific example of the present specification. Since the names of specific devices or specific signal/message/field names described in the drawings are presented as examples, the technical features of the present specification are not limited to the specific names used in the following drawings.

In the above, preferred embodiments have been exemplarily described, but the disclosure of the present specification is not limited to such specific embodiments. Therefore, the disclosure of the present specification may be modified, changed, or improved in various forms within the present specification and the scope set forth in the claims.

In the exemplary system described above, the methods are described on the basis of a flowchart as a series of steps or blocks, but are not limited to the order of the steps described, some steps may occur in a different order or concurrent with other steps as described above. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim of the present specification may be combined to be implemented as an apparatus, and the technical features of the method claim of the present specification and the technical features of the apparatus claim of the present specification may be combined and implemented as a method.

What is claimed is:

1. A method for relay user equipment (UE) to perform communication related to configuration update, comprising:
   receiving a Configuration Update Command message including information requesting to perform a registration procedure from a network node; and
   transmitting a response message to the configuration update command message to the network node,
   based on that the Remote UE connected to the Relay UE is in a Radio Resource Control (RRC)_CONNECTED state, wherein the response message includes information requesting to maintain a Non-Access Stratum (NAS) signaling connection between the Relay UE and the network node.

2. The method of claim 1, further comprising:
   determining whether the Remote UE is in the RRC_CONNECETD state, based on the Configuration Update Command message is received.

3. The method of claim 1, further comprising:
   transmitting a registration request message to the network node, based on information requesting to perform the registration procedure is received.

4. The method of claim 3,
   wherein the registration request message is transmitted based on that all Remote UEs connected to the Relay UE are in RRC_IDLE state.

5. The method of claim 3,
   wherein the registration request message includes information requesting to maintain the NAS signaling connection newly established between the relay UE and the network node based on the registration procedure after the registration procedure is completed.

6. The method of claim 1,
   wherein the response message includes one or more information of i) time information for requesting to postpone release of the NAS signaling connection, ii) information on whether or not an explicit NAS signaling connection release is required, and/or iii) information on whether a release notification is required.

7. The method of claim 1,
wherein the response message is a Configuration Update Complete message or a Configuration Update Suspend message.

8. A method for a network node to perform communication related to configuration updates, the method comprising:
transmitting a Configuration Update Command message including information requesting to perform a registration procedure to a User Equipment (UE); and
receiving a response message to the Configuration Update Command message from the UE,
wherein the response message includes information requesting to maintain a Non-Access Stratum (NAS) signaling connection between the UE and the network node,
wherein a procedure for releasing the NAS signaling connection is not initiated even after the configuration update command message is received, based on the information requesting to maintain the NAS signaling connection is received.

9. The method of claim 8, further comprising:
receiving a registration request message from the UE.

10. The method of claim 9, further comprising:
transmitting a registration accept message to the UE, in response to the registration request message.

11. The method of claim 9,
wherein the registration request message includes information requesting to maintain the NAS signaling connection newly established between the relay UE and the network node based on the registration procedure after the registration procedure is completed.

12. The method of claim 8,
wherein the response message includes one or more information of i) time information for requesting to postpone release of the NAS signaling connection, ii) information on whether or not an explicit NAS signaling connection release is required, and/or iii) information on whether a release notification is required.

13. The method of claim 8,
wherein the response message is a Configuration Update Complete message or a Configuration Update Suspend message.

14. A Relay User Equipment (UE) for performing communication related to configuration update,
at least one processor; and
at least one memory storing instructions and operably electrically connectable with the at least one processor;
wherein the operations performed based on the execution of the instructions by the at least one processor include:
receiving a Configuration Update Command message including information requesting to perform a registration procedure from a network node; and
transmitting a response message to the configuration update command message to the network node,
based on that the Remote UE connected to the Relay UE is in a Radio Resource Control (RRC)_CONNECTED state, wherein the response message includes information requesting to maintain a Non-Access Stratum (NAS) signaling connection between the Relay UE and the network node.

15. The Relay UE of claim 14,
wherein the Relay UE is an autonomous driving device that communicates with at least one of a mobile terminal, a network, and an autonomous vehicle other than the Relay UE.

* * * * *